United States Patent
Steinberg et al.

(10) Patent No.: US 12,306,291 B2
(45) Date of Patent: May 20, 2025

(54) SYSTEM AND METHOD FOR PROVIDING LOCATION-BASED POSITIONING AND NAVIGATION IN GPS-DENIED ENVIRONMENTS

(71) Applicants: Gregory M. Steinberg, Austin, TX (US); Samuel H. Steinberg, Port Orange, FL (US)

(72) Inventors: Gregory M. Steinberg, Austin, TX (US); Samuel H. Steinberg, Port Orange, FL (US)

( * ) Notice: Subject to any disclaimer, the term of this patent is extended or adjusted under 35 U.S.C. 154(b) by 0 days.

(21) Appl. No.: 18/951,541

(22) Filed: Nov. 18, 2024

(65) Prior Publication Data
US 2025/0093495 A1    Mar. 20, 2025

Related U.S. Application Data

(63) Continuation-in-part of application No. 18/595,198, filed on Mar. 4, 2024, now abandoned, which is a
(Continued)

(51) Int. Cl.
| | |
|---|---|
| *G01S 13/88* | (2006.01) |
| *H04B 1/713* | (2011.01) |
| *H04L 9/06* | (2006.01) |

(52) U.S. Cl.
CPC .............. *G01S 13/88* (2013.01); *H04B 1/713* (2013.01); *H04L 9/0631* (2013.01)

(58) Field of Classification Search
CPC ..... H04W 4/029; H04W 4/025; H04W 4/023; H04W 64/00; G01S 13/222; G01S 13/24;
(Continued)

(56) References Cited

U.S. PATENT DOCUMENTS

| | | | | |
|---|---|---|---|---|
| 5,748,669 | A  * | 5/1998 | Yada | H04L 1/02 375/135 |
| 7,068,715 | B2 * | 6/2006 | Hoctor | H04B 1/7183 375/E1.001 |

(Continued)

FOREIGN PATENT DOCUMENTS

| | | |
|---|---|---|
| KR | 101748136 B1 | 6/2017 |
| WO | 2019156625 A1 | 8/2019 |
| WO | 2020259202 A1 | 12/2020 |

OTHER PUBLICATIONS

Beuchelt, Gerald; Leveraging MFA to Reduce the Risks of a Remote Workforce and What is Multi-Factor Authentication; https://www.cio.com/article/191112/leveraging-mfa-to-reduce-the-risks-of-a-remote-workforce.html; Dec. 15, 2020.
(Continued)

*Primary Examiner* — Peter M Bythrow
(74) *Attorney, Agent, or Firm* — HULSEY P.C.

(57) ABSTRACT

System and method for providing location-based positioning and navigation in GPS-denied environments. The method includes Time Domain Reflectometry (TDR) analyzing of varying impedance levels for generating reflection points for indoor location tracking. Next, the method includes receiving the reflection data and operating in at least one of: Very Low Frequency (VLF) and Ultra-Wideband (UWB) modes that are selected based on environmental conditions and application requirements as determined from the reflection data. Next, the method includes integrating information pertaining to location tracking data from both the VLF and UWB modes to enhance the accuracy and reliability of positioning and navigation data. Thereafter, the method includes dynamically optimizing power consumption by dynamically adjusting the operational modes based at least on real-time environmental factors to extend the battery life while maintaining signal integrity and navigation precision.

20 Claims, 25 Drawing Sheets

Related U.S. Application Data continuation-in-part of application No. 18/223,409, filed on Jul. 18, 2023, now abandoned.

(60) Provisional application No. 63/390,272, filed on Jul. 18, 2022.

(58) Field of Classification Search
CPC ...... G01S 5/011; G01S 5/0263; G01S 5/0273; G01S 13/88; H04B 1/713; H04L 9/0631
See application file for complete search history.

(56) References Cited

U.S. PATENT DOCUMENTS

| | | | | |
|---|---|---|---|---|
| 7,082,153 | B2 * | 7/2006 | Balachandran | H04B 1/7176 375/138 |
| 7,496,128 | B2 * | 2/2009 | Giannakis | H04B 1/719 375/138 |
| 8,220,034 | B2 | 7/2012 | Hahn et al. | |
| 9,680,812 | B1 | 6/2017 | Emaminouri et al. | |
| 10,387,632 | B2 | 8/2019 | Wallace et al. | |
| 10,637,871 | B2 | 4/2020 | Balakrishnan et al. | |
| 10,812,460 | B2 | 10/2020 | Kurian et al. | |
| 10,873,830 | B2 * | 12/2020 | Markhovsky | G01S 5/10 |
| 11,057,374 | B1 | 7/2021 | Smith et al. | |
| 11,134,079 | B2 * | 9/2021 | Rakshit | G06V 40/10 |
| 11,140,155 | B2 | 10/2021 | Alhawaj et al. | |
| 11,218,460 | B2 | 1/2022 | Linecker et al. | |
| 11,310,230 | B2 | 4/2022 | Wallace et al. | |
| 2002/0041622 | A1 * | 4/2002 | Steed | H04B 1/713 375/132 |
| 2003/0161411 | A1 * | 8/2003 | McCorkle | H04B 1/69 375/295 |
| 2004/0071118 | A1 * | 4/2004 | Dabak | H04B 1/71637 370/335 |
| 2004/0156421 | A1 * | 8/2004 | Yamaguchi | H04B 1/719 375/130 |
| 2004/0225880 | A1 | 11/2004 | Mizrah | |
| 2005/0192727 | A1 * | 9/2005 | Shostak | G07C 5/0808 701/1 |
| 2009/0003490 | A1 * | 1/2009 | Nadler | H04W 64/00 375/316 |
| 2011/0111751 | A1 * | 5/2011 | Markhovsky | G01S 13/878 455/423 |
| 2011/0296513 | A1 | 12/2011 | Kasad | |
| 2012/0011365 | A1 * | 1/2012 | Schmidt | H04W 24/02 713/168 |
| 2014/0273918 | A1 * | 9/2014 | Gilbert | G01S 5/0018 455/404.2 |
| 2015/0040193 | A1 | 2/2015 | Clemons | |
| 2015/0260835 | A1 * | 9/2015 | Widmer | B60L 53/124 342/27 |
| 2017/0248678 | A1 * | 8/2017 | Markhovsky | G01S 13/74 |
| 2020/0028689 | A1 | 1/2020 | Vadassery et al. | |
| 2021/0397683 | A1 | 12/2021 | Liem et al. | |
| 2023/0341510 | A1 * | 10/2023 | Zou | G01S 13/288 |

OTHER PUBLICATIONS

Cisco; What is Multi-Factor Authentication (MFA)?; https://www.cisco.com/c/en/us/products/security/what-is-multi-factor-authentication.html#~methods.

cybertraining365.com; Authentication; https://www.cybertraining365.com/cybertraining/Topics/Authentication.

* cited by examiner

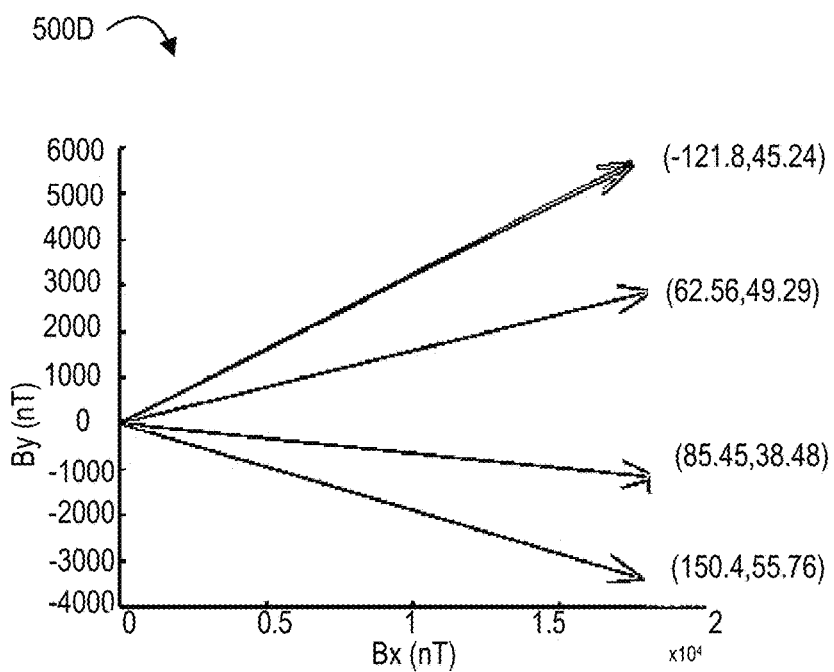
FIG. 5D
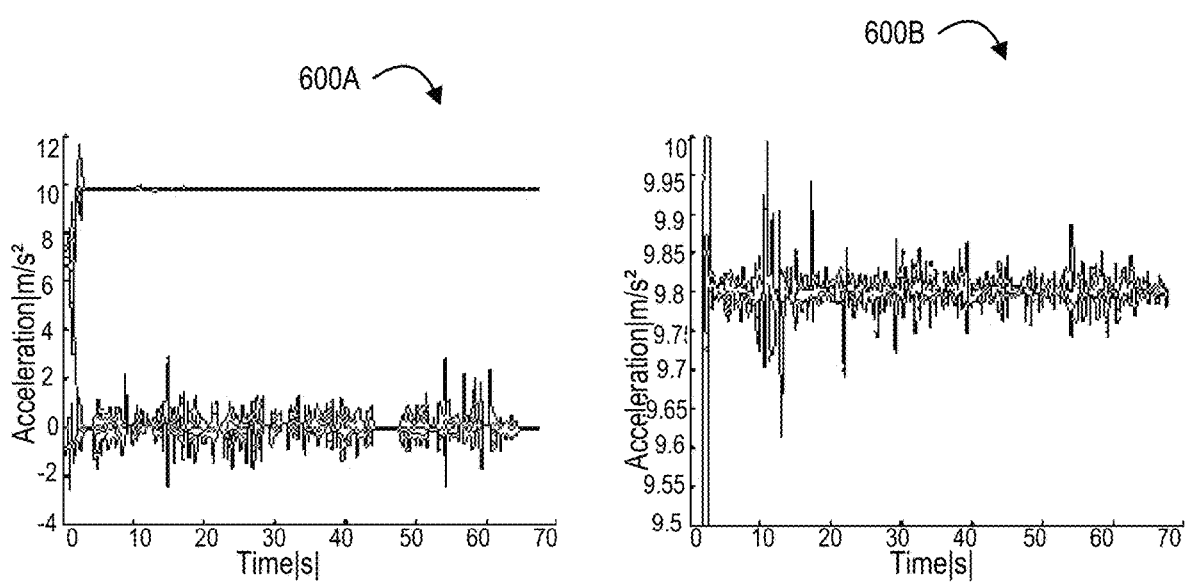
FIG. 6A
FIG. 6B

SYSTEM AND METHOD FOR PROVIDING LOCATION-BASED POSITIONING AND NAVIGATION IN GPS-DENIED ENVIRONMENTS

RELATED APPLICATION

This application is a continuation-in-part of U.S. Non-Provisional application Ser. No. 18/595,198 titled "ADVANCED LOCATION INTELLIGENCE SYSTEM FOR LOCATION AUTHENTICATION USING NON-SATELLITE NAVIGATION AND TIMING" and filed on Mar. 4, 2024; which is a continuation-in-part of U.S. Non-Provisional patent application Ser. No. 18/223,409 titled "THREE-FACTOR AUTHENTICATION", and filed on Jul. 18, 2023; which claims the benefit of U.S. Provisional Patent Application No. 63/390,272 titled "THREE-FACTOR AUTHENTICATION" and filed on Jul. 18, 2022; all of which are incorporated herein in their entirely and referenced thereto.

FIELD OF THE PRESENT DISCLOSURE

Embodiments of the present disclosure generally relate to the field of providing positioning information. Embodiments of the present disclosure relate to a system and method for providing location-based positioning and navigation in GPS-denied environments.

BACKGROUND OF THE DISCLOSURE

In the early days of computing, users were typically identified/verified by their usernames and passwords. As computing systems and networks became more complex, so did the need for more sophisticated Identity Management (IdM) solutions. One of the earliest forms of the IdM was Access Control Lists (ACLs) that consisted of a list of users and their respective permissions (such as read, write, or execute) which were used to control access to individual files or resources. In the 1970s, the development of directory services (such as X.500) provided a more centralized way to store and manage identity information that allowed organizations to store information (such as their names, passwords, and roles) about users in a single location. In the 1980s, the introduction of single sign-on (SSO) technology made it possible for the users to authenticate once and gain access to multiple systems and/or applications, thereby, simplifying the authentication process for the users by reducing the number of passwords that users had to remember. In the 1990s, the growth of the internet and the adoption of web-based applications led to a renewed focus on the IdM for finding ways to securely authenticate users and protect their data from unauthorized access. In the 2000s, the development of cloud computing and mobile devices facilitated users to access applications and/or data from anywhere from various environments, thus, making it more difficult to control access and protect data and further challenging the traditional IdM solution.

In recent years, there has been a growing focus on the IdM as a critical component of enterprise security with the organizations increasingly adopting the IdM solutions that can secure access to systems, resources, and data by detecting and protecting critical infrastructure against data breaches. To improve security, multi-factor authentication is enabled to verify the user to grant access to a website or application. In such multi-factor authentication, only after successfully presenting two or more pieces of evidence to an authentication mechanism, access is granted to the user. The evidence may be in the form of credentials, codes, liveliness of users, personal data, and so on.

Recently, the location of a user is a massively used evidence for verifying the user to grant permissions. The use of the location of the user started as early as the 2000s when location-based services (LBS) began to emerge that allowed the users to access information and services based on their location. The LBS used GPS to track the user's location to grant or deny access to resources based on their location and quickly began to be used for identity management purposes. With advancements in technology, location-based authentication software has become more sophisticated, and modern products use a variety of location-tracking technologies, such as GPS, Wi-Fi, and Bluetooth, to track the user's location. Some of these existing systems are described below.

A U.S. Pat. No. 11,310,230 B2 discloses a system and a method for authenticating a user. The authentication process includes one-factor and three-factor authentication. When a user uses his mobile device to login into an organization's application, the user is asked to log in using a user id and password. Additionally, the user could capture a video or an image using his mobile device to proceed with the liveness identification. The authentication process requires identifying an identifier from the liveness identification image/video (e.g., movement, object, characters, or the like). Further, the captured image data helps to relate to the time or location at which the images/video were captured.

Some other references including US patent application US 2020/0028689 A1, a Korean patent KR 101748136B1, and U.S. Pat. No. 11,134,079 B2 disclose a user authentication method performed based on the picture captured by the user on his mobile device.

Another US patent application US 2020/0028689 A1 teaches authentication is performed based on a location, time, and/or photo. The authentication system validates that a user is at a particular location, within a particular time range, based on a photo that may be known only to the user and may be taken by the user at the location. The location photo may be used as a way to identify the location as well as a way to verify that the user attempting authentication is physically at the location. In the U.S. Pat. No. 11,134,079 B2, a computer identifies a user attempting to access information that requires authentication approval via a computing device. The computer receives one or more digital images from the computing device and the computer determines the current field of view of the computing device, the current location, and the current posture of the user based on the one or more digital images. The computer determines whether at least one of the current fields of view, the current location, and the current posture during a current attempt to access information matches one or more of a previous field of view of the computing device, a previous location of the user, and a previous posture of the user during a previous attempt to access the information. Based on the determination, the computer performs an action related to the user accessing the information.

Another reference US 2020/0028689 A1 discloses real-time capturing of the image to determine the location of the user and authenticate the user from a private network. References such as WO 2020259202 A1, U.S. Ser. No. 11/140,155 B2, WO 2019156625 A1, and U.S. Pat. No. 9,680,812 B1 disclose a method of authenticating a user using first-factor authentication and second-factor authentication. References further disclose authorizing using a computing device or mobile device.

Some references teach the authentication process to compare credentials to databases for authorization in wired or wireless networks. User id and password, digital certificates can be provided as first and second-factor authentication. User location and current time are sometimes considered for authentication. Non-patent literature titled "Leveraging MFA to Reduce the Risks of a Remote Workforce and What Is Multi-Factor Authentication?" discloses multi-factor authentication. In this reference, the user must enter not only a username and password for accessing the system, but also provide contextual authentication such as time of day or geographic location, or IP address for consideration.

Even though the existing systems teach to provide multiple authentications process for granting access, with the present network problem, it may be easy for hacking such processes and bypass the authentication. Additionally, the existing systems use Machine Learning (ML) algorithms to analyze the user's location history and to identify patterns pertaining to suspicious activity has also increased. Since the ML can be used to develop new attack vectors by finding patterns and identifying weaknesses, the ML can be used to develop new attack vectors that exploit vulnerabilities in the IdM systems. Additionally, the hackers can use bots to mimic human behavior in a way that makes it difficult for the ML to distinguish the bots from real users and bypass the IdM systems by using stolen credentials or by trying to create new accounts. As a result, the existing systems with dependencies on the ML and the network, pose an increased threat to the IdM systems.

As the technology and use of location-based authentication systems continue to advance, new challenges have emerged, particularly in environments where GPS signals are unavailable or unreliable. GPS-denied environments, such as underground facilities, heavily built-up urban areas, or indoor spaces, present significant issues for location-based authentication systems, as the systems heavily rely on GPS for tracking and verifying user locations. Without reliable GPS data, current systems are unable to accurately authenticate users based on location.

Another problem arises from the inability of existing systems to seamlessly transition between different location tracking technologies in real-time. Current systems often struggle when switching between GPS and non-GPS technologies such as Very Low Frequency (VLF), Ultra-Wideband (UWB), or Wi-Fi-based tracking. This can lead to inconsistencies in location data, making it difficult to maintain a high level of security and reliability in these environments. In addition to this, existing solutions lack the ability to manage power consumption effectively when using multiple location tracking technologies. GPS-denied environments require continuous location tracking, which places a significant drain on battery-operated systems or devices. Current systems fail to dynamically adjust power consumption based on the operational environment, which results in frequent power outages and unreliable user authentication in mission-critical situations.

Moreover, the complexity of signal behavior in GPS-denied environments further complicates the task of reliable authentication. Variations in environmental conditions, including signal reflections, attenuation, and interference, can distort the location data, making it difficult to verify user identities accurately. Existing systems are often not equipped to handle such intricate signal variations, leading to a decline in the accuracy and security of location-based authentication processes in these environments.

Therefore, there is a need for a system and method for providing location-based positioning and navigation in GPS-denied environments to overcome the drawbacks of the prior arts.

The information disclosed in this background of the disclosure section is only for enhancement of understanding of the general background of the disclosure and should not be taken as an acknowledgment or any form of suggestion that this information forms existing information already known to a person skilled in the art.

BRIEF SUMMARY OF THE DISCLOSURE

The disclosed subject matter provides a system and method (together termed as "mechanism") for providing location-based positioning and navigation in GPS-denied environments. The mechanism offers a cutting-edge solution for navigating in challenging environments where GPS signals may be weak or completely unavailable, such as indoors, underground, or in dense urban areas. The mechanism is built around a specially designed reflective printed circuit board (PCB) that features integrated traces. These traces play a crucial role in analyzing Time Domain Reflectometry (TDR) signals, allowing the system to measure varying impedance levels. By generating reflection points from these signals, the mechanism can accurately determine the user's location, even in areas where traditional navigation systems fail. Further, the mechanism has the ability to dynamically switch between two communication modes: Very Low Frequency (VLF) and Ultra-Wideband (UWB). This adaptability means that the system can select the most suitable mode based on the environmental conditions and the specific requirements of the application at hand. For instance, VLF may be used in scenarios requiring low power consumption, while UWB can be activated for situations demanding higher precision and faster data transmission. This versatility ensures that users receive optimal navigation support regardless of their surroundings.

Further, the mechanism enhances the accuracy and reliability of positioning information by integrating data from various sources. It collects information not only from the TDR analysis but also from environmental sensors such as accelerometers, gyroscopes, and magnetometers. This comprehensive data fusion allows the system to compensate for potential inaccuracies that may arise from magnetic anomalies or other factors that could disrupt navigation, ensuring that users can trust the guidance provided. To safeguard user data, the invention includes advanced security measures that protect information transmitted over the VLF and UWB channels. Techniques such as AES-256 encryption and error correction strategies help maintain data integrity and confidentiality, addressing growing concerns about cybersecurity in today's digital landscape. Additionally, the mechanism features a user-friendly interface that displays real-time operational status, allowing users to easily monitor performance and make informed decisions. Users can select their preferred navigation mode based on their specific needs, enhancing the overall experience. In emergency situations, the mechanism is equipped to send SOS signals, which can include crucial information such as location data and environmental conditions, ensuring that help can be summoned when needed.

Thus, the mechanism seamlessly integrates various technologies to deliver a reliable and effective navigation experience in GPS-denied environments. By addressing the challenges of traditional navigation systems, it empowers users to confidently find their way, whether they are exploring unfamiliar indoor spaces or navigating through complex underground structures.

In accordance with some embodiments disclosed herein, some limitations of the above-mentioned limitations are overcome by a system for providing location-based positioning and navigation in GPS-denied environments. This system includes a reflective printed circuit board (PCB) subsystem, which incorporates integrated traces for Time Domain Reflectometry (TDR) analysis to generate reflection points, facilitating indoor location tracking through varying impedance levels. It features a positioning and communication module that receives reflection data and operates in either Very Low Frequency (VLF) or Ultra-Wideband (UWB) modes, chosen based on environmental conditions and application requirements as determined from the reflection data. The system also contains a data fusion module that integrates location tracking information from both VLF and UWB modes, enhancing the accuracy and reliability of the positioning and navigation data. Additionally, the system includes a power management module that optimizes power consumption by adjusting operational modes in real time, based on environmental factors, thus extending battery life while maintaining signal integrity and navigation precision.

The system further includes one or more fractal antennas on the PCB to support multi-band and wide-band capabilities, improving signal reception and transmission for VLF and UWB modes. The transition between VLF and UWB modes is managed by an adaptive protocol framework that continuously assesses environmental factors, signal quality, and operational needs to ensure smooth navigation and communication. A security module is incorporated, employing advanced error correction codes and automatic repeat request strategies to ensure data integrity, complemented by AES-256 encryption and frequency hopping techniques for secure data transmission across VLF and UWB channels.

Moreover, the reflective PCB subsystem features trace geometry and material selection optimized for TDR-based signal reflection, ensuring accurate distance measurement and enhanced navigation indoors. The data fusion module integrates additional data from environmental sensors, such as accelerometers, gyroscopes, and magnetometers, to enhance positioning accuracy in conditions with magnetic anomalies or underground environments. The system is also capable of transmitting SOS signals through UWB and VLF communication channels, allowing emergency signals to include SOS messages, location data, and environmental information. A user interface is provided to display real-time operational status and enables users to select between VLF and UWB modes based on specific navigation scenarios. The power management module employs energy efficiency protocols to maximize device longevity, operating in low-power VLF mode and higher-power UWB mode as required. Lastly, the system integrates an augmented reality (AR) module to overlay navigational data and environmental information onto a user's display, with GenAI dynamically adjusting AR content in response to real-time environmental conditions and user interactions.

In accordance with some embodiments disclosed herein, some limitations of the above-mentioned limitations are overcome by a method for providing location-based positioning and navigation in GPS-denied environments. The method includes the steps of analyzing varying impedance levels using Time Domain Reflectometry (TDR) to generate reflection points, which are essential for indoor location tracking. It involves receiving the reflection data and operating in either Very Low Frequency (VLF) or Ultra-Wideband (UWB) modes. These modes are selected based on environmental conditions and application requirements as determined from the reflection data. Additionally, the method includes integrating information related to location tracking data from both VLF and UWB modes to enhance the accuracy and reliability of positioning and navigation data.

Moreover, the method incorporates dynamically optimizing power consumption by adjusting the operational modes in real time, based on environmental factors to extend battery life while maintaining signal integrity and navigation precision. It further supports multi-band and wide-band capabilities, which improve signal reception and transmission for both VLF and UWB modes. The transition between these modes is managed algorithmically through an adaptive protocol framework that continuously analyzes environmental factors, signal quality, and operational requirements, ensuring seamless navigation and communication.

To maintain data integrity, the method employs advanced error correction codes and automatic repeat request strategies, alongside AES-256 encryption and frequency hopping techniques for securing data transmission over VLF and UWB channels. The method optimizes TDR-based signal reflection, ensuring precise distance measurements and enhanced navigation in indoor environments. It also integrates data from environmental sensors, such as accelerometers, gyroscopes, and magnetometers, to improve positioning accuracy in scenarios with magnetic anomalies or underground environments. Furthermore, the method includes the capability of sending emergency signals over UWB and VLF communication channels, allowing for the transmission of SOS signals, location data, and environmental information. It provides a mechanism for displaying real-time operational status and allows users to select between VLF and UWB modes according to specific navigation scenarios. The method employs energy efficiency protocols tailored for low-power operation in VLF mode and higher-power operation in UWB mode to maximize the device's longevity during continuous use. Finally, it involves overlaying navigational data and environmental information on a user's display, with GenAI dynamically adjusting the augmented reality (AR) content based on real-time environmental conditions and user interactions.

The features and advantages of the subject matter hereof will become more apparent in light of the following detailed description of selected embodiments, as illustrated in the accompanying FIGUREs. As one of ordinary skill in the art will realize, the subject matter disclosed herein is capable of modifications in various respects, all without departing from the scope of the subject matter. Accordingly, the drawings and the description are to be regarded as illustrative.

BRIEF DESCRIPTION OF THE DRAWINGS

The present subject matter will now be described in detail with reference to the drawings, which are provided as illustrative examples of the subject matter to enable those skilled in the art to practice the subject matter. It will be noted that throughout the appended drawings, features are identified by like reference numerals. Notably, the FIGUREs and examples are not meant to limit the scope of the present subject matter to a single embodiment, but other embodiments are possible by way of interchange of some or all of the described or illustrated elements and, further, wherein:

FIG. 5D illustrates a graph showing rotation of the user device and yaw angle from the device's gyro, in accordance with an embodiment of the present disclosure;

FIG. 6A illustrates a graph showing running average of accelerometer being steady around gravitational acceleration, in accordance with an embodiment of the present disclosure;

FIG. 6B illustrates the graph zoomed on Az, in accordance with an embodiment of the present disclosure;

DETAILED DESCRIPTION OF THE EMBODIMENTS

Figure 1:
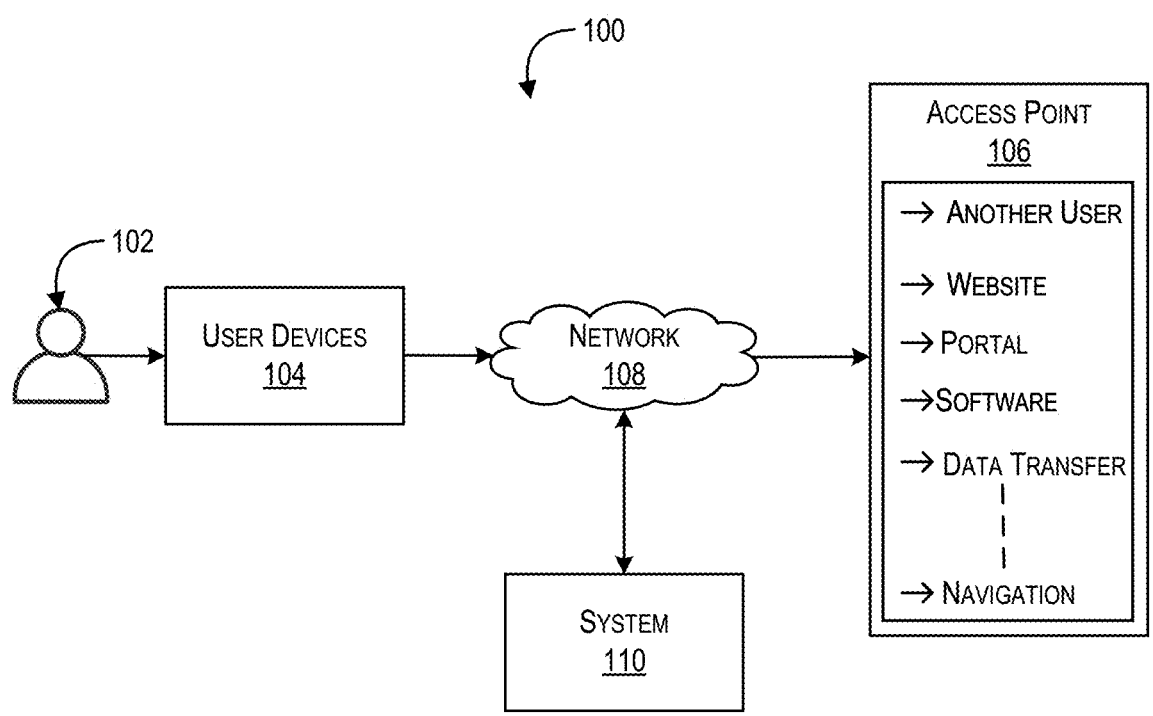
FIG. 1 illustrates an exemplary environment of a system for location-based security verification of users, in accordance with an embodiment of the present disclosure.

The detailed description set forth below in connection with the appended drawings is intended as a description of exemplary embodiments in which the presently disclosed disclosure can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed disclosure. However, it will be apparent to those skilled in the art that the presently disclosed disclosure may be practiced without these specific details. In some instances, well-known structures and devices are shown in block diagram form in order to avoid obscuring the concepts of the presently disclosed disclosure.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and/or firmware.

Embodiments of the present disclosure may be provided as a computer program product, which may include a non-transitory, machine-readable storage medium tangibly embodying thereon instructions, which may be used to program the computer (or other electronic devices) to perform a process. The machine-readable medium may include, but is not limited to, fixed (hard) drives, semiconductor memories, such as Read Only Memories (ROMs), Programmable Read-Only Memories (PROMs), Random Access Memories (RAMs), Erasable PROMs (EPROMs), Electrically Erasable PROMs (EEPROMs), flash memory or other types of media/machine-readable medium suitable for storing electronic instructions (e.g., computer programming code, such as software or firmware).

Various methods described herein may be practiced by combining one or more non-transitory, machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed therebetween, while not sharing any physical connection. Based on the disclosure provided herein, one of ordinary skill in the art will appreciate a variety of ways in which connection or coupling exists in accordance with the definition.

Further, the term "module" may be software or hardware particularly programmed to receive an input, perform one or more processes using the input, and provide an output. The input, output, and processes performed by various modules will be apparent to one skilled in the art based on the present disclosure.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

It will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular name.

Embodiments of the present disclosure relate to a system and method for processing a payment using an aggregated transaction account. The aggregated transaction account is created by linking all transaction accounts of the user with the aggregated transaction account. Further, the aggregated transaction account is funded using pre-determined funds in the transaction accounts based on transaction rules set for each of the plurality of transaction accounts. When a payment request is received from the merchant via a merchant payment processor (also referred to as merchant device), the payment is processed using the credit balance available in the aggregated transaction account, without the need for the user to select any linked transaction account or without tracking the credit limit or balance of any of the transaction accounts.

In the present specification, an embodiment showing a singular component should not be considered limiting. Rather, the subject matter preferably encompasses other embodiments including a plurality of the same component, and vice-versa, unless explicitly stated otherwise herein.

Moreover, applicants do not intend for any term in the specification or claims to be ascribed an uncommon or special meaning unless explicitly set forth as such. Further, the present subject matter encompasses present and future known equivalents to the known components referred to herein by way of illustration.

It will be understood that in the event parts of different embodiments have similar functions or uses, they may have been given similar or identical reference numerals or descriptions. It will be understood that such duplication of reference numerals is intended solely for efficiency and ease of understanding the present disclosure and are not to be construed as limiting in any way, or as implying that the various embodiments themselves are identical.

Unless defined otherwise, all technical and scientific terms used herein have the same meaning as commonly understood by one of ordinary skills in the art to which the present disclosure belongs. However, some specific definitions are presented below.

The term "user" refers to the individual who interacts with the system primarily via the mobile autonomous device running the client-side application. Users can also be defined as registered users, non-registered users, or persons. The term "users" or "registered users" refers collectively to those individuals who have access to the system of the present disclosure, including employees, administrators, information technology specialists, and end users generally. The term "non-user" refers to any individual who does not have access to either the server-side and/or client-side applications described herein yet may be a recipient of the content generated by the same.

The term "video display" refers to devices upon which information may be displayed in a manner perceptible to a user, such as a computer monitor, cathode ray tube, liquid crystal display, light emitting diode display, touchpad or touchscreen display, and/or other means known in the art for emitting a visually perceptible output. Video displays may be electronically connected to a client device according to hardware and software known in the art.

The term "device" refers to, but is not limited to, vehicles, drones, stand-alone web cameras, cameras on laptops, tablets, mobile devices, doorbells, dashboards, security cameras, robots, autonomous equipment, and virtual, augmented, and mixed reality glasses/headsets.

In an implementation of a preferred embodiment of the disclosure, a "display page" may include a computer file residing in memory which may be transmitted from a server over a network to a mobile device that can store it in memory. A mobile device may receive non-transitionary computer-readable media, which may contain instructions, logic, data, or code that may be stored in the persistent or temporary memory of the mobile device. Similarly, one or more servers may communicate with one or more client devices across a network and may transmit computer files residing in memory. The network, for example, can include the Internet, wireless communication network, or any other network for connecting one or more client devices to one or more servers.

Any discussion of "client-side application" may also apply to a mobile application that is downloaded to or stored on a client device and/or mobile device.

Any discussion of "client", "client device" or "mobile device" may also apply to any type of networked device, including but not limited to phones such as cellular phones (e.g. An iPhone, Android, Windows Mobile, Blackberry, or 10 any "smart phone") or location-aware portable phones (such as GPS); embedded or specialty device; or viewing device (such as apple tv, Google TV, Roku, Smart TV, Picture Frame or other viewing device); personal computer, server computer, or laptop computer; personal digital assistants pads) such as Palm-based devices or tablet devices (such as iPad, Kindle Fire, or any tablet device); a roaming device such as a network-connected roaming device or other device capable of communicating wirelessly with a computer network; or any other type of network device that may communicate over a network and handle electronic transactions. Any discussion of any device mentioned may also apply to other devices.

At a client device, the "display page" or "user interface" may be interpreted by software residing on a memory of the client device, causing the computer file to be displayed on a video display in a manner perceivable by a user. The display pages (i.e., Screens) described herein may be created using a software language known in the art such as, for example, the hypertext mark-up language ("HTML"), the dynamic hyper-text mark-up language ("DHTML"), HTML5, the extensible hypertext mark-up language ("XHTML"), the extensible mark-up language ("XML"), or another software language that may be used to create a computer file displayable on a video display in a manner perceivable by a user. Any computer-readable media with logic, code, data, and instructions, may be used to implement any software or steps or meth-otology. Where a network comprises the Internet, a display page may comprise a webpage of a type known in the art. The terms "page" or "display page" may include embedded functions comprising software programs stored on a memory, such as, for example, Cocoa, VBScript routines, Jscript routines, javascript routines, Java applets, ActiveX components, ASP.NET, AJAX, Flash applets, Silverlight applets, Adobe AIR routines, or any other scripting language.

A display page may comprise well-known features of graphical user interface technology, such as, for example, frames, windows, tabs, scroll bars, buttons, icons, menus, fields, and hyperlinks, and well-known features such as a touchscreen interface. Pointing to and touching on a graphical interface button, icon, menu option, or hyperlink also is known as "selecting" the button, icon, option, or hyperlink. Additionally, a "point and gesture" interface may be utilized, such as a hand-gesture-driven interface. Any other interface for interacting with a graphical user interface may be utilized. A display page according to the disclosure also may incorporate multimedia features. For example, a user interface may be provided for a web page or an application. An application may be accessed remotely or locally. A user interface may be provided for a mobile application (e.g. iPhone application), gadget, widget, tool, plug-in, or any other type of object, application, or software Any of the client or server devices described may have tangible computer-readable media with logic, code, or instructions for performing any actions described herein or running any algorithm. The devices with such computer-readable media may be specially programmed to perform the actions dictated by the computer-readable media. In some embodiments, the devices may be specially programmed to perform one or more tasks relating to blood glucose management. In some embodiments, the devices may communicate with or receive data collected from one or more measurement or sensing devices, which may collect physiological data from a subject or a sample collected from a subject. The term "time" refers to a chronological time or time-frame, including but not limited to morning, afternoon, evening, breakfast, lunch, dinner, night time, beginning, end, etc.

Other examples of protocols or standard communications mean between the server and the client included within the scope of this disclosure include, but are not limited to, standard telephone lines, LAN or WAN links (e.g., T1, T3, 56 kb, X.25), broadband connections (ISDN, Frame Relay, ATM), and wireless connections using a variety of communication protocols (e.g. HTTP, HTTPS, XML, JSON, TCP/IP, IPX, SPX, NetBIOS, Ethernet, RS232, messaging application programming interface (MAPI) protocol, real-time streaming protocol (RTSP), a real-time streaming protocol used for user datagram protocol scheme (RTSPU), the Progressive Networks Multimedia (PDN) protocol, manufacturing message specification (MMS) protocol, the wireless application protocol (WAP) and direct asynchronous connections A system for location-based security verification of users is disclosed. The system may include a receiving module to receive, in response to clicking a verification link, data from a user device pertaining to device details, location coordinates of the user, sensor data, and/or environmental data. Further, the system may include an analyzer module to determine a first position point, a second position point, and a third position point by employing a Magnesse Magnetic Field (MMF) model, an Augmented Reality Sextant (ARS), and an Augmented Reality Muon Measurement (ARMM), respectively. The system may further include an optimization module to optimize data pertaining to the determined first position point, second position point, and/or third position point. Also, the system may include an optimal point calculation module to determine an optimal point by performing fusion, trilateration, and/or triangulation on the optimized data pertaining to the determined first position point, second position point, and/or third position point. Furthermore, the system may include an environmental identification module to identify a current location of the user by employing one or more Machine Learning (ML) models over the received environmental data. Additionally, the system may include a security module to verify the user based on the optimal point and the identified current location.

FIG. 1 illustrates an exemplary environment 100 of a system 110 for location-based security verification of user 102, in accordance with an embodiment of the present disclosure. In an embodiment, the exemplary environment 100 may include a user device 104 associated with the user 102, an access point 106, a network 106, and the system 110. The system 110 may provide a location-based security verification of the user 102 by accurately identifying the user's location without being manipulated by the likes of hackers, Virtual Proxy Networks (VPNs), and/or other location manipulation software. Further, such location-based security verification may be utilized to safely access the access point, such as another user, a website, a portal, a software, data transfer, or navigation. In some embodiments, such location may be identified independently of location identification through satellite and networks. In some embodiments, such location may be identified by the location identification through satellite and networks but may be cross-verified by the system 110 of the present disclosure. In an embodiment, the system 110 may be implemented on a mobile device. In another embodiment, the system 110 may be implemented on a fully autonomous device exclusively designed for location-based security verification of the user 102. In yet another embodiment, the system 110 may be implemented on a server that may, without any limitation, include a cloud server.

In some embodiments, in order to identify the location of the user 102, the system 110 may combine digital information rendered from the spatial distribution of three or more virtual position points derived from distinct models using the earth's magnetic field, particles dispersed from cosmic rays, and/or celestial objects in a three-dimensional space. Upon deriving the three or more virtual position points, the system 110 may optimize such virtual points to remove noise, correct sensor drift, and obtain one single position point of the user 102. Thereafter, the system 110 may process environmental data sourced from the sensors of the user device 104 and integrate them with the position point to improve the reliability of the position point. Such highly reliable position points may be utilized further to create a unique identity schema for managing a user's identity and access privileges. In some embodiments, a digital map may be utilized to store the spatial data for one or more Machine Learning (ML) algorithms to be trained for improving accuracy. In some embodiments, the one or more models for identifying location of the user 102 may use a relative time to produce optimal time intervals using processor cycles and the absolute Jovian time calculated by the digital sextant coupled with the magnetic field model and cosmic rays. Additionally, the system 110 may utilize encoded ultrawideband ionospheric scatter to extend mesh networks in parallel with ground stations for continuous communications between one or more user devices 104. In some embodiments, the system 110 may measure the reflectance of a surface to determine the properties of surfaces for inertial indoor and underground navigation and/or determination of the composition of medicinal drugs.

Accordingly, the system 110 may be utilized in the field of IT security which deals with the identification, location verification, authentication, authorization, and auditing of resource security for a verified location. Further, the system 110 may make use of environmental data collected from sensors to create a unique profile associated with a verified position using Augmented Reality (AR). Additionally, the system 110 may be utilized to calculate an optimal time that may compare the processor time to the atomic clock for calculating three or more position points determined using the magnetic declination, a digital sextant, and muon detection to create an accurate position point. Such accurate position points may be compared against the GPS location being communicated to ensure authenticity. Further, the system 110 may be utilized to integrate such authentic location with the environmental data (such as sunlight, cloud coverage, sound, wind, temperature, pressure, air density, and altitude) collected from sensors of the user device 104 to create a unique personal schema for identification management and/or indoor/underground secure communication using ultra-wide, sky waves, and ground stations based on the identified location relative to the earth's surface.

Figure 2:
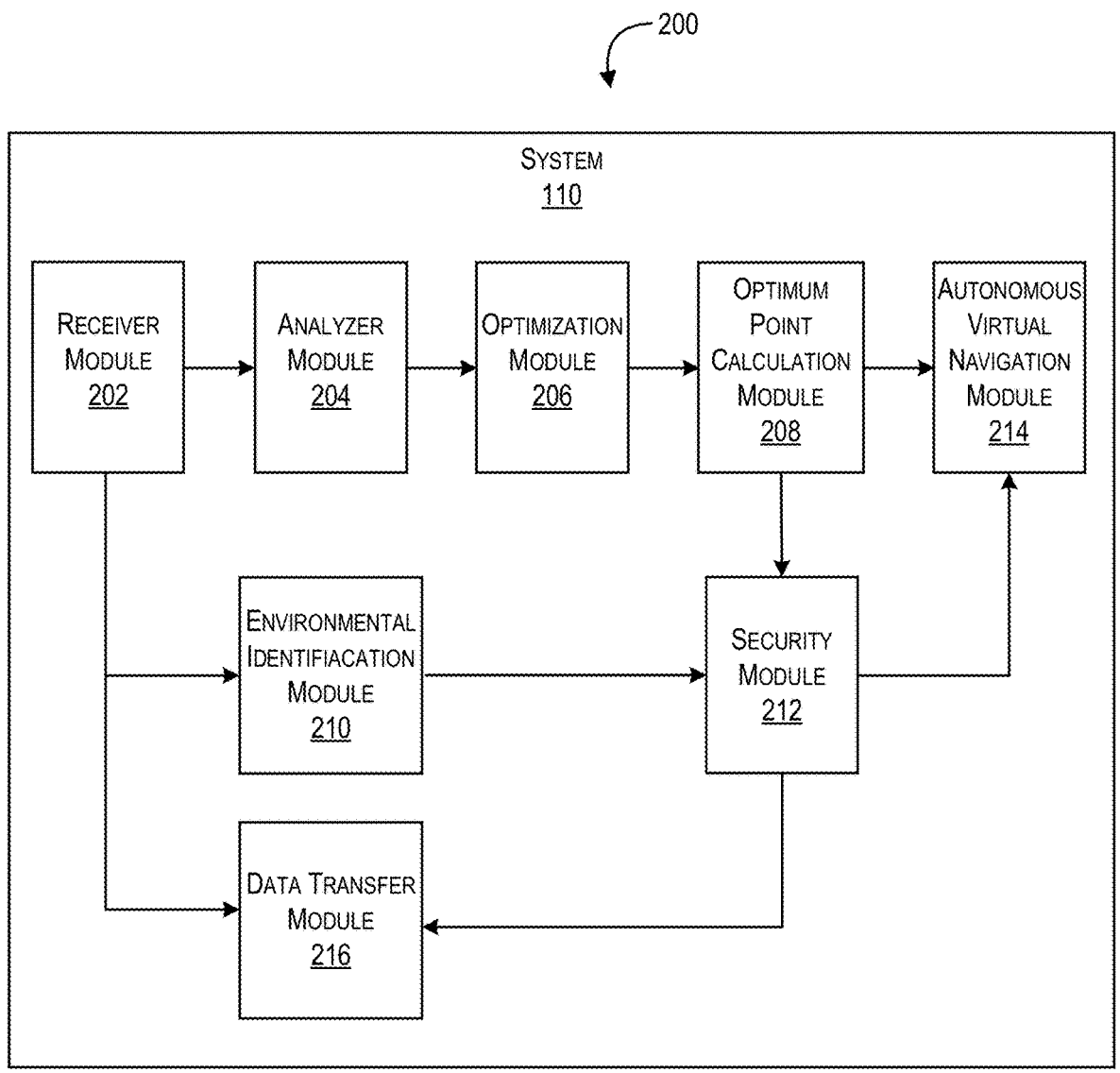
FIG. 2 illustrates a block diagram for the system for location-based security verification of users, in accordance with an embodiment of the present disclosure.

FIG. 2 illustrates a block diagram for the system 110 for location-based security verification of the user 102, in accordance with an embodiment of the present disclosure. In an embodiment of the present invention, the system 110 may include a receiver module 202, an analyzer module 204, an optimization module 206, an optimum point calculation module 208, an environmental identification module 210, a security module 212, an autonomous virtual navigation module 214, and a data transfer module 216. The receiver module 202, the analyzer module 204, the optimization module 206, the optimum point calculation module 208, the environmental identification module 210, the security module 212, the autonomous virtual navigation module 214, and the data transfer module 216 may be communicatively coupled to a memory and a processor of the system 110.

The processor may control the operations of the receiver module 202, the analyzer module 204, the optimization module 206, the optimum point calculation module 208, the environmental identification module 210, the security module 212, the autonomous virtual navigation module 214, and the data transfer module 216. In an embodiment of the present disclosure, the processor and the memory may form a part of a chipset installed in the system 110. In another embodiment of the present disclosure, the memory may be implemented as a static memory or a dynamic memory. In an example, the memory may be internal to the system 110, such as an onside-based storage. In another example, the memory may be external to the system 110, such as cloud-based storage. Further, the processor may be implemented as one or more microprocessors, microcomputers, digital signal processors, central processing units, state machines, logic circuitries, and/or any devices that manipulate signals based on operational instructions.

In an embodiment, the receiver module 202 may receive data pertaining to device details, location co-ordinates of the user, sensor data, and/or environmental data from the user device 104. The user device 104 may correspond to an electronic device having an antenna, a microphone, a speaker, and a camera. Thus, for example, the user device 104 may, without any limitation, include a mobile phone, a laptop, a tablet, and a Personal Digital Assistant (PDA) device. Further, the device details may relate to the details pertaining to the user device 104 such as model number, manufacturer, operating systems, root status (whether the device is rooted or not), sensor details, or the like. The location co-ordinates may relate to the real-time location co-ordinates detected by the GPS of the user device 104. The sensor data may relate to data captured by the sensors of the user device 104, such as images by a camera, sound by microphones, accelerometer data, gyroscope data, or the like. The environmental data may relate to ambient data pertaining to proximity of the user device 104 and associated with, but not limited to, sunlight, sound, wind, temperature, pressure, air density, altitude, and/or weather.

In an embodiment, the data may be received by the received module 202 in response to clicking a verification link, such that when the user clicks on the verification link then the user device 104 may automatically send the aforementioned data to the receiver module 202 of the system 110. Alternatively, the user 102 may be provided with options to control what type may be for one or more verification, either distinctively or collectively, such that the user 102 may set the data sharing permission for each verification individually, commonly for all verifications, or based on the type of verifications. It may be understood that the verification link may be autogenerated or custom generated for accessing the access point 106 without departing from the scope of the present disclosure.

In an embodiment, the analyzer module 204 may first analyze the received device details to ascertain user device root access, user device developer mode access, latitude, longitude, altitude, speed, accuracy, time, Wireless Fidelity (Wi-Fi) signals, Bluetooth beacons, and Global Positioning System (GPS) signals. Based on the results of the analysis, the analyzer module 204 determines the probability of authenticity of the user device, signals, and location. For example, if the user device is rooted or being operated in the developer mode, then the probability of authenticity may be less, similarly, if the time associated with the latitude and longitude of the user device 104 and the received time do not match then there may be a high likelihood that the user device 104 is using a VPN and authenticity probability may be less. The authenticity checking by the analyzer module 204 has been discussed in detail in the following paragraphs.

In an embodiment, the analyzer module 204 may also calculate Optimal Time (OT) for improving accuracy of GPS position data, accounting for variations in the analysis that could result from differences in time, and/or checking for spoofing. In order to calculate the OT, the analyzer module 204 may utilize an independent method known in the art other than the atomic clock to ensure the GPS position data. In some embodiments, the analyzer module 204 may calculate absolute Jovian time and may keep track of relative time using processor cycles for ensuring the GPS position data. Furthermore, the analyzer module 204 may also create a digital map by employing an ML model to collect, store, and analyze spatial data to increase accuracy of analysis. In a non-limiting exemplary embodiment, the digital map may be created by the determination of three position points corresponding to three virtual points in space and defined by their co-ordinates through Augmented Reality (AR), and have been discussed in the following paragraphs.

In an embodiment, the analyzer module 204 may determine the first position point by employing a Magnesse Magnetic Field (MMF) model. The determination of the first position point may include reading magnetometer measurements from the sensor data over the calculated OT. Upon reading the magnetometer measurements, the analyzer module 204 may calculate inclination and declination of magnetic field over the read magnetometer measurements. Further, the analyzer module 204 may calculate the latitude and longitude corresponding to the first position point using the calculated inclination and declination of the magnetic field over an International Geomatic Reference Field (IDRF) table. The determination of the first position point by the MMF model has been discussed in detail in the following paragraphs.

In an embodiment, the analyzer module 204 may determine the second position point by employing an Augmented Reality Sextant (ARS). The determination of the second position point may include determining if the user device 104 is indoor or outdoor using a camera sensor, microphone sensor, strength of GPS signal, strength of wireless signal, strength of cellular signal; Wi-Fi SSID, and/or location relevant to an existing virtual position point on digital maps. Upon determining if the user device 104 is indoor or outdoor, the analyzer module 204 may receive one or more images pertaining to the sky from a camera of the user device 104. Further, the analyzer module 204 may determine one or more constellations by employing cloud cover detection model and constellation detection model. Upon determining the one or more constellations, the analyzer module 204 may receive an image associated with a shadow of an object to measure the angle of the sun based on the determined one or more constellations and the received image using a digital sextant. Thereafter, the analyzer module 204 may calculate latitude and longitude corresponding to the second position point based on the measured angle of the sun. The determination of the second position point by the ARS model has been discussed in detail in the following paragraphs.

In an embodiment, the analyzer module 204 may determine the third position point by employing an Augmented Reality Muon Measurement (ARMM). The determination of the third position point may include determining two or more Augmented Reality Virtual Position Points (ARVPPs) relevant to the current position using the digital map. The two or more ARVPPs are calculated using speed of muons to measure the time it would take for the muons to travel from the two or more ARVPPs to the user device's current location. Upon calculation of the two or more ARVPPS, the analyzer module 204 may calculate the third position point based on the determined two or more ARVPPs. The determination of the third position point by the ARMM model has been discussed in detail in the following paragraphs.

In an embodiment, the optimization module 206 may optimize data pertaining to the determined first position point, second position point, and third position point. In an embodiment, the optimization module 206 may optimize the data by removing noise from the data and correcting for sensor drift. Such optimization may be achieved by, without any limitation, particle filtering (such as by a Monte Carlo method) to estimate the state of a system from a set of noisy measurements. Such particle filtering may be followed by smoothing the data, removing outliers, correcting for errors, and low pass filters for removing noise and sliding time averages for extracting steady values.

In an embodiment, to optimize the data pertaining to the first position point, the optimization module 206 may first initialize a set of particles, each representing a possible location, and then use a digital magnetometer to measure the magnetic field at the MMF AR VPP. Further, the optimization module 206 may update probability based on the measured magnetic field for each particle and resample the particles by giving more weight to the particles with higher probabilities. The optimization module 206 may repeat such steps until the particles converge to a single location that corresponds to the refined location of the user 102. In an embodiment, to optimize the data pertaining to the second position point, the optimization module 206 may first initialize a set of particles, each representing a possible location, and then utilize the ARS AR VPP. Further, the optimization module 206 may update probability based on the measured angle of the sun and resample the particles by giving more weight to particles with higher probabilities. The optimization module 206 may repeat such steps until the particles converge to a single location that corresponds to the refined location of the user 102. In an embodiment, to optimize the data pertaining to the third position point, the optimization module 206 may first initialize a set of particles, each representing a possible location, and then utilize the digital virtual nodes to measure the distance to the user's location defined by the ARMM AR VPP. Further, the optimization module 206 may update probability based on the measured distance and resample the particles by giving more weight to particles with higher probabilities. The optimization module 206 may repeat such steps until the particles converge to a single location that corresponds to the refined location of the user 102.

In an embodiment, the optimal point calculation module 208 may determine an optimal point by performing fusion, trilateration, and/or triangulation on the optimized data pertaining to the determined first position point, second position point, and/or third position point. In order to perform fusion, the optimal point calculation module 208 may combine the data pertaining to the determined first position point, second position point, and/or third position point in conjunction with the available data from the digital map. The fusion may create a single estimate of the device's orientation and position. In order to perform trilateration, the optimal point calculation module 208 may first measure distances between the three calculated AR VPPs and then measure the distances between the user device 104 and the virtual position points using radio waves. Once the distances are measured, the location of the target may be determined using triangulation. It may be understood that for refinement, the trilateration may be performed again against the digital map. In order to perform triangulation, the optimal point calculation module 208 may measure the angles from the MMF AR VPP to the other two VPPs by drawing circles around each AR VPPP with a radius equal to the distance between the MMF AR VPP and the targets. The intersection of the circles is the location of the target. It may be understood that for refinement, the triangulation may be performed again against the digital map In an embodiment, the environmental identification module 210 may identify a current location of the user 102 by employing one or more Machine Learning (ML) models over the received environmental data. The environmental identification module 210 may capture and analyze data of the environment of the user 102 who is attempting to access the access point 106 to confirm the identification of the position and the user 102. In operation, the environmental identification module 210 may utilize such data to create a unique profile that may be analyzed over time using the one or more ML models to increase security and accuracy for access control, fraud detection, personal security, and/or Location Accuracy. For example, a sensor fusion algorithm may be used to track the movement of a person through a crowd by combining data from multiple cameras, radar sensors, and microphones. The sensor fusion algorithm may use the wind direction and speed to estimate the person's direction of travel, the sound of their footsteps to estimate their speed, and the images from the cameras to identify their unique features. Additionally, or alternatively, the sensor fusion algorithm may identify people by their gait i.e., the way they walk. This may be achieved by processing the data from accelerometers, gyroscopes, and magnetometers of the user device 104 to measure the person's walking pattern, and then compare this pattern to a database of known gaits.

In an exemplary embodiment, the environmental data may, without any limitation, include sunlight, sound, wind, temperature, pressure, air density, altitude, and weather. With respect to sunlight, the environmental identification module 210 may utilize the camera to calculate the average brightness of the celestial object and/or the average color. This may be compared to the time of day, the cloudiness factor, and expected weather conditions. Further, the environmental identification module 210 may calculate the amount of Ambient Light using partial least squares. With respect to sound, the environmental identification module 210 may perform sound analysis to identify different types of sounds, as well as to extract information from sound recordings, such as the frequency and intensity of sound that may be used to identify individuals, the way that sound waves interact with an individual's body may be used to create a unique identifier, the pitch/loudness/timbre of sound may be used to identify individuals, the way that an individual's voice sounds may be used to identify them, and a "chirp" sent from the user device 104 may be analyzed using the microphone sensor for an echo/wind/other potential ambient noise. The microphone sensor may further help to determine if the device is inside, underground, or underwater, indoor/outdoor location, and the moving/stationary status of the user device 104. In order to analyze sound, the environmental identification module 210 may utilize time-frequency analysis and/or an ML model. The time-frequency analysis may be used to simultaneously represent the time and frequency content of a sound for identifying the different sounds that are present in a recording, as well as the changes in sound over time. The ML model may be used to automatically identify different types of sounds by training on a large dataset of labeled sound recordings.

With respect to wind, the environmental identification module 210 may utilize data from the microphone sensor to estimate wind speed and compare it against the user device's orientation to determine the wind direction to compare against publicly available data. With respect to temperature, data from the thermometer sensor is used to capture temperature readings from the immediate surroundings for use as a comparison to publicly available data as well as stored for machine learning. With respect to pressure, the environmental identification module 210 may determine the amount of pressure that an individual is exposed to identify them. The way that pressure affects an individual's breathing or heartbeat is used to create a unique identifier and the data from the barometer sensor is used to compare against publicly available data to identify the user 102. With respect to air density, the environmental identification module 210 may compare the received pressure and temperature data with available meteorological data. With respect to altitude, the environmental identification module 210 may utilize the Inertial measurement unit (IMU) to measure the acceleration and rotation of the user 102 that may be used to estimate position and orientation. With respect to weather, the environmental identification module 210 may check camera and microphone data against publicly available data for comparison of weather conditions to identify the user location.

It may be understood that in order to improve the accuracy of the identification, the environmental identification module 210 may combine data from multiple sensors, identify and correct errors, identify outlines, learn relationships between sensors, integrate new sensors, and/or adapt to changing conditions.

In an embodiment, the security module 212 may verify the user 102 based on the optimal point and the identified current location. The verification may correspond to location verification, authentication, authorization, and/or auditing of resources security for a verified location.

In an embodiment, the autonomous virtual navigation module 214 may calculate location and direction based on the optimized data pertaining to the determined first position point, second position point, and/or third position point. The calculated location and direction may be non-satellite locations and directions that may be utilized above ground, underground, indoors, and underwater. In some embodiments, such location and directions may facilitate the users 102 with a navigational system on Earth as well as other celestial objects (such as other planets, moon, and stars) that do not have the satellite navigational system as developed on the Earth. The autonomous virtual navigation module 214 may utilize the AR VPPs to provide more accuracy indoors and underground with the use of Inertial Navigation System (INS) libraries. For example, when underwater, the AR VPPs may be used to represent buoys and the location of the sun, enabling the system 110 to factor them and utilize the halfway point from the user device 104 to provide more accuracy underwater. Similarly, the autonomous virtual navigation module 214 may provide underground navigation. When above ground, the autonomous virtual navigation module 214 may utilize the digital map consisting of the earth's magnetic field and celestial objects to determine direction and location. In some embodiments, the angle between the compass needle (that always points towards the north magnetic pole) and the horizon may be used to calculate the magnetic declination that may in turn be used to determine the location of the device.

In some embodiments, the autonomous virtual navigation module 214 may utilize inertia (INS Libraries) and Dead Reckoning through a combination of accelerometers, gyroscopes, and magnetometers to calculate the user's position. The accelerometers may measure the user's acceleration, the gyroscopes may measure the user's rotation, and the magnetometers may measure the user's orientation. Further, the autonomous virtual navigation module 214 may utilize reflectometry to enhance inertia by measuring the distance between the INS and known landmarks to correct for the errors resulting from the gyroscopes and accelerometers. Further, the INSs may be enhanced by providing an independent measurement of the INS's position and velocity by using the reflectometer to measure the time it takes for a signal to travel from the INS to a known reflector and back. Further, the time of flight (TOF) may be used to calculate the INS's distance from the reflector that may be utilized to update the INS's position estimate. In an embodiment, the INS's velocity estimate may be improved by measuring the Doppler shift of the signal as it travels to and from the reflector since the Doppler shift is caused by the relative motion between the INS and the reflector. This may be used to calculate the INS's velocity.

In an embodiment, the data transfer module 216 may transmit data from the user device 104 by forming a signal that is spread over a wider bandwidth than necessary to transmit the data. In order to transmit the data, the data transfer module 216 may multiply the formed signal with a pseudorandom spreading sequence to spread the formed signal out over a wider bandwidth using an Ultra-WideBand (UWB) modulation. Then, the data transfer module 216 may send a radio wave, having the multiplied signal, to the ionosphere that may be refracted by the ionosphere for traveling to a distant location to a receiving device. It may be understood to a person skilled in the art that receiver of a receiving device may multiply the received radio wave with the same pseudorandom spreading sequence that was used for multiplying the signal to receive the data. The transmission of data through the data transfer module 216 may be discussed in detail in the following paragraphs.

Figure 3A:
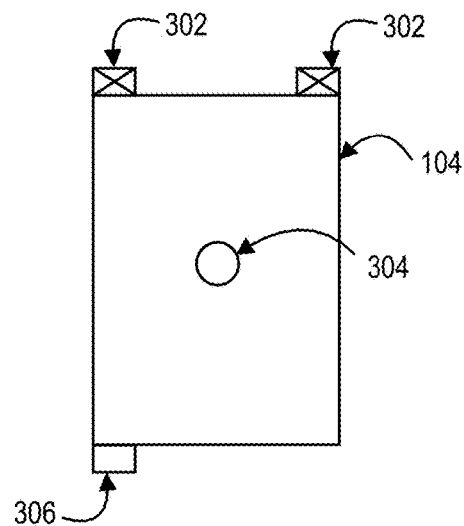
FIG. 3A illustrates a user device with minimum hardware components required to use a series of sensors to verify the integrity of GPS signals, in accordance with an embodiment of the present disclosure.
Figure 3B:
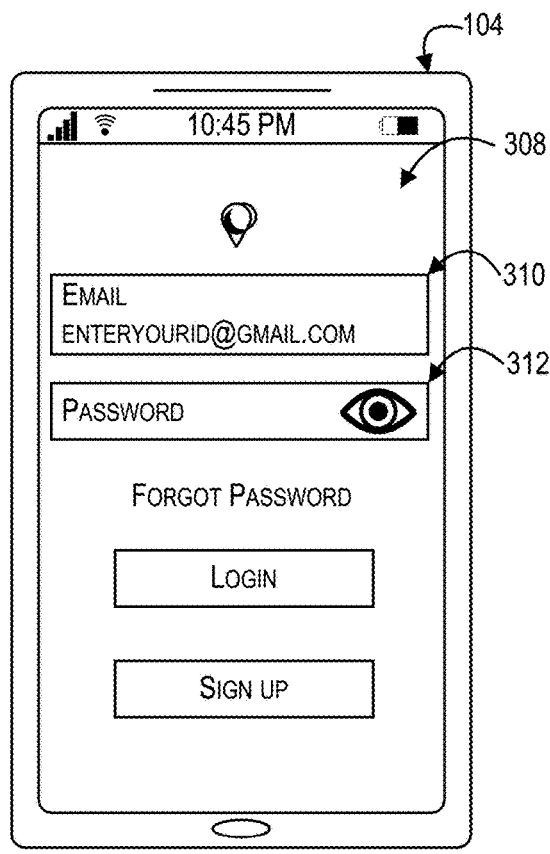
FIG. 3B illustrates a home user interface screen of the user device, in accordance with an embodiment of the present disclosure.
Figure 3C:
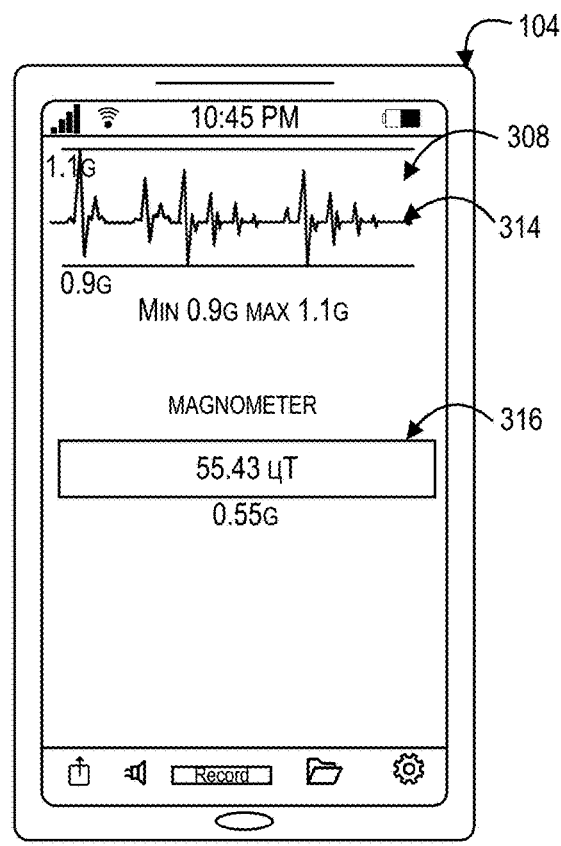
FIG. 3C illustrates a touch screen interface for the user device supporting functions and executable instruction, in accordance with an embodiment of the present disclosure.
Figure 3D:
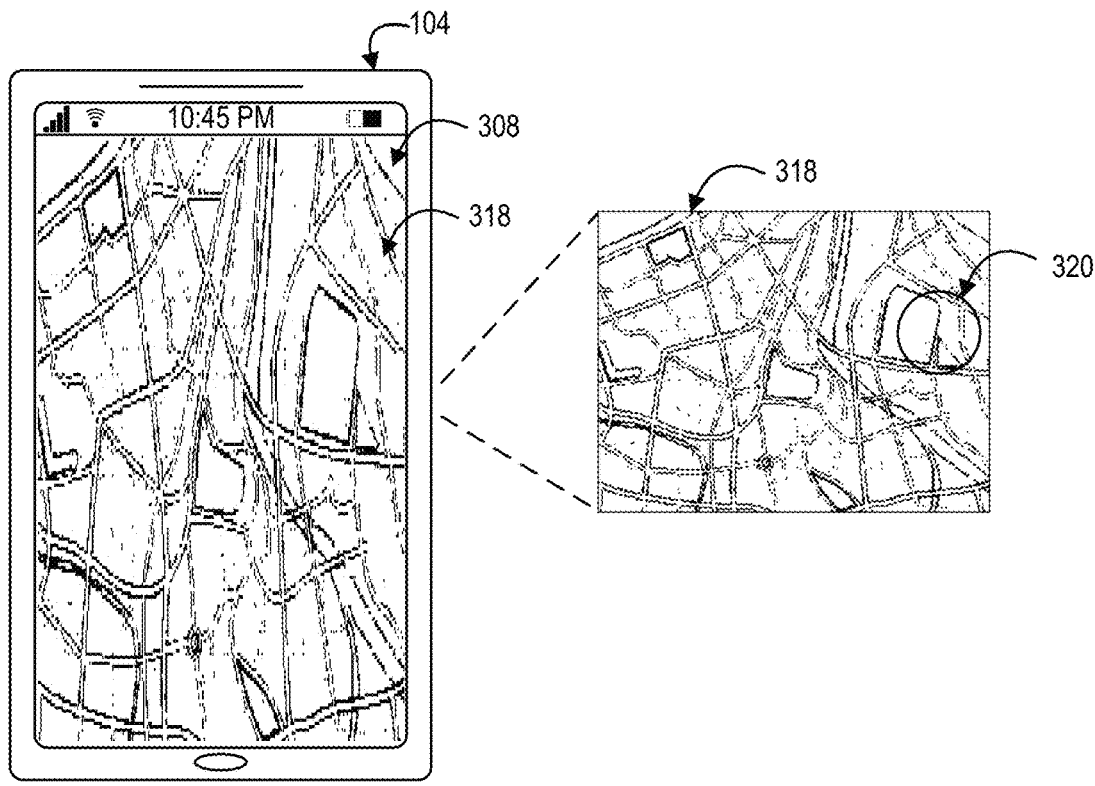
FIG. 3D illustrates a user interface showing a display output pertaining to approved verification of the user, in accordance with an embodiment of the present disclosure.

FIG. 3A illustrates the user device 104 with minimum hardware components required to use a series of sensors to verify the integrity of GPS signals, in accordance with an embodiment of the present disclosure. FIG. 3B illustrates a home user interface screen of the user device 104, in accordance with an embodiment of the present disclosure. FIG. 3C illustrates a touch screen interface for the user device 104 supporting functions and executable instruction, in accordance with an embodiment of the present disclosure. FIG. 3D illustrates a user interface showing a display output pertaining to approved verification of the user 102, in accordance with an embodiment of the present disclosure. For the sake of brevity, FIGS. 3A-3D have been explained together.

In an embodiment, as shown in FIG. 3A, the user device 104 may be an exclusive device for location-based security verification of the user 102. Such user device 104 may include one or more antennas 302, a camera 304, and a power connection 306. The one or more antennas 302 may facilitate capturing of GPS signals used to determine the direction of the signal and if the signal is not coming from the appropriate angle or strength then the data may be flagged for possible spoofing/jamming and alerts of the user. Further, the camera 304 may be an RGB camera sensor with a fish eye lens facing up to capturing 180 degrees of the sky. Furthermore, the power connection 306 may facilitate the user device 104 to attach with an existing power supply or a separate battery. Additionally, a solar power attachment may be added to prolong the duration between charges. In some embodiments, the user device 104 may include input/output modules for common wired and wireless protocols including, but not limited to, radio frequencies (RFID), WiFi, Bluetooth, and Near-Field communication and Ultra Wide Band. In some embodiments, the user device 104 may include a processor with an onboard clock to calculate the integrity of the GPS signal (that may be captured via a GPS sensor) against installed module components. Additionally, the user device 104 may include orientation components, such as a compass, gyroscope, and an accelerometer, to verify direction, horizon, and acceleration. The disclosed user device 104 for exclusive location-based security verification may be a minimum hardware modular device to geolocate using celestial objects, and ambient environment factors and to verify the integrity of GPS signals to prevent GPS spoofing or jamming.

In an embodiment, as shown in FIG. 3B, the user 102 may log into the user device 104 by entering user name 310 (such as email ID) and password 312 into the home user interface 308 of the user device 104. In an embodiment, as shown in FIG. 3C, the user device 104 may display a magnetometer reading graph 314 and magnetometer value 316 along with min and max values. Further, the user device 104 may utilize such magnetometer reading graph 314 to determine the location of the user device 104 without the use of any data or signal from satellites, as shown in FIG. 3D. Further, as illustrated, a digital map 318 may be created by utilizing such determined location of the user device 104 that may be further zoom-in to focus on the calculated location, user location, and/or trust zone, as shown by 320.

Figure 4:
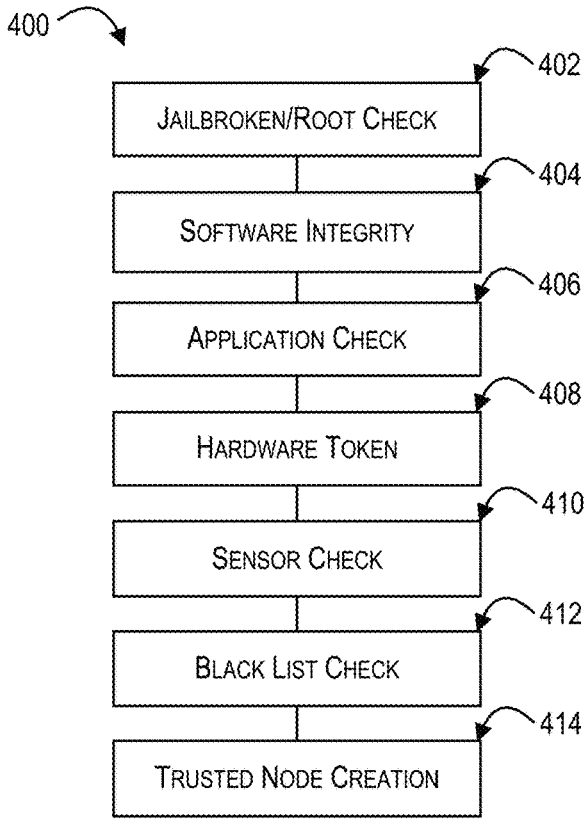
FIG. 4 illustrates a flowchart showing a process for determination of probability of authenticity of user device, signals, and location, in accordance with an embodiment of the present disclosure.

FIG. 4 illustrates a flowchart 400 showing a process for determination of probability of authenticity of the user device 104, signals, and location, in accordance with an embodiment of the present disclosure. In an embodiment, for determining the probability of authenticity of the user device 104, the system 110 may first determine that the user device 104 has not been hacked and/or the GPS location has been spoofed or jammed. Further, the system 110 may check if the user device 104 is jailbroken, rooted, and/or in developer mode, as shown in box 402. In an embodiment, the user device 104 may monitor latitude, longitude, altitude, speed, accuracy, and time. For example, while moving and not moving, a check may be done to determine if only latitude and longitude values are updated, a check may be done if altitude, speed, and accuracy remain constant, if speed remains 0, and if locations report in a perfectly straight line from the starting point to the endpoint. Next, the system 110 may check the integrity of the software that whether it has been tampered with, as shown by box 404. Next, the system 110 may check other installed applications to search for any application that may be used to spoof location, as shown by box 406. Next, the system 110 may create a unique token based on the readily available hardware information and stores it on a blockchain node, as shown by box 408. ARVPPs are created when two or more trusted tokenized users access the signal including, but not limited to, cell tower services, WiFi signals, Bluetooth beacons, or the like. Next, the system 110 may check the sensors such as gyroscope, compass, accelerometer, and microphone to ensure the user is not using an emulator, as shown by box 410. Next, the system 110 may compare the user device 104 with one or more blacklisted geofences, IP addresses, and Mac addresses, as shown by box 412. The system 110 may then perform a data packet check where two antennas capturing GPS signals are used to determine the direction of the signal, such that if the signal is not coming from the appropriate angle or strength then the data may be flagged for possible spoofing/jamming and alerts may be provided to the user 102. Next, the system 110 may create trusted nodes when two or more trusted tokenized users access the signal including, but not limited to, cell tower services, WiFi signals, Bluetooth beacons, or the like as shown by box 414.

Figure 5A:
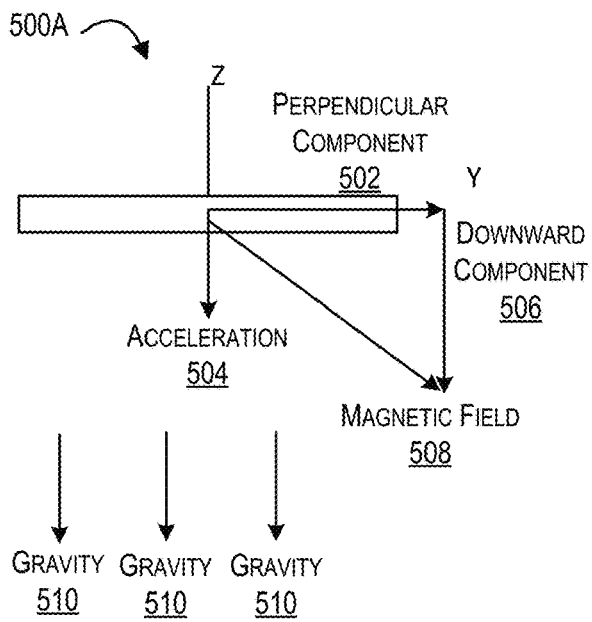
FIG. 5A illustrates a simplified overview of X, Y, and Z components of acceleration for a magnetic field, in accordance with an embodiment of the present disclosure.
Figure 5B:
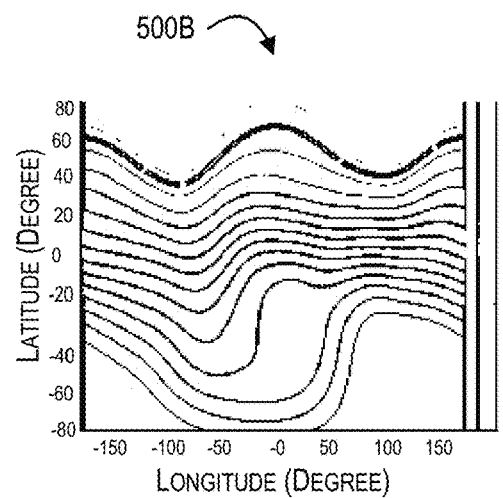
FIG. 5B illustrates a magnetic model to find all points on the surface of the Earth with a matching value for Bz, in accordance with an embodiment of the present disclosure.
Figure 5C:
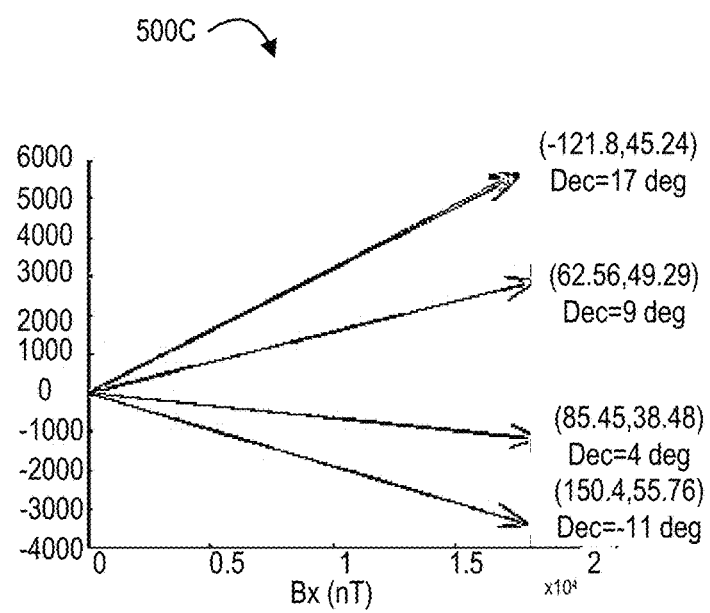
FIG. 5C illustrates a graph showing determined unique correct location, in accordance with an embodiment of the present disclosure.

FIG. 5A illustrates a simplified overview 500A of X, Y, and Z components of acceleration for a magnetic field, in accordance with an embodiment of the present disclosure. FIG. 5B illustrates a magnetic model 500B to find all points on the surface of the Earth with a matching value for Bz, in accordance with an embodiment of the present disclosure. FIG. 5C illustrates a graph 500C showing determined unique correct location, in accordance with an embodiment of the present disclosure. FIG. 5D illustrates a graph 500D showing rotation of the user device 104 and the yaw angle from the device's gyro, in accordance with an embodiment of the present disclosure. For the sake of brevity, FIGS. 5A-5D have been explained together.

In an embodiment, in order to calculate the first position point by the MMF model, the system 110 may first calibrate the user device 104 magnetometer to read z-components i.e., acceleration 504 in line with gravity 510, as shown in FIG. 5A. The magnetic model may help find all the points on the surface of the Earth with a matching value of Bz, as shown in FIG. 5B. Thereafter, the system 110 may then measure the magnitude of the magnetic field in the phone's x-y plane, the 'perpendicular component' 502. Further, there may only be a small discrete set of points that have the same downward component 506 and perpendicular values for the magnetic field 508. It may be noted that each of these points may have a different declination angle that predicts the heading to true North, such that as the yaw angle from the user device's gyro, as shown in FIG. 5D is tracked, the value at which the field has a maximum in the y-component may be set as magnetic north. Thereafter, the system 110 may determine that each candidate location may have a different declination angle of the perpendicular magnetic field, as shown in FIG. 5C. Thus, the unique correct location may be determined by measuring the x and y components of the magnetic field 508 as a function of the declination angle to match the correct direction from the MFF model. Graphical representations associated with one or more parameters and observations are shown in FIGS. 6A, 6B, 7A, 7B, 8A, 8B, 9A, and 9B.

Figure 7A:
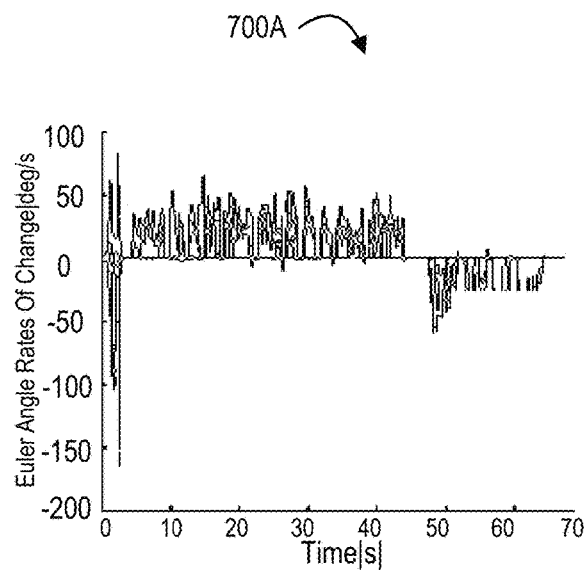
FIG. 7A illustrates a graph showing yaw angle recording using a gyrometer from 0 to 720 from two full rotations counterclockwise of the user device, in accordance with an embodiment of the present disclosure.
Figure 7B:
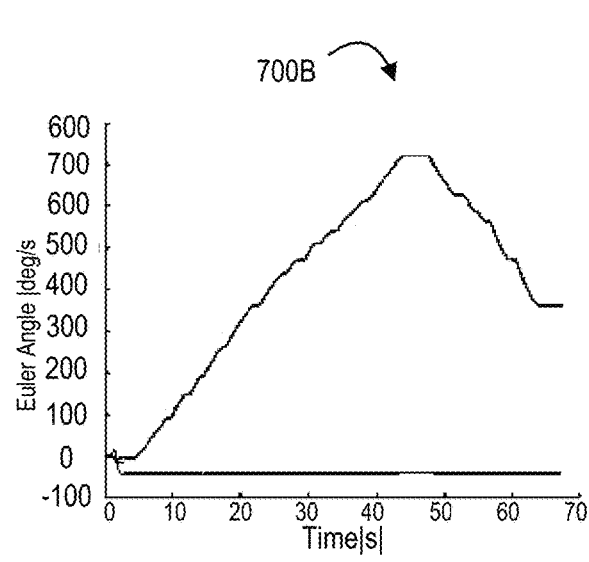
FIG. 7B illustrates a graph of angles obtained by integrating the time, in accordance with an embodiment of the present disclosure.
Figure 8A:
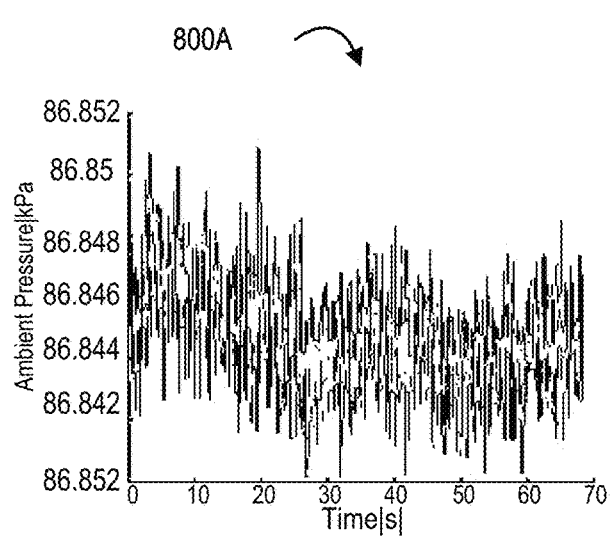
FIG. 8A illustrates a graph showing barometer reading of ambient pressure to adjust the user device altitude, in accordance with an embodiment of the present disclosure.
Figure 8B:
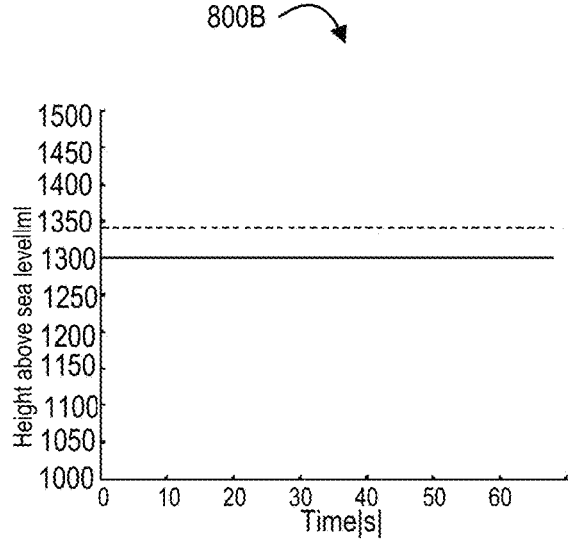
FIG. 8B illustrates a graph showing barometer reading with inverted pressure to altitude, in accordance with an embodiment of the present disclosure.
Figure 9A:
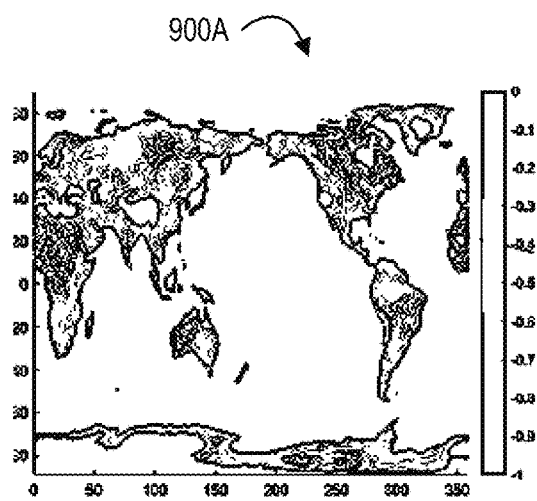
FIG. 9A illustrates a heat map depicting areas of similar altitudes based on the barometer, in accordance with an embodiment of the present disclosure.
Figure 9B:
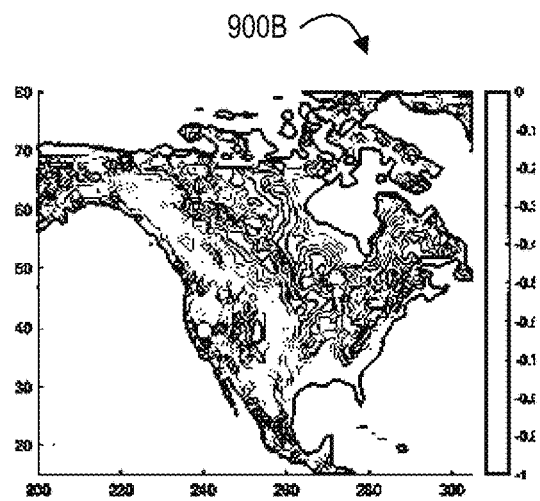
FIG. 9B illustrates the heat map zoomed to show a particular area, in accordance with an embodiment of the present disclosure.

In an embodiment, as shown in FIG. 6A, a graph 600A for running average of accelerometer being steady around gravitational acceleration. Further, the graph 600A may be zoomed on Az to obtain a graph 600B, as shown in FIG. 6B. In an embodiment, a graph 700A shows yaw angle recording using a gyrometer from 0 to 720 from two full rotations counterclockwise of the user device 104 is shown in FIG. 7A and a graph 700B of angles obtained by integrating the time is shown in FIG. 7B. In an embodiment, a graph 800A showing barometer reading of ambient pressure to adjust the user device's altitude is shown FIG. 8A, and a graph 800B showing barometer reading with inverted pressure to altitude is shown in FIG. 8B. In an embodiment, a heat map 900A depicting areas of similar altitudes based on the barometer is shown in FIG. 9A the zoomed heat map 900B to show a particular area is shown in FIG. 9B.

Figure 10:
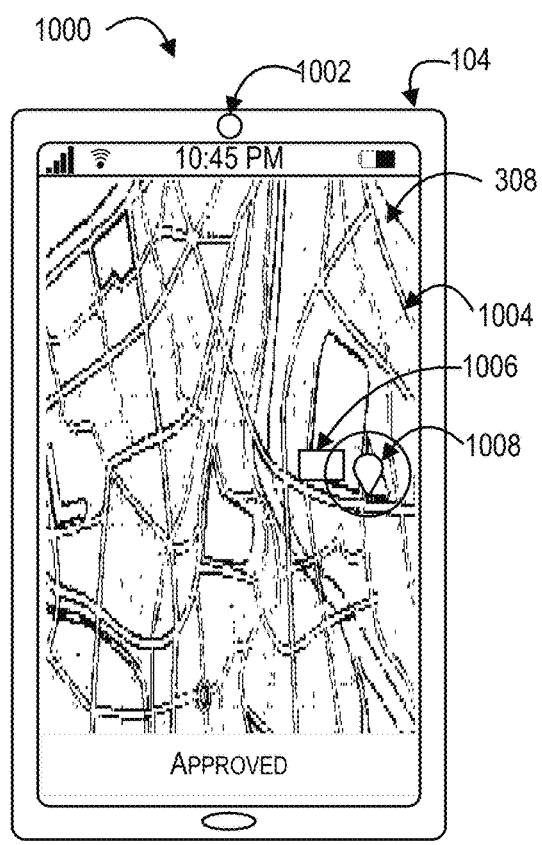
FIG. 10 illustrates a user interface during determination of probability of the user device being either indoor, outdoors, or in motion, in accordance with an embodiment of the present disclosure.

FIG. 10 illustrates a user interface 308 during determination of probability of the user device 104 being either indoors, outdoors, or in motion, in accordance with an embodiment of the present disclosure. In an embodiment, in order to calculate the second position point by the ARS model, the system 110 may first determine if the user device 104 is indoor or outdoor using the camera sensor, the microphone sensor 1002, strength of the GPS signal, the strength of the wireless signal, the strength of the cellular signal, the WiFi SSID, and location relevant to existing VPP on the digital maps. To determine the probability of the user device 104 is indoor, outdoor, or in a vehicle, the system 110 places a temporary ARVPP 1008 on a digital map 1004. The temporary ARVPP 1008 may be calculated based on a position point known from the magnetic field reading. Then, the latitude and the longitude accuracy may be utilized to create an ellipse on top of the digital map 1004 indicating the possible location of the user device 104.

In an embodiment, when the ellipse may be within a polygon of the digital map's 'building' layer 1006 then the system 110 may weigh the user device 104 more heavily to be indoors. Accordingly, the percent of the ellipse outside of the building layer 1006 may reduce the probability of the user device 104 being indoors. In another embodiment, since wireless signals (such as GPS and cellular signals) are typically stronger outdoors if the signals are strong then the probability of the user device 104 being outside is more towards the device being outside. Further, since wireless signals (such as WiFi) are typically for interior use if the signals are strong then the probability of the user device 104 being indoors is more. In some embodiments, the WiFi SSID may be compared against a database of the default SSIDs to identify and eliminate non-stationary signals such as mobile hotspots. Further, the user device 104 microphones may capture ambient sounds to identify wind and other noises to determine if the user device 104 is inside or outside. In an embodiment, the user device 104 may check the gyroscope, compass, and accelerometer to see if the location has changed. Additionally, the user device 104 may emit a short burst of high-frequency sound and listens for its echo to determine if the user device 104 is in an enclosed location. Also, based on the time of day, the user device's camera may check the ambient brightness and number of light sources to determine if the user device 104 is indoors or outdoors.

Figure 11:
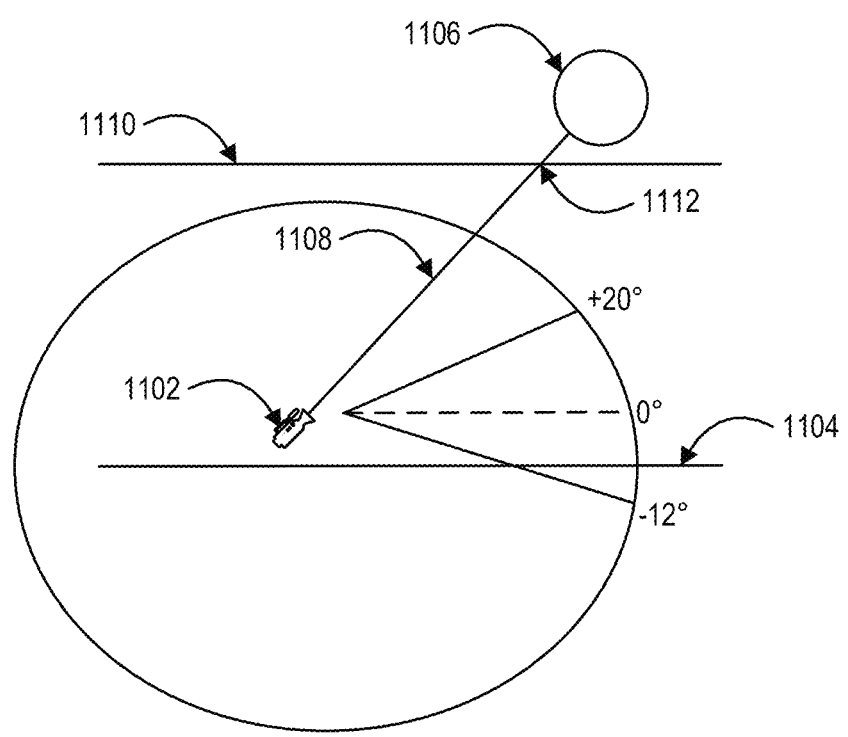
FIG. 11 illustrates obfuscation of light from a celestial object, in accordance with an embodiment of the present disclosure.

FIG. 11 illustrates obfuscation of light from a celestial object, in accordance with an embodiment of the present disclosure. In an embodiment, for the purpose of explanation of the cloud cover detection algorithm, if it is determined that the user device 104 is outdoors, then the system 110 may utilize the orientation and direction of the camera 1102 of the user device 104 derived from its gyroscope, compass, and accelerometer. Further, the system 110 may compare it against publicly available cloud elevation and cloud cover maps. In an embodiment, the user 102, who is on the ground 1104, may be instructed to point the camera 1102 at the brightest celestial object 1106. When the camera 1002 points at the specified celestial object 1106, then a ray cast 1108 may be drawn from the center of the camera 1102 towards the specified celestial object 1106, and a transparent grayscale cloud depth map 1110 may be generated and added in a hidden layer to the augmented reality scene. Further, pixel 1112 at the intersection of the ray cast 1108 and the cloud depth map 1110 may be recorded and used to calculate how much light from the specified celestial object 1106 is obfuscated. In an embodiment, the grayscale depth map 1110 may have a min value of 0 and a max value of 255, such that zero equals no clouds and 255 are completely opaque clouds. For example, the user 102 may be instructed to point at the sun on a partly cloudy day, and if the pixel reading from the intersection of the ray cast 1108 and cloud depth map 1110 is 128 out of a possible 255 then the system 110 may determine that the sun's light would be 50% of its maximum brightness.

Figure 12A:
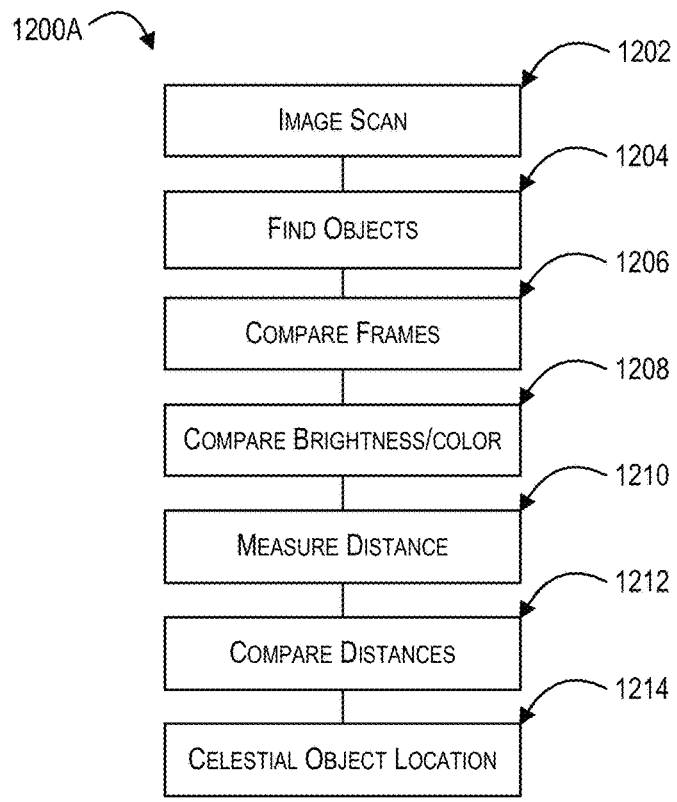
FIG. 12A illustrates a flow chart for calculation of location of the celestial object, in accordance with an embodiment of the present disclosure.
Figure 12B:
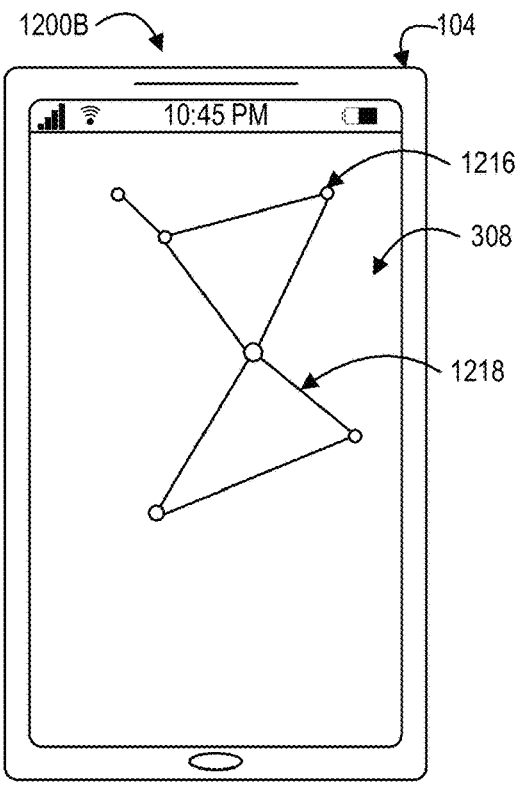
FIG. 12B illustrates a user interface pertaining to calculation of location of the celestial object, in accordance with an embodiment of the present disclosure.

FIG. 12A illustrates a flow chart 1200 for calculation of location of the celestial object, in accordance with an embodiment of the present disclosure. FIG. 12B illustrates a user interface 308 pertaining to calculation of location of the celestial object, in accordance with an embodiment of the present disclosure. For the sake of brevity, FIGS. 12A-12B have been explained together to discuss the operation of the constellation detection algorithm.

The system 110 may perform a scan to automatically identify stars, planets, and constellations and use this information to geolocate the origin of the measurement. At first, the system 110 scans the image/video or stream for light-emitting objects against a dark background, at step 1202. Based on the image scan, the system 110 may detect/find objects, at step 1204. Then, the system 110 adds the object to a list and compares this list to the next frame (if available), at step 1206, to remove airplanes, drones, or other non-stationary aerial or orbiting objects, as shown by 1216 in FIG. 12B. Upon comparison of the frames, the system 110 may capture and compare relative brightness and color of known stars and planets, at step 1208. Once all objects are identified in said frame, the relative distance 1218 between each object may be measured on a flat plane, at step 1210. Thereafter, the distances between the objects may be tallied and compared to known distances between star constellations, at step 1212 to identify the constellation. Once the constellation may be identified beyond the acceptable threshold, the system 110 may check the date/time and directional orientation of the camera to geolocate the image data source, at step 1214. Accordingly, the constellation detection algorithm may map the constellation in order to determine what is the brightest celestial object(s) as input into the VAPN digital sextant.

In an embodiment, the shadow detection algorithm may be associated with the utilization of shadows to determine a more accurate position point because they provide a reference point that may be used to measure the position of other objects. For example, to determine the position of a tree, the shadow of the tree may be used to measure the angle of the sun. Once the angle of the sun is known, basic trigonometry may be used to calculate the position of the tree and store that in a virtual position point using Augmented Reality. In an embodiment, the shadows may be used in solar navigation to determine the position of the sun by measuring the length of the shadow of an object at a known time of day. Such length of the shadow may then be used to calculate the angle of the sun above the horizon and the position of the sun may be calculated using trigonometry. In another embodiment, the shadows may be used in triangulation to determine the distance between two objects by measuring the angle between the shadows of the two objects at a known time of day. Such measured angles between the shadows may then be used to calculate the distance between the two objects using trigonometry. In yet another embodiment, the shadows may be used in astronomical navigation to determine the position of stars by measuring the length of the shadow of an object at a known time of day. Such length of the shadow may then be used to calculate the altitude of the star above the horizon and once the altitude of the star is known, the position of the star may be calculated using trigonometry.

Figure 13A:
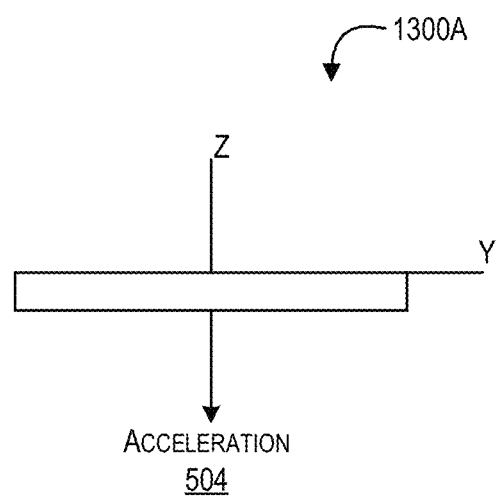
FIG. 13A illustrates a plane showing direction of acceleration in a y-z plane, in accordance with an embodiment of the present disclosure.
Figure 13B:
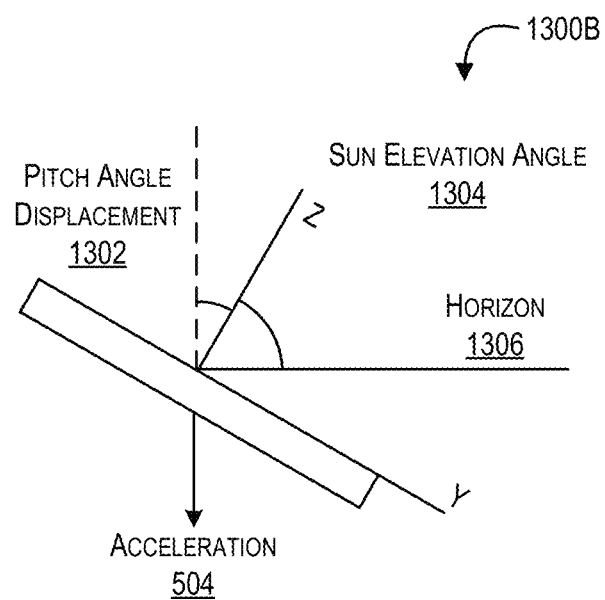
FIG. 13B illustrates a relation between pitch angle displacement, the sun elevation angle, horizon, and acceleration, in accordance with an embodiment of the present disclosure.

FIG. 13A illustrates a plane 1300A showing direction of acceleration in a y-z plane, in accordance with an embodiment of the present disclosure. FIG. 13B illustrates a relation 1300B between pitch angle displacement 1302, the sun elevation angle 1304, horizon 1306, and acceleration 504, in accordance with an embodiment of the present disclosure. For the sake of brevity, FIGS. 13A-13B have been explained together to discuss the digital sextant calculation.

In an embodiment, the digital sextant calculation may be utilized to calculate the user location by using the magnetic field position point to execute the digital sextant for predicting the celestial object's azimuth and elevation angle 1304 based on the pitch angle displacement 1302 and acceleration 504. Further, the magnetic field may be used to calibrate the sensors in the digital sextant by determining the true north. In an embodiment, if the user device 104 is outdoor then the sensors may be adjusted autonomously to compensate for any errors in their readings to improve the accuracy of the digital sextant. In operation, by following the instructions on the screen of the user device 104, the user 102 may follow an arrow that directs them to the celestial object (such as the sun) with the maximum luminous intensity of the camera sensor of the user device 104. In an embodiment, a spatial mapping may be used to track the angular displacement from the known orientation of the device to position the virtual horizon in AR and the latitude may be calculated using the angle determined between the celestial object and horizon 1306 when the declination of the celestial equator is 0 degrees. In some embodiments, a second celestial object with the next highest luminous intensity may be selected that is at least 30 degrees apart from the previous celestial object and the longitude may be calculated using the angle between the prime meridian and the Earth's surface at the device's location. The calculated latitude and the longitude may be utilized to derive the position point. In an embodiment, if the user device 104 is indoor then the AR VPP may be used to represent the celestial object using an API to retrieve real-time data of the object's position using the optimal time from open solar. The interface of the user device 104 may inform the user 102 to point the screen towards the AR VPP and this ARVPP is the position point. It may be noted that the second AR VPP may not be needed due to the accuracy of the data retrieved from the API.

Figure 14A:
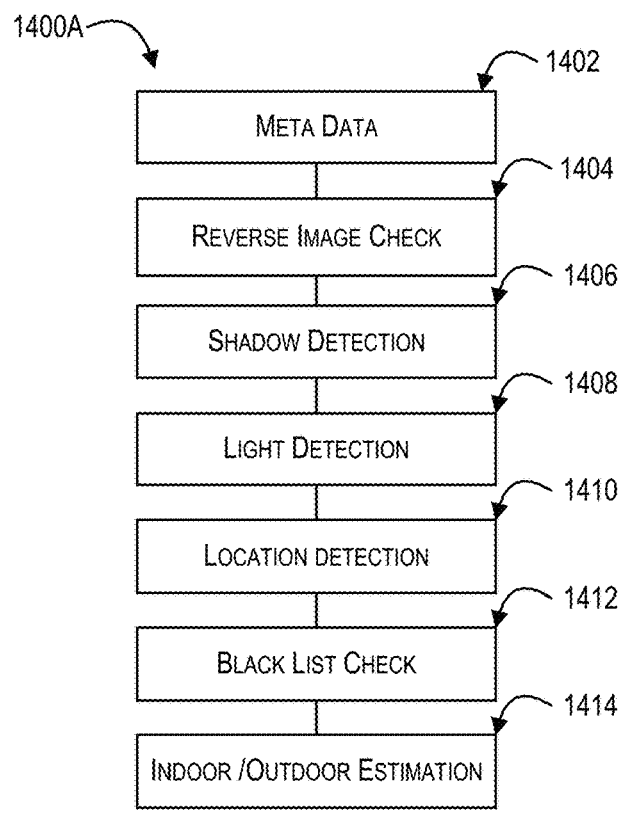
FIG. 14A illustrates a flow chart for estimation of whether the user is indoor or outdoor, in accordance with an embodiment of the present disclosure.
Figure 14B:
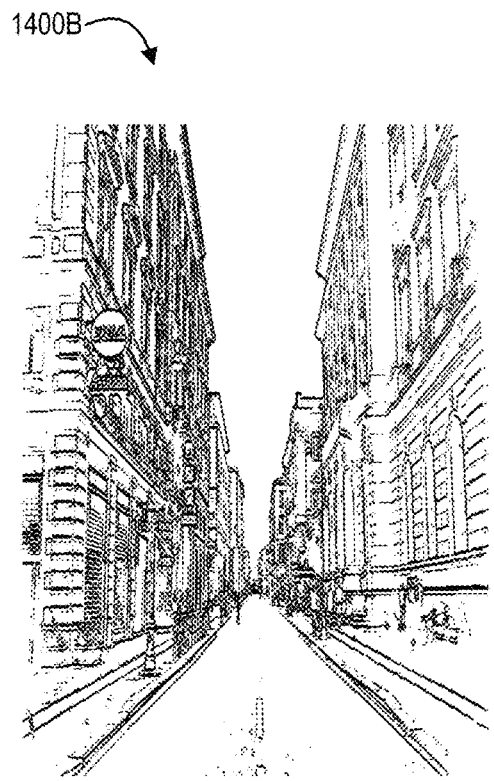
FIG. 14B illustrates an image showing various features in an environment for determining location of the user, in accordance with an embodiment of the present disclosure.

FIG. 14A illustrates a flow chart 1400A for estimation of whether the user 102 is indoor or outdoor, in accordance with an embodiment of the present disclosure. FIG. 14B illustrates an image 1400B showing various features in an environment for determining location of the user 102, in accordance with an embodiment of the present disclosure. For the sake of brevity, FIGS. 14A-14B have been explained together.

In an embodiment, the digital media algorithm may be utilized to identify whether the user is indoor or outdoor based on image, video, and 3D scan data.

At first, the system 110 may attempt to read the metadata of the file, as shown by box 1402, for the time the image 1400B was created and the location it was taken. Next, the system 110 may check the internet in a reverse image/video search to cross-reference the metadata, as shown by box 1404. In an embodiment, if there is no available metadata then the system 110 may attempt to find the first version uploaded to the internet and then processes the image through various filters to detect shadows, as shown by box 1406. Further, the detected shadow may be utilized to measure the shadow distance and direction using the shadow algorithm. Then, the system 110 may determine the light strength, as shown by box 1408, and the camera determines the light source direction using the camera sensor. Thereafter, the system 110 may utilize the best guess date and time from the metadata/reverse image search, weather data, and the light intensity to detect the location, as shown by box 1410. In order to detect the location, once the data and time are confirmed, the position of the sun (if available) may be compared against data from the digital map. Further, using the optimal time and time from the metadata/reverse image search, weather data, and the light intensity the system 110 may provide a probability of the location of the image. Additionally, upon blacklisting checking, as shown by box 1412, the system 110 may provide a probability if the image was taken indoors or outdoors based on the detection of one or more light sources and shadows, as shown by box 1414.

Figure 15A:
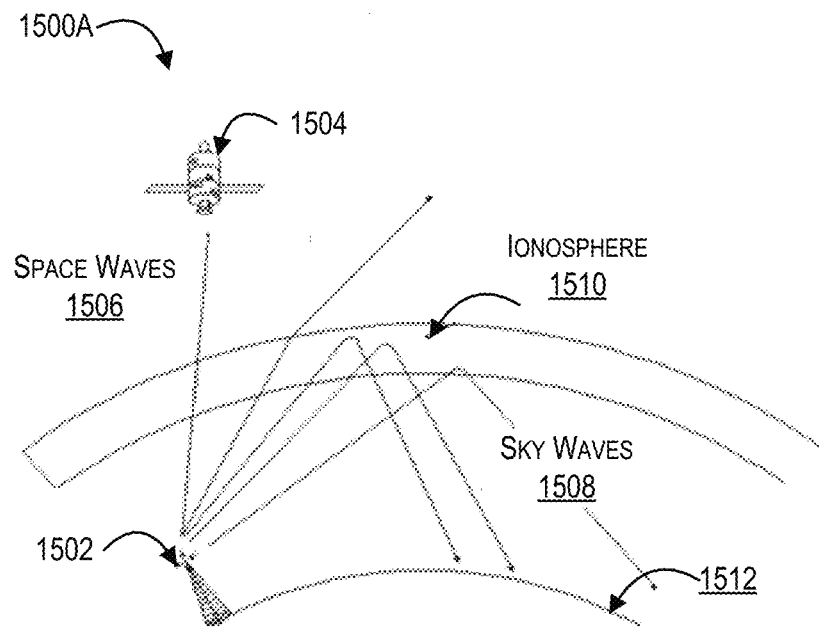
FIG. 15A illustrates transmission of radio signals through sky waves, in accordance with an embodiment of the present disclosure.
Figure 15B:
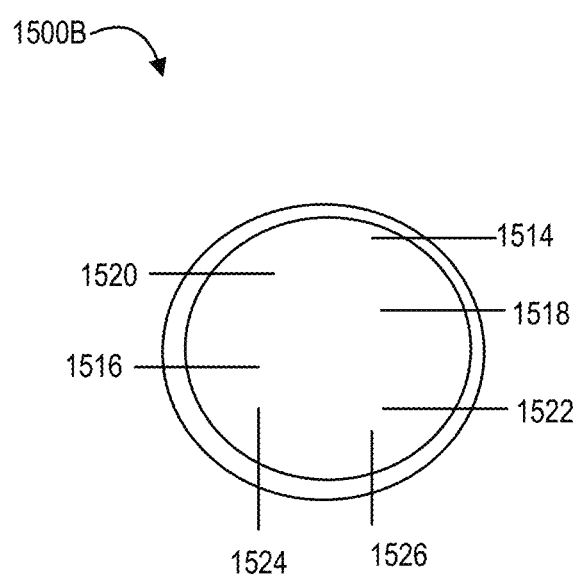
FIG. 15B illustrates a diagram of a Printed Circuit Board (PCB) containing core sensors, and wireless and Global Positioning System (GPS) components, in accordance with an embodiment of the present disclosure.
Figure 15C:
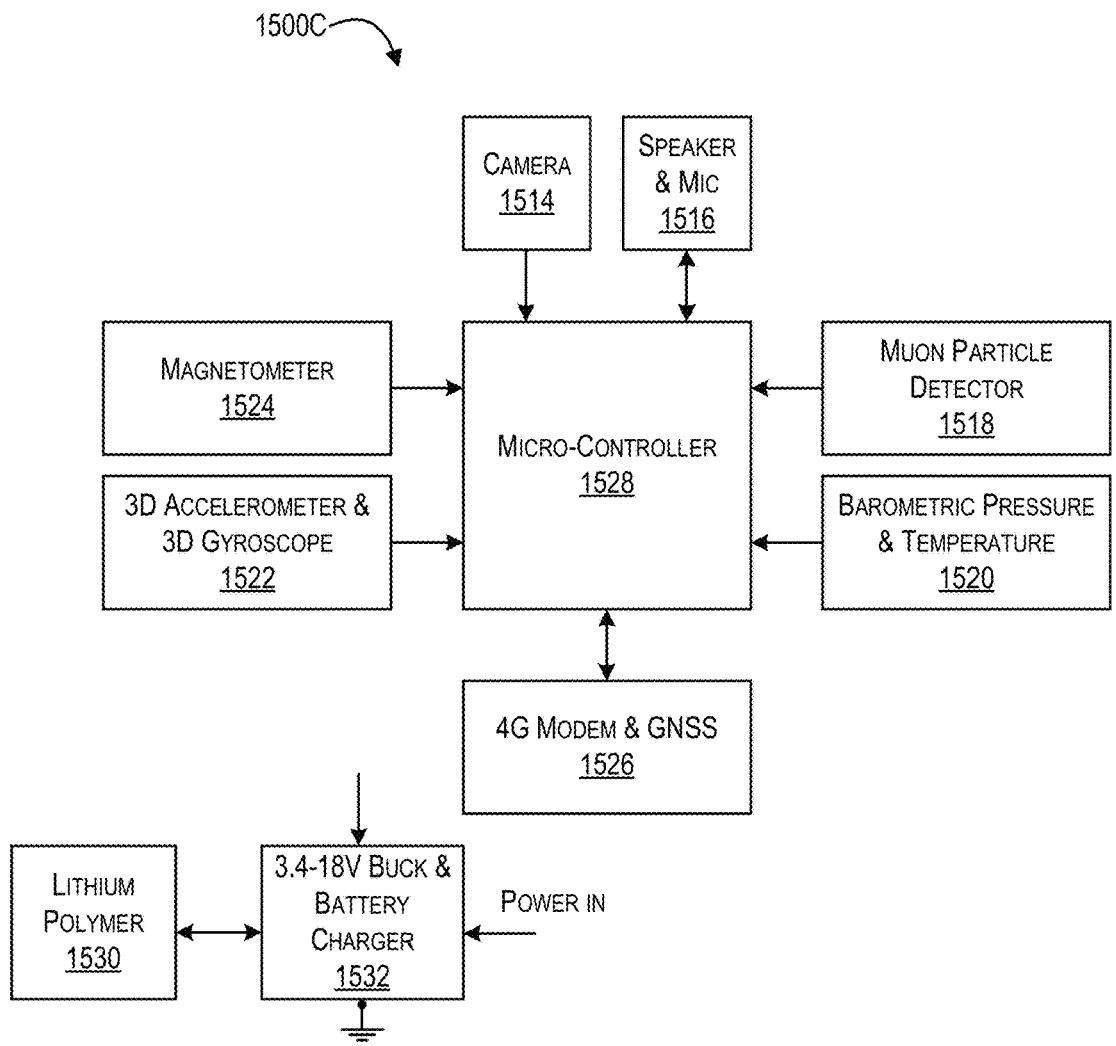
FIG. 15C illustrates a block diagram of the PCB, in accordance with an embodiment of the present disclosure.

FIG. 15A illustrates transmission 1500A of radio signals through sky waves 1508, in accordance with an embodiment of the present disclosure. FIG. 15B illustrates a diagram of a Printed Circuit Board (PCB) 1500B containing core sensors, and wireless and Global Positioning System (GPS) components, in accordance with an embodiment of the present disclosure. FIG. 15C illustrates a block diagram 1500C of the PCB, in accordance with an embodiment of the present disclosure. For the sake of brevity, FIGS. 15A-15C have been explained together.

In an embodiment, as illustrated in FIG. 15A, the system 110 may transmit data above ground, underground, and/or underwater without the use of satellites 1504, space waves 1506, or wireless technologies. Further, continuous communication may be enabled using ultra-wideband ionospheric scatter and high-frequency sky waves 1508 to extend mesh networks in parallel with ground station communications. In an embodiment, High-frequency (HF) waves may be coded into ultra-wideband (UWB) signals using direct sequence spread spectrum (DSSS) involving spreading the signal over a wider bandwidth than is necessary to transmit the data. In an embodiment, the data signal may be multiplied with a pseudorandom spreading sequence to spread the data signal out over a wider bandwidth using UWB modulation to make the data signal less susceptible to interference and jamming. Next, multiple data signals may be transmitted on the same frequency band without interfering with each other. Thereafter, a transmitter 1502, located on the ground 1512, sends a radio wave into the ionosphere 1510. Such radio waves may be refracted by the ionosphere 1510 and travel to a distant location. In an embodiment, the receiver of the receiving device may multiply the received signal with the same spreading sequence that was used to encode the data signal to recover the original data signal. In an embodiment, the ground station may transmit a DSSS signal. Further, the mesh network may be made up of ELF, HF, and THz, three different frequency bands. It may be noted that the ELF waves have frequencies in the range of 3 to 30 Hz and are the lowest frequency waves that can propagate through the Earth's atmosphere. The ELF waves may be used for underwater communication and navigation. Further, the HF waves have frequencies in the range of 3 to 30 MHz and are used for long-distance radio communication. Furthermore, the THz waves have frequencies in the range of 0.3 to 3 THz and are the highest frequency waves that can propagate through the atmosphere. The THz waves may be used for underground communications.

In an embodiment, as illustrated in FIGS. 15B and 15C, the PCB 1500B may include a camera 1514, a speaker and microphone 1516, a muon particle detector 1518, a barometric pressure and temperature detector 1520, a 3D accelerometer and 3D gyroscope 1522, a magnetometer 1524, a 4G model and GNSS 1526, a micro-controller 1528, a lithium polymer 1530, and a buck and battery charger 1532.

In an embodiment, the camera 514 may be used to collect data that can be used to improve location accuracy, such as the direction of the camera 1514 and the amount of light in the environment. This data can be used to improve the accuracy of the location algorithms by providing them with more context about the environment in which the image was taken. In an embodiment, the camera 1514 may measure RGB intensity on millions of pixels per frame. In an embodiment, the speaker and microphone 1516 may be used to collect other data that can be used to improve location accuracy, such as the direction of the sound source and the type of sound source. This data can be used to improve the accuracy of the location algorithms by providing them with more context about the environment in which the sound was recorded. In an embodiment, the microphone may measure sound intensity in an 8-channel stereo. In an embodiment, the device can be attached to an existing power supply or a separate battery. Alternatively, or additionally, a solar power attachment can be added to prolong the duration between charges. Further, the device may include input/output modules for common wired and wireless protocols including, but not limited to, radio frequencies, WiFi, Bluetooth, and Near-field communication. Further, the device may include a dedicated processor chip with an onboard clock to calculate the integrity of the GPS signal against installed module components. Further, the device may include an onboard GPS unit used as a baseline for GPS signals from satellites and two antennas capturing GPS signals used to determine the direction of the signal. In scenarios where the signal is not coming from the appropriate angle or strength, the data is flagged for possible spoofing/jamming and alerts the user.

In an embodiment, the compass and magnetometer may be utilized to measure the Earth's magnetic field by taking a calibrated measurement of each of the magnetic field vector's 3 components that can be combined to determine the direction of true north. Further, the device also includes an altimeter and barometer to determine altitude by measuring air pressure. For example, as altitude increases, air pressure decreases because the density of air is lower (thinner) at high altitudes. In an embodiment, the device may include a gravimeter for measuring the gravitational field of Earth at specific locations and acceleration due to gravity for measuring altitude and used to mathematically calculate Latitude as a redundancy check. In an embodiment, the device may include an accelerometer to measure proper acceleration i.e., the acceleration (the rate of change of velocity) of a body in its own instantaneous rest frame and may be different from coordinate acceleration, which is acceleration in a fixed coordinate system. In an embodiment, the device also includes a gyroscope to measure the angular rate of change and keeps track of angular position given a reference frame.

Figure 16:
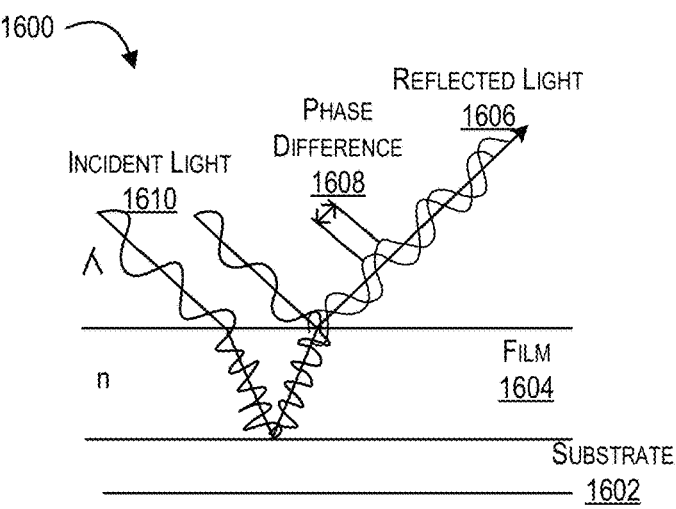
FIG. 16 illustrates movement of electromagnetic radiations that can be analyzed to infer properties of a surface, in accordance with an embodiment of the present disclosure.

FIG. 16 illustrates a movement 1600 of electromagnetic radiations that can be analyzed to infer properties of a surface, in accordance with an embodiment of the present disclosure. In an embodiment, the system 110 may automatically identify if a medical pill has been compromised using reflectance spectroscopy to determine the properties of a surface by measuring the light that is reflected from it and then measured. In an embodiment, a database may store the wavelength data from an FDA-approved medical pill and an "unknown" pill may be subjected to a beam of light 1610, from the device, of a wavelength is shone onto a film 1604 of a substrate 1602, and the amount of light that is reflected 1606 with phase difference 1608 may be measured by the device. The amount of light that is reflected may depend on the wavelength of the light from the properties of the surface of the "unknown" pill. Further, by measuring the amount of light that is reflected at different wavelengths, coded reflectance spectroscopy may be used to determine the optical properties of the surface of the "unknown" pill. The system 110 may determine if the measurement is an observation that lies an abnormal distance from the approved range in the stored data. If a pill was compromised in a way that causes the pill to have an unusual shine, the reflectance of the pill will be different from the reflectance of a stored data pill shine data that was manufactured in a typical way. This difference in reflectance may allow the system 110 to identify tampered medications. Similarly, the system 110 may be utilized to study the surfaces, such as the earth's surface or the surface of any other celestial body. In an embodiment, additional checks may be performed using the camera sensor to determine if a pill has any unusual patterns or features. In one scenario, if a pill has a coating, the reflectance of the pill will be different from the reflectance of a pill without a coating and this difference in reflectance can be used to identify pills that have been coated. In another scenario, if a pill has an unusual shape, the reflectance of the pill will be different from the reflectance of a pill with a regular shape and this difference in reflectance can be used to identify pills that have an unusual shape. Additionally, the information may be sent to a database to cross-reference the data and inform the user of the probability of contamination.

FIGS. 17A-17H illustrate various user interfaces pertaining to implementation of the system, in accordance with an embodiment of the present disclosure. For the sake of brevity, FIGS. 17A-17H have been explained together.

Figure 17A:
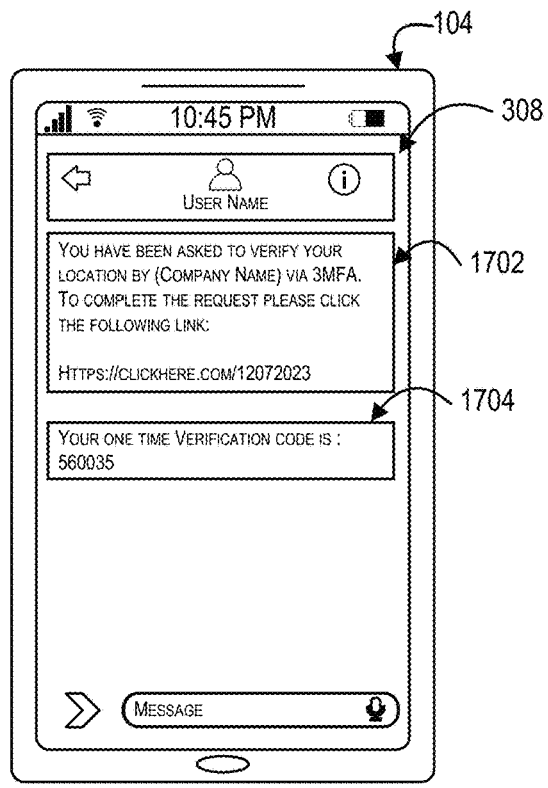
FIGS. 17A-17H illustrate various user interfaces pertaining to implementation of the system, in accordance with an embodiment of the present disclosure.
Figure 17B:
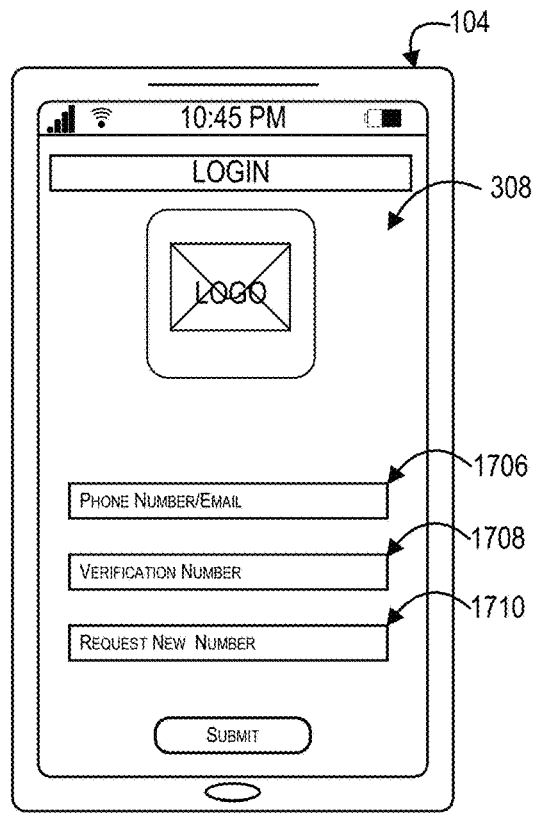
Figure 17C:
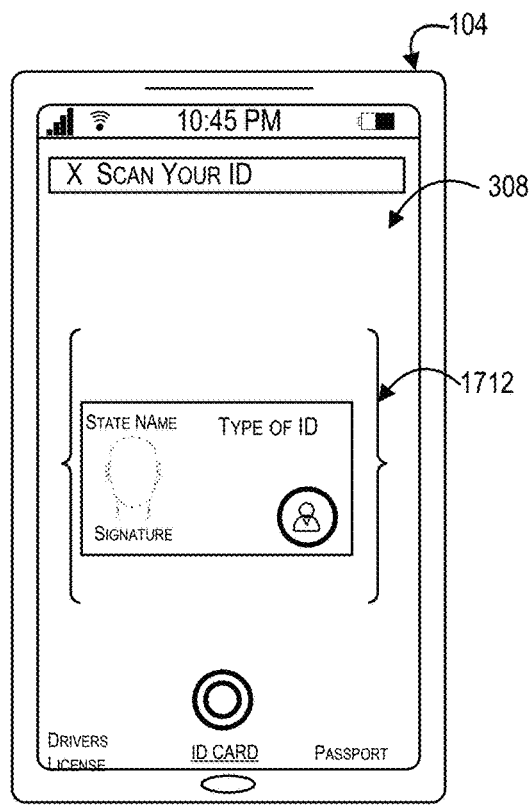
Figure 17D:
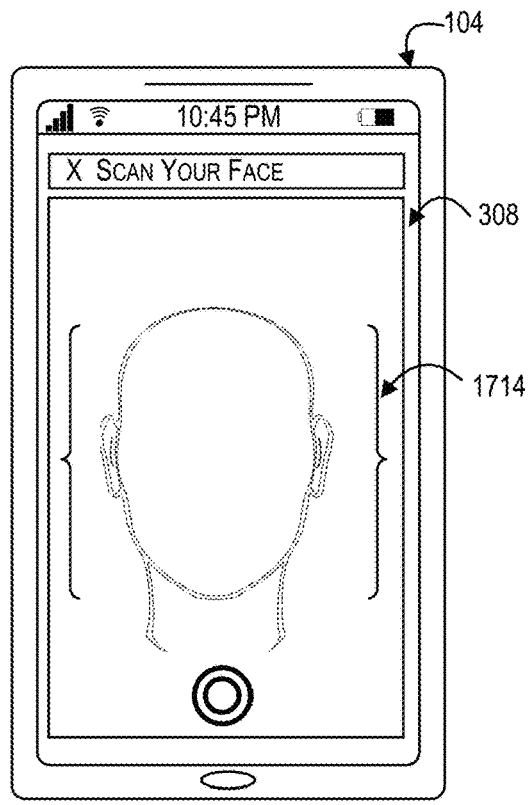
Figure 17E:
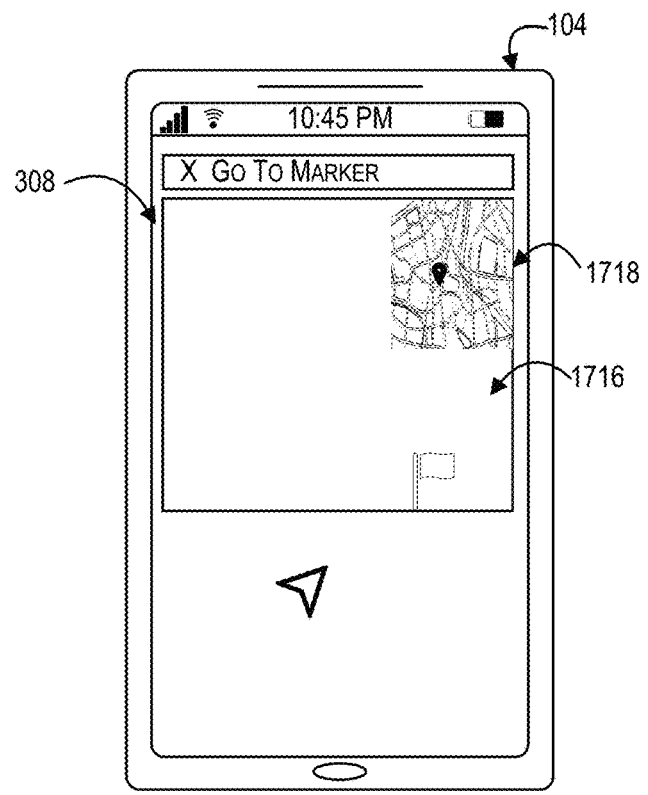
Figure 17F:
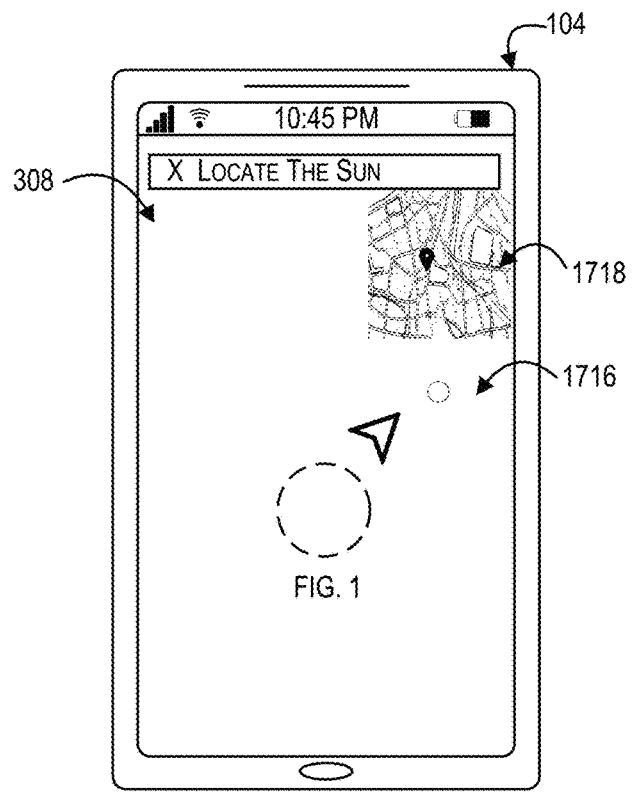
Figure 17G:
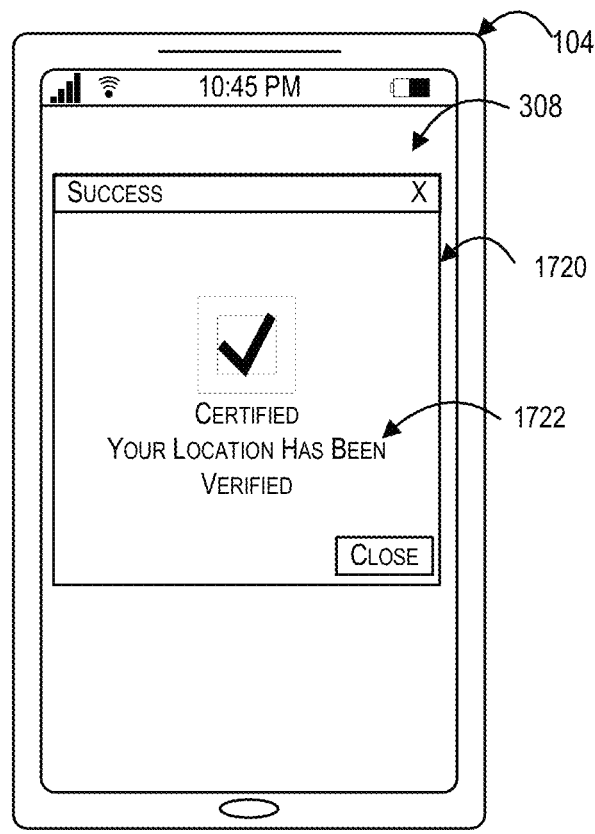
Figure 17H:
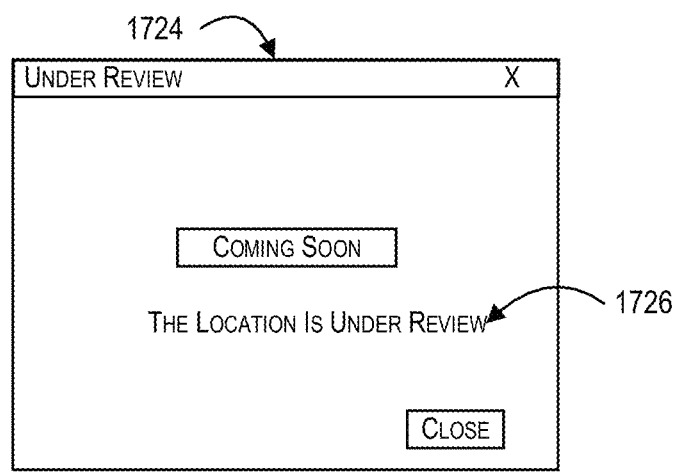

In case the user is not registered, as shown in interface 308 of FIG. 17A, the system 110 may prompt the user 102 to register with the VPN for verification of the location 1702. In an embodiment, for the registration, the user 102 may create new credentials and register his phone number/device with the VPN. When requested for the registration, a link (as shown by 1702 in the interface 308) may be sent to the user 102 via SMS or the like. Exemplary representation of an interface to input the user credential such as phone number/email 1706 is shown in interface 308 of FIG. 17B. In an embodiment, a first Multi-Factor Authentication (MFA) may be achieved via another other means of authentication, known to a person skilled in the art. For example, face recognition, fingerprint scanning, eye recognition, and so on may also be implemented to achieve the first MFA.

In an embodiment, the system 110 may perform the second MFA. Upon completing the first MFA, the user 102 may be redirected to a page to input a code that may be dynamically generated by the system 110 upon the completion of the first MFA. The generated code may be sent to registered user device 104 of the user 102 in real-time, as shown by 1704 in the interface 308 of FIG. 17A. The user 102 may input the code to achieve the second MFA as shown by 1708. In an embodiment, the code may be numeric. The code needs to be inputted into the system 110 with a predefined time limit, to avoid the expiry of the code. In an embodiment, the second MFA may fail when code is inputted incorrectly for a predefined number of times, or upon expiry of the code. However, the system 110 may facilitate an option to request number 1710. In an alternate embodiment, the second MFA may be achieved by sending an access link to the user device 104, where the user 102 needs to click the link to complete the second MFA. In an alternate embodiment, a notification to confirm that the user 102 is trying to log into the VPN is sent to the registered number of the user 102. One or more other means, known to a person skilled in the art, to verify the user 102 may be implemented to achieve the second MFA.

In an embodiment, the system 110 may perform user identity verification. Upon the second MFA, the system 110 may control the camera of the user device 104 to perform the user identity verification. The system 110 may turn ON the camera and bring a live stream session. If the user 102 does not have a scanned ID stored in the system 110, the system 110 may prompt the user to scan an ID 1712 of the user 102. Using computer vision, an application installed in the user device 104 may scan the ID placed in front of the camera as shown in interface 308 of FIG. 17C. Upon scanning, the system 110 may determine the type of the ID and retrieve data mentioned in the ID. The data may include the state/country the ID is issued from, ID number, details of the user, facial markers of the user 102, and so on. In an embodiment, the photograph of the user 102 may be scanned to retrieve the facial markers and eye color of the user 102 from the ID. In an embodiment, the retrieved data may be displayed to the user 102 and the user 102 may verify the details and store them in a database associated with the system 110. Further, in real-time, upon the second MFA, the user 102 may be prompted to scan the face 1714 as shown in interface 308 of FIG. 17D. With such scan, real-time facial parameters of the user 102 may be retrieved and compared with pre-stored facial markers to complete the user identity verification.

In an embodiment, the system 110 may perform a third MFA. Upon completion of the first MFA, the second MFA and the user identify verification, the third MFA may be initiated by the system 110. The user 102 may be instructed to go outdoors and capture an image of a celestial body. Rendezvous location for performing the third MFA may be the nearest safest location with an unobstructed view of the sky. Once the user 102 reaches the location, the system 110 may instruct the user to point at the brightest celestial object at the time of the verification request, as shown in interfaces 308 of FIG. 17E and FIG. 17F. During the daytime, the celestial object may be the sun. During the nighttime, the celestial object may be a moon, star, or visible planet. The celestial object and location of the user 102 are determined by the timestamp of the verification request and the GPS of the devices running the application related to the system 110. The determined data is streamed based on the system 110 via the application for the verification. In an embodiment, the determined data is cross references to publicly available cloud cover maps to identify acceptable luminosity, ambient audio levels, and other users' data. Based on the administrators' parameters, the user 102 may be approved for the grant to access the VPN as shown in interface 308 of FIG. 17G upon verification of the location of the user 102, as shown by 1722 in window 1720. In another embodiment, the system 110 may deny the access to the user 102 or put the user's location under review, as shown by 1726 in window 1724 of FIG. 17H.

Figure 18:
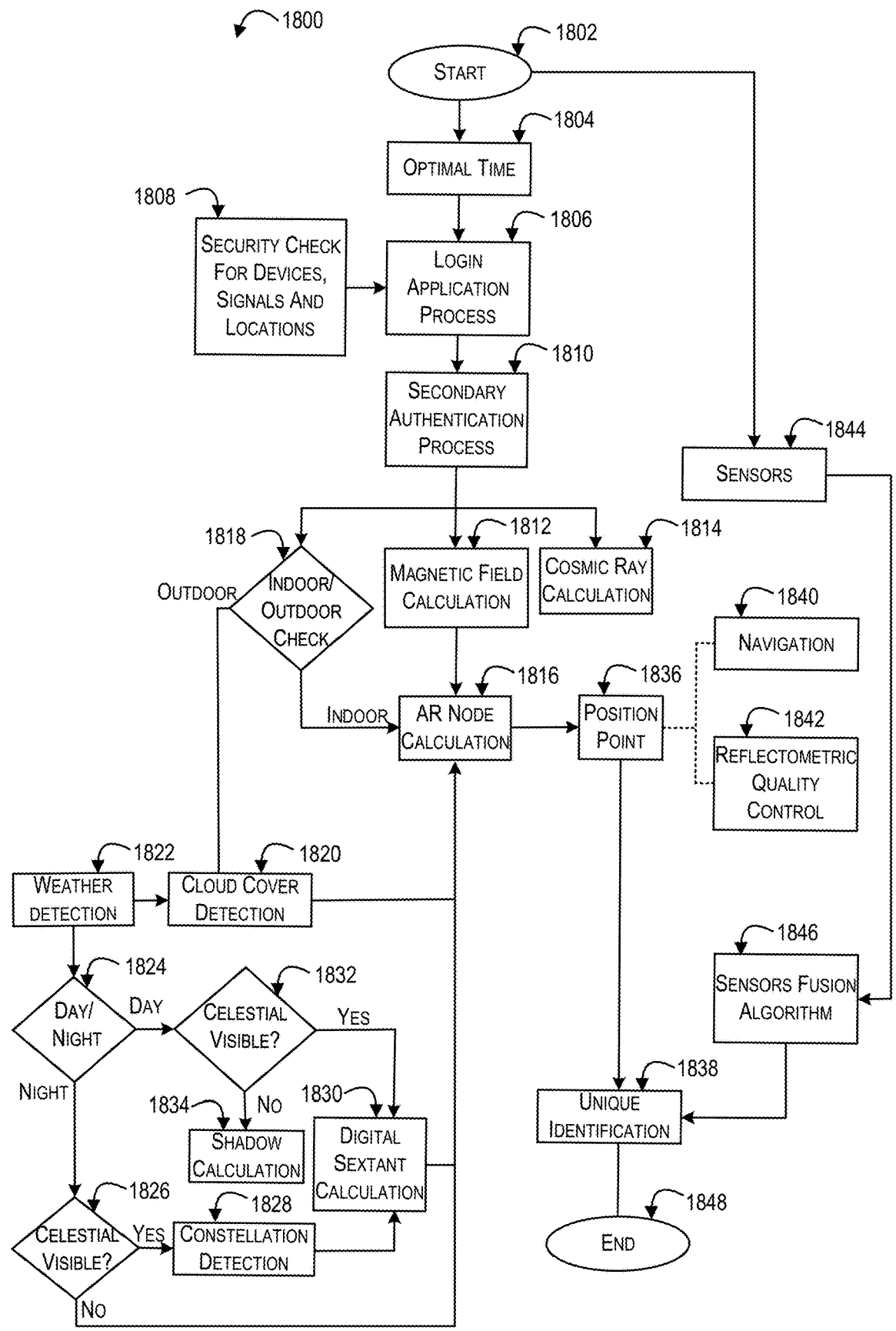
FIG. 18 illustrates a flowchart illustrating an exemplary operation of the system, in accordance with an embodiment of the present disclosure.

FIG. 18 illustrates a flowchart 1800 illustrating an exemplary operation of the system 110, in accordance with an embodiment of the present disclosure. The operation starts at 1802. In an embodiment, at first, the system 110 may determine an optimal time, as shown by box 1804, and may execute a login application process, as shown by box 1806. For the execution of the login application process 1806, the system 110 may also perform security checks for devices, signals, and location, as shown by box 1808. Then, the system 110 may secondary authentication process, as shown by box 1810. In an embodiment, upon performing the secondary authentication process, the system 110 may calculate the magnetic field, as shown by box 1812, and cosmic ray, as shown by box 1814. Additionally, the system 110 may check if the user device 104 is indoor/outdoor, as shown by box 1818, and may direct AR node calculation, as shown by box 1816, if the user device 104 is indoor. Further, if the user device 104 is outdoor, then the system 110 may perform cloud cover detection, as shown by box 1820, and weather detection, as shown by box 1822. Upon detecting the weather, the system 110 may detect whether it's day or night, as shown by box 1824. In one scenario, if its day then the system 110 may check if the celestial object is visible, as shown by box 1832, and calculate shadow if the celestial object is not visible, as shown by box 1834, or perform digital sextant calculation if the celestial object is visible, as shown by the box 1830. In another scenario, if its night then the system 110 may check if the celestial object is visible, as shown by box 1826, and may direct AR node calculation, as shown by box 1816, if no celestial object is visible, or perform digital sextant calculation if the celestial object is visible, as shown by the box 1830. Upon performing the digital sextant calculation, the system 110 may perform the AR node calculation to determine a position point, as shown by box 1836. In an exemplary embodiment, the determined position point may be used for navigation, as shown by box 1840, and reflectometric quality control, as shown by box 1842. In an embodiment, the position point may also be utilized for unique identification of the user device, as shown by box 1838. In another embodiment, the position point may be used together with the location detected via sensors 1844 and the sensors fusion algorithm 1846 for uniquely identifying the user device 104. The operation may end at 1848.

Figure 19:
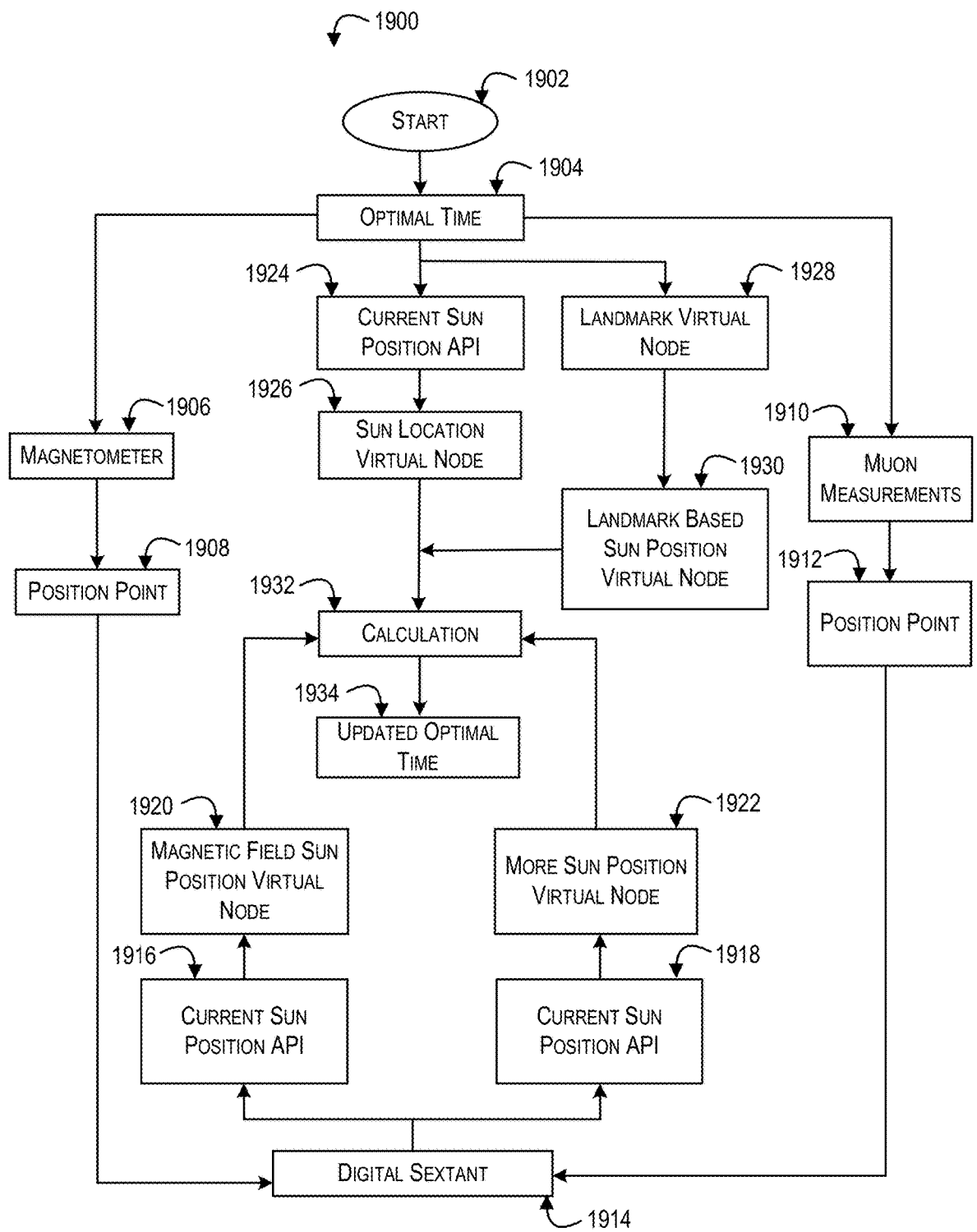
FIG. 19 illustrates a flowchart illustrating another exemplary operation of the system to update optimal time, in accordance with an embodiment of the present disclosure.

FIG. 19 illustrates a flowchart 1900 illustrating another exemplary operation of the system 110 to update optimal time, in accordance with an embodiment of the present disclosure. The operation starts at 1902. In an embodiment, at first, the system 110 may determine an optimal time, as shown by box 1904. Upon calculating the optimal time, the magnetometer 1906 may be used to calculate the first position point 1908 and a muon measure measurement 1910 may be used to calculate the second position point 1912. Then, the first position point 1908 and the second position point 1912 may be provided to the digital sextant, as shown by box 1914, to calculate the current sun position API 1916, 1918. In one scenario, the calculated current sun position API 1916 may be provided to the magnetic field sun position virtual node for outputting the first-time coefficient, as shown by box 1920. In another scenario, the calculated current sun position API 1918 may be provided to more sun position virtual nodes for outputting a second-time coefficient, as shown by box 1922. Additionally, a current sun position API may be calculated upon calculation of the optimal time at 1904, as shown by box 1924, and may be provided to the sun location virtual node, as shown by box 1926, for outputting a third-time coefficient. Additionally, upon calculation of the optimal time at 1904, the landmark virtual node may also be executed, as shown by box 1928, followed by a landmark-based sun position virtual node, as shown by box 1930, to correlate with the third time coefficient. In an embodiment, the first-time coefficient, the second-time coefficient, and the correlated third-time coefficient may be used for performing calculation 1932 to obtain updated optimal time 1934.

Figure 20:
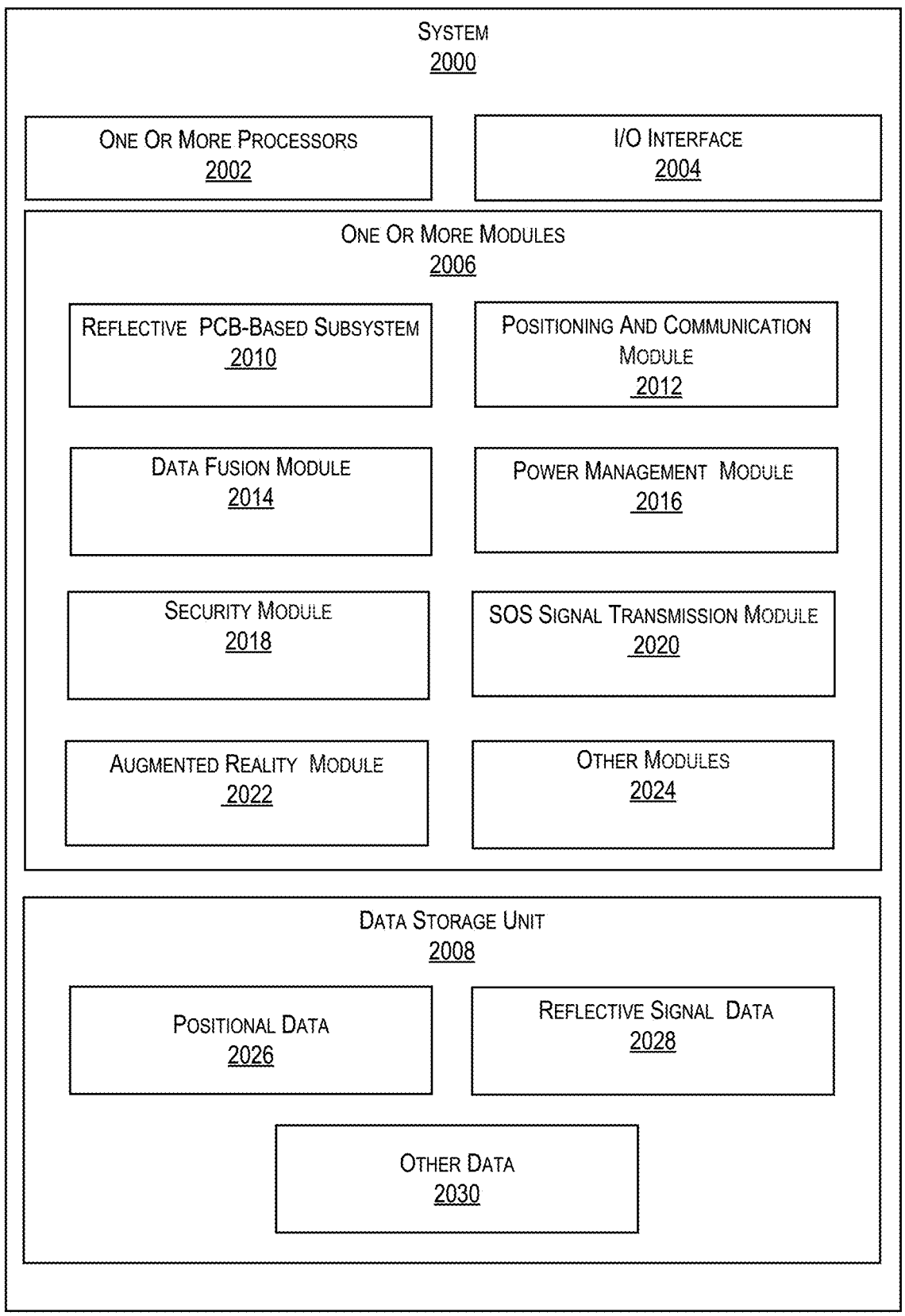
FIG. 20 illustrates a block diagram for the system for providing location-based positioning and navigation in GPS-denied environments, in accordance with an embodiment of the present disclosure.

FIG. 20 illustrates a block diagram for the system 2000 for providing location-based positioning and navigation in GPS-denied environments, in accordance with an embodiment of the present disclosure. In an embodiment, the system 2000 may include one or more processors 2002, an Input/Output (I/O) interface 2004, one or more modules 2006, and a data storage unit 2008. The one or more processors 2002 may be implemented as one or more microprocessors microcomputers, microcomputers, digital signal processors, central processing units, state machines, logic circuitries, and/or any devices that manipulate signals based on operational instructions. Further, the I/O interface 2004 may serve as the pivotal bridge connecting the internal processes of the system 2000 with its external environment for facilitating the exchange of information between the system 2000 and its users or external devices. Furthermore, the I/O interface 2004 may contribute to the user experience by providing intuitive means for input, such as through keyboards or touchscreens, and presenting meaningful output via displays or other output devices. In an embodiment, the one or more modules 2006 may include a reflective PCT-based subsystem 2010, a positioning and communication module 2012, a data fusion module 2014, a power management module 2016, a security module 2018, an SOS signal transmission module 2020, an augmented reality module 2022, and any other module 2024 essential or required for the working of the system 2000. In an embodiment, the data storage unit 2008 may include the positional data 2026, reflective signal data 2028, and any other data 2030 required for the working of the system 108. In an embodiment of the present disclosure, the one or more processors 2002 and the data storage unit 2008 may form a part of a chipset installed in the system 2000. In another embodiment of the present disclosure, the data storage unit 2008 may be implemented as a static memory or a dynamic memory. In an example, the data storage unit 2008 may be internal to the system 2000, such as an onside-based storage. In another example, the data storage unit 2008 may be external to the system 2000, such as cloud-based storage. Further, the one or more module 2006 may be communicatively coupled to the data storage unit 2008 and the one or more processor 2002 of the system 2000. The one or more processors 2002 may be configured to control the operations of the one or more modules 2006.

In an embodiment, the positional data 2026 may correspond to information that determines the physical location of an object or user within a specific area or environment. In GPS-denied environments, the positional data 2026 may be derived from alternative technologies such as time-domain reflectometry (TDR), very low frequency (VLF) signals, ultra-wideband (UWB) communication, or other spatial sensing methods. The positional data 2026 may be processed in real time to provide accurate location information for navigation and tracking purposes. Further, the reflective signal data 2028 may correspond to the information obtained from signals that are reflected off surfaces or objects within an environment. The reflective signal data 2028 may be used to calculate distances or determine locations by measuring the time delay (in time-domain reflectometry, for instance) or analyzing the strength of reflected signals. The reflective signal data 2028 may play a critical role in environments where direct line-of-sight signals, such as GPS, are unavailable, allowing for the mapping and positioning of objects or individuals. In an embodiment, the other data 2030 may include communication protocol data corresponding to the set of rules, formats, and parameters governing the exchange of information between different modules or devices within the system 2000. The communication protocol data may include details about how signals (e.g., vlf, uwb, or other radio frequencies) are transmitted, received, and interpreted. The communication protocol data may ensure that all system components can reliably communicate, coordinate, and share information for positioning, navigation, and data fusion. In another embodiment, the other data 2030 may include security authentication data corresponding to the information and credentials used to verify the identity of users or devices interacting with the system. The security authentication data may ensure that access to positional, navigation, or communication functions is restricted to authorized entities. The security authentication data may include encryption keys, user credentials, digital certificates, or biometric information, and may protect the system 2000 from unauthorized access, tampering, or malicious activity.

In an embodiment, the reflective printed circuit board (PCB) subsystem 2010 may incorporate integrated traces for Time Domain Reflectometry (TDR) analysis for generating reflection points, facilitating indoor location tracking through varying impedance levels. Further, one or more fractal antennas may be included on the PCB 2010 to support multi-band and wide-band capabilities, improving signal reception and transmission for VLF and UWB modes. The transition between VLF and UWB modes may be managed by an adaptive protocol framework that continuously assesses environmental factors, signal quality, and operational needs to ensure smooth navigation and communication. Further, the reflective PCB subsystem 2010 may feature trace geometry and material selection optimized for TDR-based signal reflection, ensuring accurate distance measurement and enhanced navigation indoors.

In an embodiment, the positioning and communication module 2012 may receive reflection data and operate in either Very Low Frequency (VLF) or Ultra-Wideband (UWB) modes, selected based on environmental conditions and application requirements as determined from the reflection data. The positioning and communication module 2012 may facilitate accurate location tracking and reliable navigation by continuously adapting its operational mode to optimize performance, ensuring seamless communication and positioning even in GPS-denied environments. Thus, the positioning and communication module 2012 may integrate advanced protocols, enhance signal quality, and maintain communication integrity, crucial for effective indoor positioning and navigation solutions.

In an embodiment, the data fusion module 2014 may integrate location tracking information from both VLF and UWB modes, enhancing the accuracy and reliability of the positioning and navigation data. By analyzing the integrated diverse data, the data fusion module 2014 may improve the overall precision of the positioning solution, ensuring that users receive the most accurate navigational information possible. Further, the data fusion module 2014 may integrate additional data from environmental sensors, such as accelerometers, gyroscopes, and magnetometers, to enhance positioning accuracy in conditions with magnetic anomalies or underground environments. Such integration may further refine positioning accuracy, especially in challenging environments with magnetic anomalies or other obstacles, and allow for a more robust and reliable navigation experience in GPS-denied areas.

In an embodiment, the power management module 2016 may optimize power consumption by adjusting operational modes in real time, based on environmental factors, thus extending battery life while maintaining signal integrity and navigation precision. The power management module 2016 may dynamically adjust operational modes based on real-time environmental factors, ensuring that the system 2000 can operate efficiently while maximizing battery life. In an embodiment, the power management module 2016 may employ energy efficiency protocols to maximize device longevity, operating in low-power VLF mode and higher-power UWB mode as required. Such adaptability not only extends the device's longevity during continuous use but also maintains signal integrity and navigation precision, providing users with reliable performance without compromising power efficiency.

In an embodiment, the security module 2018 may employ advanced error correction codes and automatic repeat request strategies to ensure data integrity. The security module 2018 may employ advanced error correction codes and automatic repeat request strategies to ensure that data transmitted over Very Low Frequency (VLF) and Ultra-Wideband (UWB) channels remains intact and reliable. Further, the security module 2018 may utilize AES-256 encryption and frequency hopping techniques for secure data transmission across VLF and UWB channels. Thus, by prioritizing both data security and communication reliability, the security module 2018 may ensure that users can trust the system 2000 in critical applications where the protection of sensitive information is paramount.

In an embodiment, the SOS signal transmission module 2020 may transmit SOS signals through UWB and VLF communication channels, allowing emergency signals to include SOS messages, location data, and environmental information. The SOS signal transmission module 2020 may send emergency signals that include not only a standard SOS alert but also essential location and environmental data, ensuring that first responders or designated contacts can receive real-time information about the user's situation. By leveraging the system 2000 advanced positioning capabilities, the SOS signal transmission module 2020 may enhance the chances of prompt assistance in GPS-denied environments, ultimately improving safety and response times during emergencies. In an embodiment, a user interface may display real-time operational status and enable users to select between VLF and UWB modes based on specific navigation scenarios.

In an embodiment, the augmented reality (AR) module 2022 may enhance the user experience by overlaying critical navigational data and environmental information directly onto the user's device display. The overlaying of critical data and environmental information may provide a real-time, immersive view that may facilitate the users to navigate effectively in challenging environments where traditional GPS signals may be unavailable. Leveraging advanced generative AI (GenAI), the AR module 2022 may dynamically adjust the content displayed based on current environmental conditions and user interactions, ensuring that the information remains relevant and contextually appropriate. By integrating AR with location-based services, the users benefit from an intuitive and interactive navigation experience that enhances situational awareness and facilitates more informed decision-making while on the move.

Figure 21:
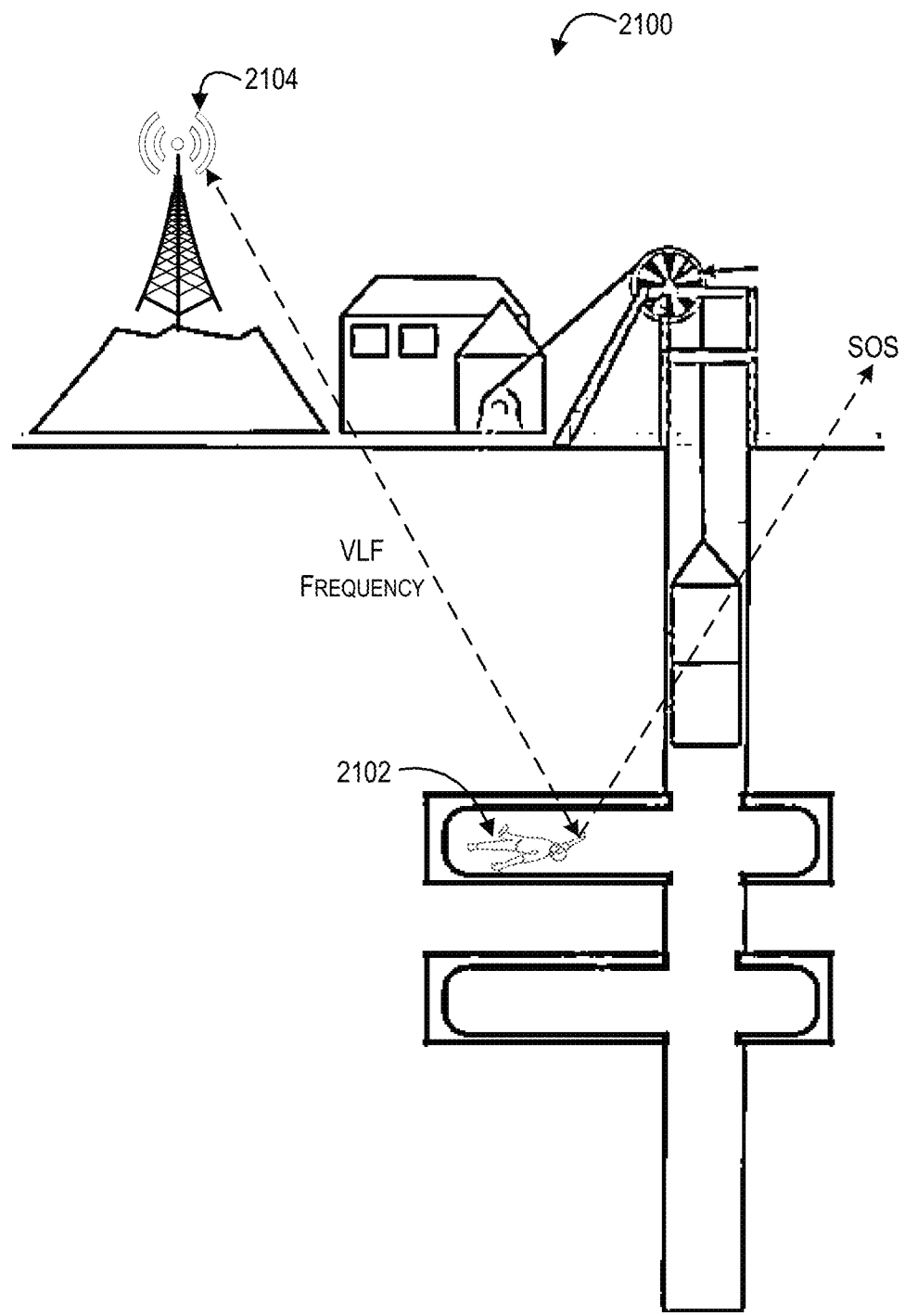
FIG. 21 illustrates an exemplary scenario of an user stuck in challenging environment; in accordance with an embodiment of the present disclosure.

FIG. 21 illustrates an exemplary scenario 2100 of an user stuck in challenging environment; in accordance with an embodiment of the present disclosure.

In an illustrated scenario, where a user 2102 is stuck in a cave and needs to send an SOS signal, the integrated system 2000 within a user device such as a mobile phone or a smartwatch activates a series of automated processes designed for emergency situations. Upon realizing that user 2102 is in distress, sensors associated with the system 2000 may detect environmental factors, such as reduced visibility and limited connectivity, may trigger a SOS signal transmission protocol.

At first, the system 2000 may analyze the cave's indoor environment using Time Domain Reflectometry (TDR) to establish reflection points through physical anchor points like time signal transmitter 2104, which helps determine the user 2102 precise location within the cave. This data may then be processed by the positioning and communication module, which may evaluate whether to operate in Very Low Frequency (VLF) or Ultra-Wideband (UWB) mode, depending on signal integrity and the surrounding conditions. Next, the SOS signal transmission module may prepare an emergency message that includes the user 2102 location data and environmental conditions. Utilizing the selected communication mode, the system 2000 may securely transmit the SOS signal along with vital information, employing advanced error correction codes and AES-256 encryption to ensure data integrity and security during transmission. Simultaneously, the user interface may display a real-time operational status, reassuring the user 2102 that their SOS signal is being sent successfully. In an embodiment, the augmented reality (AR) module 2022 may also assist by highlighting potential exit routes or safe paths based on the user 2102 current location and environmental context, providing visual cues that guide the user 2102 while they await rescue.

Figure 22:
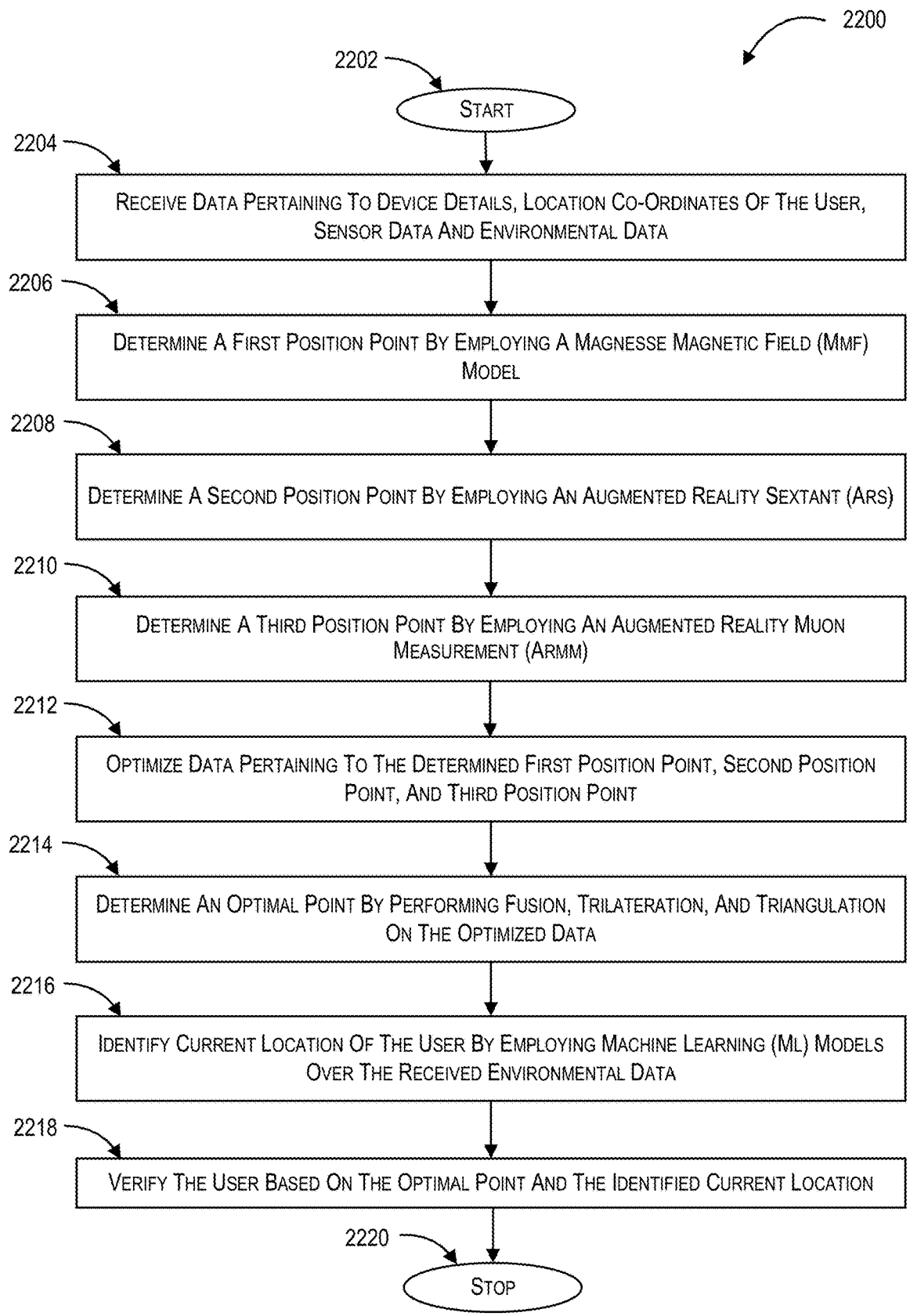
FIG. 22 illustrates a flowchart illustrating a method for location-based security verification of users, in accordance with an embodiment of the present disclosure.

FIG. 22 illustrates a flowchart 2200 illustrating a method for location-based security verification of users. The method starts at step 2202.

At first, data from a user device may be received, at step 2204, in response to clicking a verification link. The data may be associated with device details, location co-ordinates of the user, sensor data, and/or environmental data. Upon receiving the data from the user device, the method may include the steps of analyzing the received device details to ascertain user device root access, user device developer mode access, latitude, longitude, altitude, speed, accuracy, time, Wireless Fidelity (Wi-Fi) signals, Bluetooth beacons, and/or Global Positioning System (GPS) signals. Based on the results of the analysis of the received device details, the method may include the steps of determining the probability of authenticity of the user device, signals, and/or location. Additionally, the method may include the steps of calculating Optimal Time (OT) for improving accuracy of GPS position data and/or accounting for variations in the analysis that could result from differences in time. Thereafter, the method may include the steps of creating a digital map by employing an ML model to collect, store, and analyze spatial data to increase the accuracy of analysis.

At step 2206, a first position point by employing a Magnesse Magnetic Field (MMF) model may be determined. The calculation of the first position point may further include the steps of reading magnetometer measurements from the sensor data over the calculated OT and calculating inclination and declination of the magnetic field over the read magnetometer measurements. Upon calculation of the inclination and declination, the method may include the steps of calculating the latitude and longitude corresponding to the first position point using the calculated inclination and declination of the magnetic field over an International Geomatic Reference Field (IDRF) table.

At step 2208, a second position point by employing an Augmented Reality Sextant (ARS) may be determined. The determination of the second position point may further include determining if the user device is indoor or outdoor using a camera sensor, microphone sensor, strength of GPS signal, strength of wireless signal, strength of cellular signal; Wi-Fi SSID, and/or location relevant to an existing virtual position point on digital maps. Then, the method may include the steps of receiving one or more images pertaining to the sky from a camera of the user device and determining one or more constellations by employing a cloud cover detection model and/or constellation detection model. Upon determining one or more constellations, the method may include the steps of receiving an image associated with a shadow of an object and measuring the angle of the sun based on the determined one or more constellations and/or the received image using a digital sextant. Thereafter, the method may include the steps of calculating latitude and longitude corresponding to the second position point based on the measured angle of the sun.

At step 2210, a third position point by employing an Augmented Reality Muon Measurement (ARMM) may be determined. The determination of the third position point may further include the steps of determining two or more Augmented Reality Virtual Position Points (ARVPPs) relevant to the current position using a digital map. The two or more ARVPPs may be calculated using speed of muons to measure the time it would take for the muons to travel from the two or more ARVPPs to the user device's current location. Thereafter, the method may include the steps of calculating the third position point based on the determined two or more ARVPPs.

At step 2212, data pertaining to the determined first position point, second position point, and/or third position point may be optimized. Upon optimizing the data, an optimal point may be determined, at step 2214, by performing fusion, trilateration, and/or triangulation on the optimized data pertaining to the determined first position point, second position point, and/or third position point. Alternatively, or additionally, a current location of the user may be identified, at step 2216, by employing one or more Machine Learning (ML) models over the received environmental data. Thereafter, the user may be verified, at step 2218, based on the optimal point and the identified current location.

In some embodiments, the method may further include the steps of calculating location and direction based on the optimized data pertaining to the determined first position point, second position point, and/or third position point.

In some embodiments, the method may further include the steps of transmitting data from the user device by the steps of forming a signal that is spread over a wider bandwidth than necessary to transmit the data. Upon forming the signal, the method may include the steps of multiplying the formed signal with a pseudorandom spreading sequence to spread the formed signal out over a wider bandwidth using an Ultra-WideBand (UWB) modulation. Thereafter, the method may further include the steps of sending a radio wave, having the multiplied signal, to the ionosphere that is refracted by the ionosphere for traveling to a distant location to a receiving device. It may be understood that receiver of the receiving device multiplies received radio wave with the same pseudorandom spreading sequence that was used for multiplying the signal to receive the data. The method ends at step 2220.

Figure 23:
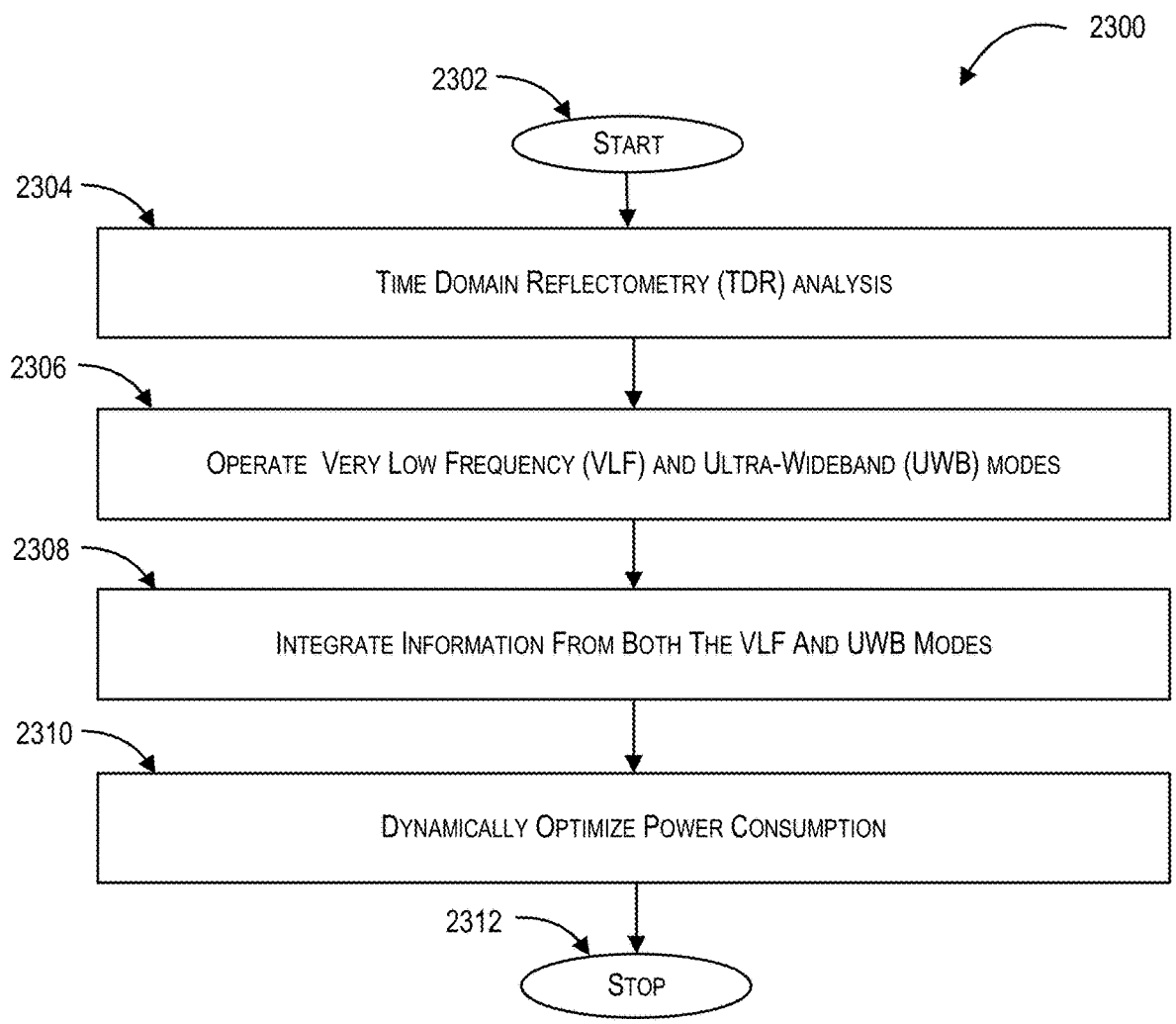
FIG. 23 illustrates a flowchart illustrating a method for providing location-based positioning and navigation in GPS-denied environments, in accordance with an embodiment of the present disclosure.

FIG. 23 illustrates a flowchart 2300 illustrating a method for providing location-based positioning and navigation in GPS-denied environments, in accordance with an embodiment of the present disclosure. The method starts at step 2302.

At first, varying impedance levels may be Time Domain Reflectometry (TDR) analyzed for generating reflection points for indoor location tracking, at step 2304. Further, the method may include the steps of supporting multi-band and wide-band capabilities, improving signal reception and transmission for VLF and UWB modes. The transition between VLF and UWB modes may be managed by an adaptive protocol framework that continuously assesses environmental factors, signal quality, and operational needs to ensure smooth navigation and communication. Further, the method may include the steps of featuring trace geometry and material selection optimized for TDR-based signal reflection, ensuring accurate distance measurement and enhanced navigation indoors.

Next, at step 2306, the reflection data may be received and operated in either Very Low Frequency (VLF) or Ultra-Wideband (UWB) modes, selected based on environmental conditions and application requirements as determined from the reflection data.

Next, at step 2308, location tracking information may be integrated from both VLF and UWB modes, enhancing the accuracy and reliability of the positioning and navigation data. Further, the method includes the steps of integrating additional data from environmental sensors, such as accelerometers, gyroscopes, and magnetometers, to enhance positioning accuracy in conditions with magnetic anomalies or underground environments.

Next, at step 2310, power consumption may be optimized by adjusting operational modes in real time, based on environmental factors, thus extending battery life while maintaining signal integrity and navigation precision. In an embodiment, the power management module may employ energy efficiency protocols to maximize device longevity, operating in low-power VLF mode and higher-power UWB mode as required.

In an embodiment, the method may include the steps of employing advanced error correction codes and automatic repeat request strategies to ensure data integrity, complemented by AES-256 encryption and frequency hopping techniques for secure data transmission across VLF and UWB channels. Further, the method may include the steps of transmitting SOS signals through UWB and VLF communication channels, allowing emergency signals to include SOS messages, location data, and environmental information. In an embodiment, a user interface may display real-time operational status and enable users to select between VLF and UWB modes based on specific navigation scenarios. In an embodiment, the method may also include the steps of overlaying navigational data and environmental information onto a user device display, with GenAI dynamically adjusting AR content in response to real-time environmental conditions and user interactions. The method may end at step 2312.

Figure 24:
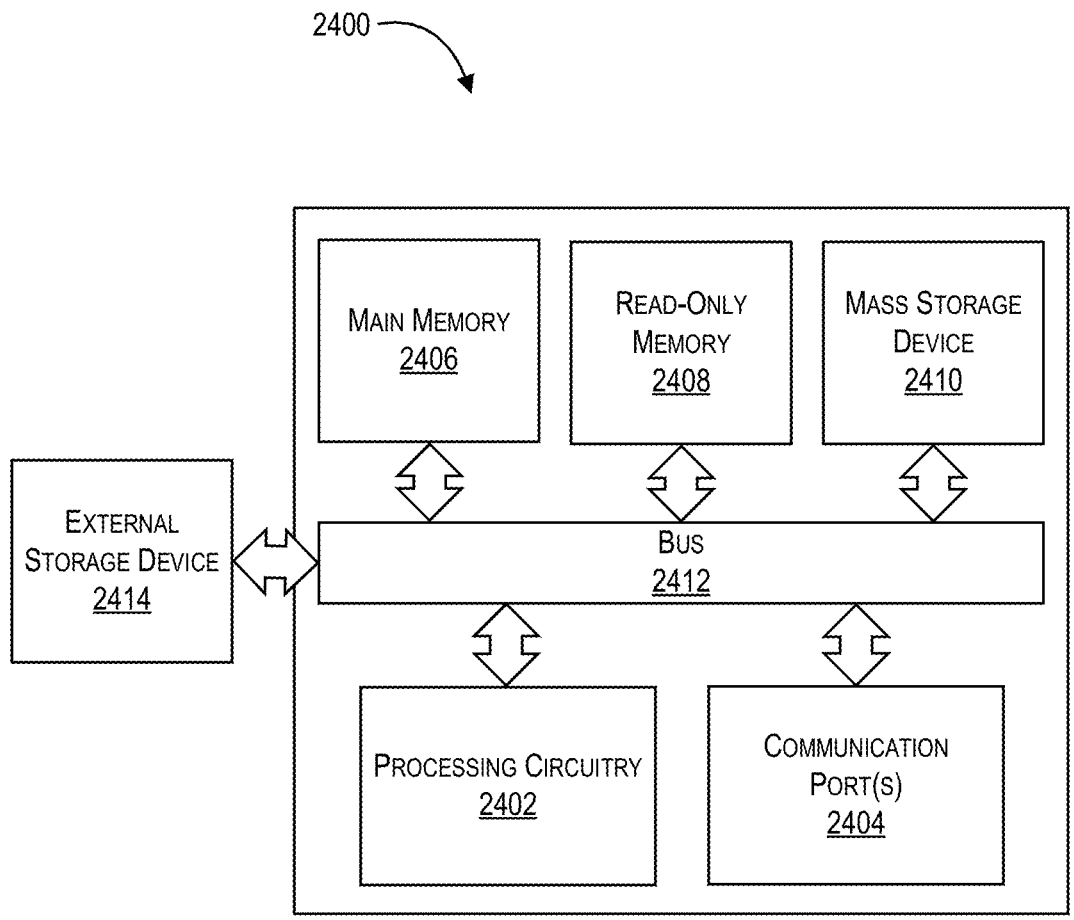
FIG. 24 illustrates an exemplary computer unit in which or with which embodiments of the present disclosure may be utilized.

FIG. 24 illustrates an exemplary computer system in which or with which embodiments of the present disclosure may be utilized. Depending upon the implementation, the various process and decision blocks described above may be performed by hardware components, embodied in machine-executable instructions, which may be used to cause a general-purpose or special-purpose processor programmed with the instructions to perform the steps, or the steps may be performed by a combination of hardware, software and/or firmware. As shown in FIG. 24, the computer system 2400 includes an external storage device 2414, a bus 2412, a main memory 2406, a read-only memory 2408, a mass storage device 2410, a communication port(s) 2404, and a processing circuitry 2402.

Those skilled in the art will appreciate that the computer system 2400 may include more than one processing circuitry 2402 and one or more communication ports 2404. The processing circuitry 2402 should be understood to mean circuitry based on one or more microprocessors, microcontrollers, digital signal processors, programmable logic devices, Field-Programmable Gate Arrays (FPGAs), Application-Specific Integrated Circuits (ASICs), etc., and may include a multi-core processor (e.g., dual-core, quad-core, Hexa-core, or any suitable number of cores) or supercomputer. In some embodiments, the processing circuitry 2402 is distributed across multiple separate processors or processing units, for example, multiple of the same type of processing units (e.g., two Intel Core i7 processors) or multiple different processors (e.g., an Intel Core i5 processor and an Intel Core i7 processor). Examples of the processing circuitry 2402 include, but are not limited to, an Intel® Itanium® or Itanium 2 processor(s), AMD® Opteron® or Athlon MP® processor(s), Motorola® lines of processors, System on Chip (SoC) processors, or other future processors. The processing circuitry 2402 may include various modules associated with embodiments of the present disclosure.

The communication port 2404 may include a cable modem, Integrated Services Digital Network (ISDN) modem, a Digital Subscriber Line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of electronic devices or communication of electronic devices in locations remote from each other. The communication port 2404 may be any RS-232 port for use with a modem-based dialup connection, a 10/100 Ethernet port, a Gigabit, or a 10 Gigabit port using copper or fiber, a serial port, a parallel port, or other existing or future ports. The communication port 2404 may be chosen depending on a network, such as a Local Area Network (LAN), Wide Area Network (WAN), or any network to which the computer system 2400 may be connected.

The main memory 2406 may include Random Access Memory (RAM) or any other dynamic storage device commonly known in the art. Read-only memory (ROM) 2408 may be any static storage device(s), e.g., but not limited to, a Programmable Read-Only Memory (PROM) chips for storing static information, e.g., start-up or BIOS instructions for the processing circuitry 2402.

The mass storage device 2410 may be an electronic storage device. As referred to herein, the phrase "electronic storage device" or "storage device" should be understood to mean any device for storing electronic data, computer software, or firmware, such as random-access memory, read-only memory, hard drives, optical drives, Digital Video Disc (DVD) recorders, Compact Disc (CD) recorders, BLU-RAY disc (BD) recorders, BLU-RAY 3D disc recorders, Digital Video Recorders (DVRs, sometimes called a personal video recorder or PVRs), solid-state devices, quantum storage devices, gaming consoles, gaming media, or any other suitable fixed or removable storage devices, and/or any combination of the same. Nonvolatile memory may also be used (e.g., to launch a boot-up routine and other instructions). Cloud-based storage may be used to supplement the main memory 2406. The mass storage device 2410 may be any current or future mass storage solution, which may be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firmware interfaces), e.g., those available from Seagate (e.g., the Seagate Barracuda 7200 family) or Hitachi (e.g., the Hitachi Deskstar 7K1000), one or more optical discs, Redundant Array of Independent Disks (RAID) storage, e.g., an array of disks (e.g., SATA arrays), available from various vendors including Dot Hill Systems Corp., LaCie, Nexsan Technologies, Inc. and Enhance Technology, Inc.

The bus 2412 communicatively couples the processing circuitry 2402 with the other memory, storage, and communication blocks. The bus 2412 may be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processing circuitry 2402 to the software system.

Optionally, operator and administrative interfaces, e.g., a display, keyboard, and a cursor control device, may also be coupled to the bus 2412 to support direct operator interaction with the computer system 2400. Other operator and administrative interfaces may be provided through network connections connected through the communication port(s) 2404. The external storage device 2414 may be any kind of external hard drives, floppy drives, IOMEGA® Zip Drive, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

The computer system 2400 may be accessed through a user interface. The user interface application may be implemented using any suitable architecture. For example, it may be a stand-alone application wholly implemented on the computer system 2400. The user interfaces application and/or any instructions for performing any of the embodiments discussed herein may be encoded on computer-readable media. Computer-readable media includes any media capable of storing data. In some embodiments, the user interface application is client-server-based. Data for use by a thick or thin client implemented on an electronic device computer system 2400 is retrieved on-demand by issuing requests to a server remote to the computer system 2400. For example, computer system 2400 may receive inputs from the user via an input interface and transmit those inputs to the remote server for processing and generating the corresponding outputs. The generated output is then transmitted to the computer system 2400 for presentation to the user.

Thus, the present disclosure discloses a system and method for location-based security verification of users. The method and system enhance user privacy and protect personal data from malicious purposes including identity theft and unauthorized access. The system extends beyond individual privacy protection; organizations also gain significant advantages by adopting advanced identity verification measures provided to prevent data breaches and unauthorized access attempts. The location-aware technology protects against identity theft and secures access to companies' critical infrastructure. The method and system confirm the accuracy of the location data, ensuring it has not been spoofed or in any way compromised. This additional layer of protection is used in conjunction with environmental base security measures to create a comprehensive security solution. The technology creates virtual boundaries around physical locations, using geofencing, that enables organizations to monitor employee movements and track facility perimeters effectively. This helps prevent unauthorized access as well as reduces the risk of insider threats. The use of reflectometry increases navigation accuracy and enables the evaluation of surfaces for the identification of certain substances.

The location-aware technology offers a solution to combat identity theft by enabling the tracking of individuals' devices. The use of custom advanced algorithms, the technology can monitor the movement patterns of devices associated with users' unique identities. Unusual or inconsistent travel patterns are identified as red flags that indicate potential identity theft. This application of machine learning communicates notifications to impacted individuals when their devices move to locations that do not align with their usual travel patterns. Timely alerts play a crucial role in enabling individuals to take necessary actions to protect their identities. The method and system to operate independently of satellites as a navigational tool should they be compromised or in areas where the signal strength required is not achievable to minimize impact to users and companies. The technology operates securely when transmitting data and extends the current capabilities of existing mesh networks. Finally, the system is not susceptible to hacking, spoofing, jamming, solar flares, and orbital chain reactions.

While embodiments of the present disclosure have been illustrated and described, it will be clear that the disclosure is not limited to these embodiments only. Numerous modifications, changes, variations, substitutions, and equivalents will be apparent to those skilled in the art without departing from the spirit and scope of the disclosure, as described in the claims.

Thus, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular name.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document, the terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, utilized, or combined with other elements, components, or steps that are not expressly referenced. Where the specification claims refer to at least one of something selected from the group consisting of A, B, C . . . And N, the text should be interpreted as requiring only one element from the group, not A plus N, or B plus N, etc.

While the foregoing describes various embodiments of the disclosure, other and further embodiments of the disclosure may be devised without departing from the basic scope thereof. The scope of the disclosure is determined by the claims that follow. The disclosure is not limited to the described embodiments, versions, or examples, which are included to enable a person having ordinary skill in the art to make and use the disclosure when combined with information and knowledge available to the person having ordinary skill in the art.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded to the widest scope consistent with the principles and novel features disclosed herein. It is contemplated that additional embodiments are within the spirit and true scope of the disclosed subject matter.

Additional Related Information

Detailed Technical Descriptions

System Architecture and Component Interactions: The Advanced Localization and Integration System (ALIS) is a comprehensive navigation platform engineered to deliver precise positioning in environments where GPS signals are unavailable or unreliable. Its architecture is modular and scalable, consisting of several interconnected components that work synergistically to achieve high-accuracy localization. Below is a detailed description of each component and how they interact within the system.

Sensor Data Collection and Processing: The 'sensor_interface' module is the foundational layer of ALIS, responsible for collecting and preprocessing real-time data from a variety of sensors:

Inertial Measurement Units (IMUs): Capture accelerometer and gyroscope data to measure linear acceleration and angular velocity.

Magnetometers: Record the Earth's magnetic field variations for magnetic fingerprinting.

Altimeters and Barometers: Provide altitude information based on atmospheric pressure changes.

Environmental Sensors: Include temperature, humidity, and pressure sensors that can affect sensor performance and data interpretation.

Ultra-Wideband (UWB) Receivers: Facilitate high-precision ranging and positioning in certain configurations.

The 'sensor interface' standardizes data formats and timestamps to ensure synchronization across all sensors. It performs initial data validation, filtering out obvious anomalies using techniques like low-pass filters and statistical outlier detection. The processed data is then made available to other system modules through a standardized data bus or API, ensuring seamless integration.

Virtual Anchor Points (VAPs) Management: The 'vap_manager' module handles the creation, maintenance, and utilization of Virtual Anchor Points (VAPs), which are critical for spatial alignment and reference within the system.

Static VAPs: Fixed points with known coordinates and properties, used for system calibration and as reference points during operation.

Dynamic VAPs: Generated in real-time using interpolation methods like kriging and Gaussian processes, adapting to environmental changes and enhancing coverage in areas lacking static VAPs.

Positional VAPs: Associated with specific landmarks or features, aiding in refining location estimates and improving accuracy.

VAPs are stored in a spatially indexed database, enabling rapid retrieval based on location queries. The database includes metadata such as the VAP type, coordinates, confidence levels, and environmental context. The 'vap_manager' interfaces with the 'dynamic_grid_system' and 'error_handler' modules to optimize VAP placement and reliability.

Dynamic Grid Management: The 'dynamic_grid_system' module divides the operational environment into a grid structure, facilitating spatial indexing and efficient data processing.

Adaptive Grid Resolution: Adjusts the size and resolution of grid cells in real-time based on sensor accuracy, environmental complexity, and computational resource availability.

Hierarchical Grid Layers: Supports multiple layers of grids (e.g., coarse and fine grids) to enable efficient data processing and multi-scale analysis.

Grid Synchronization: Ensures consistency across multiple devices or agents operating within the same environment, critical for collaborative applications.

The dynamic grid system enhances computational efficiency by focusing processing efforts where they are most needed and allowing for scalable operation across different environments.

Error Handling and Optimization: The 'error_handler' module is essential for maintaining system integrity and ensuring accurate positioning.

Real-time Error Detection: Continuously monitors sensor data streams for anomalies using statistical methods (e.g., Z-score analysis) and machine learning algorithms trained to recognize patterns indicative of errors.

Error Mitigation Strategies: Implements corrective actions such as sensor recalibration, data smoothing using filters (e.g., Kalman, Particle), or switching to redundant sensors when anomalies are detected.

Confidence Scoring: Assigns confidence levels to positional estimates based on sensor data quality, environmental conditions, and algorithmic uncertainty.

The 'vap_optimizer' works in conjunction with the 'error_handler' to adjust VAP placements, weights, and utilization strategies, ensuring that the spatial model remains optimized for accuracy and robustness even in the presence of sensor errors or environmental changes.

Advanced Computational Models: ALIS integrates several advanced computational models to process sensor data and improve positional estimates.

Bayesian Estimation Framework: Utilizes prior knowledge and probabilistic models to refine position estimates, accounting for uncertainties in sensor measurements.

Gaussian Processes (GP): Employed for regression and spatial interpolation tasks, such as generating dynamic VAPs and modeling spatially correlated environmental data.

Deep Learning Models: Include Convolutional Neural Networks (CNNs) and Recurrent Neural Networks (RNNs) for feature extraction, pattern recognition, and anomaly detection within complex sensor data.

Kalman Filters and Variants: Implement recursive estimation algorithms to combine predictions with new measurements, smoothing sensor data and providing optimal state estimates.

Neuro-Symbolic Engine: Combines the learning capabilities of neural networks with the logical reasoning of symbolic AI, enhancing contextual understanding and decision-making processes.

These computational models are implemented within dedicated modules, each optimized for performance and capable of running in parallel to meet real-time processing requirements.

Quantum Computing Integration: The 'quantum_utils' module explores the application of quantum computing techniques to accelerate computationally intensive tasks.

Quantum Annealing: Utilized for solving complex optimization problems such as optimal VAP placement and resource allocation.

Quantum Machine Learning: Leveraging quantum algorithms to enhance the training and inference speed of machine learning models used in the system.

While still an emerging technology, the integration of quantum computing positions ALIS to take advantage of future advancements in computational capabilities, ensuring long-term scalability and performance improvements.

Data Management and Storage: ALIS employs a robust data management strategy to handle the vast amounts of sensor and spatial data.

Distributed Database System: Stores sensor data logs, VAP information, and environmental models in a scalable manner.

Data Indexing and Retrieval: Utilizes spatial indexing techniques (e.g., R-trees) for efficient querying and retrieval of relevant data.

Data Integrity and Redundancy: Implements data validation checks, backups, and redundancy mechanisms to prevent data loss and ensure consistency.

Communication and Security Protocols: Secure communication is critical in ALIS, especially when operating in sensitive or high-security environments.

Encryption: All data transmissions are secured using AES-256 encryption, with key management protocols in place to prevent unauthorized access.

Authentication and Access Control: Multi-factor authentication and role-based access controls ensure that only authorized users and devices can access system resources.

Spoofing and Tampering Detection: The system includes mechanisms to detect GPS spoofing, sensor tampering, and other security threats, triggering alerts and protective measures.

Specific Embodiments and Use Cases

Enhanced Two-Factor Authentication (2FA) with Precise Location Verification

Overview: In high-security environments, traditional Two-Factor Authentication (2FA) methods—such as passwords combined with tokens or biometric data—can be compromised, particularly when users employ Virtual Private Networks (VPNs) that mask their true locations. ALIS enhances 2FA by incorporating precise physical location verification, adding a robust third factor that is difficult to spoof.

Implementation Details:

Location as an Authentication Factor: ALIS utilizes its precise positioning capabilities to verify that a user is physically present in an authorized location during authentication attempts.

Bypassing VPN Limitations: Unlike IP-based geolocation, which can be easily manipulated through VPNs or proxy servers, ALIS relies on physical sensor data (e.g., magnetic fingerprints) that reflect the unique characteristics of the user's environment, making spoofing extremely difficult.

Integration with Existing Systems: The system interfaces with standard authentication protocols (e.g., RADIUS, LDAP, SAML), allowing for seamless integration with enterprise security infrastructure.

Operational Scenario:

Access Attempt: A user initiates an authentication request to access a secure resource.

Credential Verification: The system verifies traditional credentials (e.g., username/password, token code).

Location Verification:

The user's device collects sensor data (magnetometer, accelerometer, etc.).

ALIS processes this data to determine the user's precise location.

The location is compared against authorized zones stored in the system.

Decision:
  Match: If the location is within an authorized area, access is granted.
  Mismatch: If the location is outside authorized zones or cannot be verified, access is denied, and an alert may be generated.

Benefits:
  Enhanced Security: Adds a robust layer of security that is difficult to bypass, even with compromised credentials or VPNs.
  Regulatory Compliance: Helps organizations meet compliance requirements for data protection and access control in industries like finance, healthcare, and government.
  User Experience: Operates transparently, requiring minimal additional action from the user.

Navigation in Complex Environments

Underground Mining Operations:

Challenges:
  GPS signals do not penetrate underground environments.
  Complex tunnel networks require precise navigation for safety and efficiency.

ALIS Solution:
  Deploys static VAPs at key locations within the mine.
  Utilizes dynamic VAPs generated from real-time sensor data to adapt to changing environments (e.g., after blasting operations).
  Provides miners and autonomous equipment with accurate positioning information.

Benefits:
  Enhances safety by enabling real-time tracking and monitoring.
  Improves operational efficiency through optimized routing and resource allocation.
  Assists in emergency response by providing precise locations of personnel and assets.

Urban Search and Rescue (USAR)

Challenges:
  Disaster sites often have obstructed or destroyed infrastructure, making navigation hazardous.
  Time is critical in locating survivors.

ALIS Solution:
  Equips rescue personnel with devices running ALIS.
  Maps the interior of collapsed structures using sensor data and dynamic VAPs.
  Shares real-time location data among team members for coordinated efforts.

Benefits:
  Reduces search times by providing accurate maps and locations.
  Enhances safety for rescue workers by identifying hazards.
  Improves communication and coordination among teams.

Autonomous Vehicle Navigation in GPS-Denied Areas

Challenges:
  Indoor and underground environments lack GPS signals necessary for autonomous navigation.
  Obstacles and dynamic changes in the environment require adaptable systems.

ALIS Solution:
  Integrates with autonomous vehicles' onboard systems.
  Uses sensor fusion and advanced algorithms to provide accurate positioning and mapping.
  Adapts to environmental changes through dynamic VAPs and real-time data processing.

Benefits:
  Enables autonomous operation in previously inaccessible areas.
  Improves mission capabilities for delivery, inspection, and surveillance tasks.
  Enhances safety by avoiding collisions and navigating complex environments.

Industrial Automation and IoT Integration

Smart Factories
  Asset Tracking: ALIS provides real-time location tracking of tools, equipment, and inventory within large manufacturing facilities.
  Process Optimization: Facilitates efficient routing of autonomous guided vehicles (AGVs) and robots, reducing bottlenecks and downtime.
  Safety Systems: Monitors the location of personnel to prevent accidents and ensure compliance with safety protocols.

IoT Device Contextualization
  Enhanced Data Analytics: Precise location data enriches the context of IoT sensor readings, improving analytics and decision-making.
  Energy Management: Optimizes energy usage by controlling systems based on occupancy and movement patterns detected through ALIS.
  Security Applications: Detects unauthorized devices or movements within a network, enhancing physical and cybersecurity measures.

High-Security Zone Access Control

Facility Security
  Perimeter Monitoring: ALIS tracks movements around secure perimeters, detecting breaches or unauthorized access attempts.
  Zone Restrictions: Enforces access policies by verifying that individuals are authorized to be in specific areas, denying access to systems if location verification fails.
  Incident Response: Provides real-time location data during security incidents, aiding in response coordination and investigation.

Data Center Access
  Physical Access Control: Requires precise location verification before granting access to sensitive equipment or data storage areas.
  Anomaly Detection: Identifies unusual patterns, such as repeated access attempts from unauthorized locations, triggering security protocols.

Algorithmic Details

Magnetic Fingerprint Matching
  Concept: ALIS utilizes magnetic fingerprinting by capturing the unique magnetic signatures of different locations caused by structural elements and environmental factors.

---

Algorithm Steps
  1. Data Acquisition: Collect magnetic field data ($\( B\_x, B\_y, B\_z \)$) at known locations to create a reference map.
  2. Preprocessing:
    Noise Filtering: Apply filters (e.g., median, Butterworth) to remove high-frequency noise.
    Coordinate Transformation: Convert sensor readings to a common reference frame if necessary.
  3. Feature Extraction:
  Compute derived features such as magnetic gradients and anomalies.

-continued

Use statistical descriptors (mean, variance) to characterize the magnetic field at each location.
4. Database Construction:
   Store the processed data in a spatial database indexed by location coordinates.
5. Real-time Localization:
   Input Data: Collect live magnetic field data from the user's device.
   Similarity Computation: Calculate the similarity between live data and database entries using metrics like the Mahalanobis distance.
   Position Estimation: Identify the location with the highest similarity score as the estimated position.
Mathematical Models
   Mahalanobis Distance:
   $D\_M = \sqrt{(X - \mu)^T S^{-1} (X - \mu)}$
   where $X$ is the live data vector, $\mu$ is the mean vector of the reference data, and $S$ is the covariance matrix.

Bayesian Estimation and Gaussian Processes

Bayesian Estimation

Objective: Update the probability of a hypothesis (e.g., the user's position) based on new evidence (sensor data).

Bayes' Theorem:

$$P(\theta \mid D) = \frac{P(D \mid \theta) P(\theta)}{P(D)}$$

where $\theta$ represents the state variables (position), and $D$ represents the observed data.

Implementation

Prior Distribution: Represents initial beliefs about the position, possibly uniform or based on previous estimates.

Likelihood Function: Models the probability of observing the sensor data given a specific position, often assuming Gaussian noise.

Posterior Distribution: Updated belief incorporating the new data, used for subsequent predictions.

Gaussian Processes (GP)

Definition: A GP defines a distribution over functions, suitable for regression tasks where predictions are needed at unseen points.

Kernel Functions: Specify the covariance between any two points in the input space, capturing spatial correlations.

Common Kernels:

Squared Exponential Kernel:

$$k(x, x') = \sigma_f^2 \exp\left(-\frac{(x - x')^2}{2 l^2}\right)$$

where $\sigma_f^2$ is the signal variance and $l$ is the length scale parameter.

Prediction:

Mean Function: $\mu_* = K_*^T K^{-1} y$

Covariance Function: $\Sigma_* = K_{**} - K_*^T K^{-1} K_*$ where $K$ is the covariance matrix of training data, $K_*$ is the covariance between training and test data, and $K_{**}$ is the covariance of test data.

Dynamic VAP Interpolation Using Kriging

Kriging Methodology: Kriging is an optimal interpolation technique that provides unbiased estimates with minimized variance, ideal for spatial estimation in geostatistics.

Algorithm Steps
   1. Empirical Semivariogram Calculation:
      Compute the semivariance for pairs of data points at various lag distances:
      $\gamma(h) = \frac{1}{2N(h)} \sum_{i=1}^{N(h)} [Z(x\_i) - Z(x\_i + h)]^2$
      where $N(h)$ is the number of pairs at lag $h$, and $Z$ is the measured value.
   2. Model Fitting:
      Fit a theoretical semivariogram model (e.g., spherical, exponential) to the empirical data.
   3. Kriging System Setup:
      Formulate the kriging equations using the semivariogram model to compute weights $\lambda\_i$.
   4. Estimation and Variance Calculation:
      Estimate the value at an unsampled location $x\_0$:
      $Z^*(x\_0) = \sum_{i=1}^{n} \lambda\_i Z(x\_i)$
      Compute the estimation variance to assess confidence.
Benefits
   Optimality: Provides the best linear unbiased estimate.
   Uncertainty Quantification: Supplies variance estimates alongside predictions.
   Adaptability: Accounts for spatial heterogeneity and anisotropy.

Kalman Filtering
Standard Kalman Filter
State Space Representation
   State Vector: $x\_k$ represents the system's state at time $k$ (e.g., position, velocity).
Process Model:

$$x\_k = A x\_{k-1} + B u\_k + w\_k$$

where $A$ is the state transition matrix, $B$ is the control input matrix, $u\_k$ is the control vector, and $w\_k$ is the process noise.

Measurement Model:

$$z\_k = H x\_k + v\_k$$

where $H$ is the observation matrix, and $v\_k$ is the measurement noise.

Algorithm Steps
   1. Initialization:
   - Set initial state estimate $\hat{x}\_0$ and error covariance $P\_0$.
   2. Time Update (Prediction):
   - State Prediction: $\hat{x}\_{k \mid k-1} = A \hat{x}\_{k-1 \mid k-1} + B u\_k$
   - Covariance Prediction: $P\_{k \mid k-1} = A P\_{k-1 \mid k-1} A^T + Q$
      where $Q$ is the process noise covariance matrix.
   3. Measurement Update (Correction):
   - Kalman Gain Calculation:
      $K\_k = P\_{k \mid k-1} H^T (H P\_{k \mid k-1} H^T + R)^{-1}$
      where $R$ is the measurement noise covariance matrix.
   - State Update:
      $\hat{x}\_{k \mid k} = \hat{x}\_{k \mid k-1} + K\_k (z\_k - H \hat{x}\_{k \mid k-1})$
   - Covariance Update: $P\_{k \mid k} = (I - K\_k H) P\_{k \mid k-1}$ Extended Kalman Filter (EKF)

For nonlinear systems, the EKF linearizes the process and measurement models around the current estimate.

– Process Model: $x_k = f(x_{k-1}, u_k) + w_k$

– Measurment Model: $z_k = h(x_k) + v_k$

Jacobian Matrices:
State Transition Jacobian:

$$F_k = \left. \frac{\partial f}{\partial x} \right|_{x = \hat{x}_{k-1|k-1}}$$

– Observation Jacobian:

$$H_k = \left. \frac{\partial h}{\partial x} \right|_{x = \hat{x}_{k|k-1}}$$

Applications in ALIS
  Sensor Fusion: Combines data from IMUs, magnetometers, and other sensors to produce a more accurate state estimate than any single sensor could provide.
  Motion Tracking: Continuously estimates the user's position and velocity, accounting for system dynamics and measurement noise.
  Adaptive Filtering: Adjusts noise covariance matrices based on real-time assessments of sensor performance and environmental conditions.
Anomaly Detection Using Deep Learning and Neuro-Symbolic Engine
Deep Learning Approaches
  Autoencoders:
    Architecture: Consists of an encoder and decoder network trained to reconstruct input data.
    Anomaly Detection: Anomalies are detected when the reconstruction error exceeds a predefined threshold, indicating that the input data differs significantly from the training data (normal patterns).
  Long Short-Term Memory (LSTM) Networks:
    Purpose: Capture temporal dependencies in sequential data, making them suitable for detecting anomalies over time.
    Implementation: Train the LSTM on sequences of normal sensor data and monitor deviations during operation.

---

Algorithm Steps
1. Data Preparation:
   - Collect and preprocess training data representative of normal system behavior.
2. Model Training:
   - Train the neural network to learn normal patterns and relationships within the data.
3. Real-time Monitoring:
   - Continuously feed operational data into the model.
   - Compute reconstruction or prediction errors.
4. Anomaly Detection:
   - Compare errors against thresholds.
   - Trigger alerts or corrective actions when anomalies are detected.

---

Neuro-Symbolic Engine
  Concept: Combines the strengths of neural networks (learning from data) with symbolic AI (logical reasoning and knowledge representation).
Components
  Neural Network Layer:
    Extracts features and patterns from raw sensor data.
    Provides probabilistic outputs (e.g., confidence scores).
  Symbolic Reasoning Layer:
    Encodes domain knowledge and logical rules.
    Performs reasoning tasks using inputs from the neural network.
Implementation
  1. Knowledge Base Construction:
    Define a set of rules and ontologies relevant to the operational context.
  2. Integration Mechanism:
    Map neural network outputs to symbolic representations.
    Use logical inference engines (e.g., Prolog, Datalog) to draw conclusions.
  3. Decision-Making:
    Combine statistical evidence from neural networks with logical deductions to make informed decisions.
    Enhance explainability by providing logical justifications for actions.

EXAMPLE

Neural Output: The neural network detects an unusual pattern in magnetometer data with a high confidence level.
Symbolic Rule: If an unusual pattern is detected near a high-security area, and the user is not authorized, then trigger a security alert.
Outcome: The system generates an alert, and the symbolic engine can explain that the decision was based on both the detected anomaly and the access policies.
Benefits
  Enhanced Accuracy: Improves detection capabilities by leveraging both data-driven insights and expert knowledge.
  Explainability: Provides transparent reasoning behind decisions, which is critical in high-stakes applications.
  Flexibility: Can adapt to new rules and knowledge without retraining the entire system.

What is claimed is:

1. A system for providing location-based positioning and navigation in GPS-denied environments, the system comprising:
   a reflective printed circuit board (PCB)-based subsystem, having integrated traces, configured to perform Time Domain Reflectometry (TDR) measurements of impedance levels on said traces, thereby measuring reflection waveforms arising from impedance variations to generate reflection points for indoor location tracking;
   a positioning and communication module to receive reflection data associated with the generated reflection points for determining environmental conditions and application requirements, and operate in at least one of: Very Low Frequency (VLF) and Ultra-Wideband (UWB) modes that are selected based on the environmental conditions and application requirements as determined from the reflection data;
   a data fusion module configured to combine said reflection waveforms with sensor data to improve accuracy below a defined error threshold; and
   a power management module switches from continuous to intermittent pulses based on reflectivity thresholds, thereby conserving energy while maintaining navigational integrity.

2. The system of claim 1, further comprising a signal interface configured to adjust gain, filtering, or power levels for reception and transmission across VLF and UWB frequency bands, thereby increasing signal strength relative to a baseline threshold.

3. The system of claim 1, wherein transition between VLF and UWB modes is algorithmically managed by an adaptive protocol framework, wherein the positioning and communication module continuously analyzes environmental conditions, signal quality, and operational requirements configured to maintain continuous data exchange under changing environmental conditions, thus preserving stable navigation and communication.

4. The system of claim 1, further comprising a security module configured to:
apply forward error correction codes and automatic repeat request strategies for data integrity; and
combine AES-256 encryption and frequency hopping to protect data transmission over VLF and UWB communication channels.

5. The system of claim 1, wherein the reflective PCB subsystem includes trace geometry and a PCB layer material selection configured to exhibit impedance consistency of ±X ohms along the TDR signal path, thereby reducing attenuation below a threshold and enabling distance measurements within accuracy in indoor environments.

6. The system of claim 1, wherein the data fusion module configured to apply correction factors to magnetometer readings in high-anomaly or underground conditions, thereby maintaining positioning accuracy within specified margin.

7. The system of claim 1, further comprising an SOS signal transmission module configured to send emergency signals over at least one of: UWB and VLF communication channels, wherein the emergency signals include at least one of: SOS signal, location data, and environmental data.

8. The system of claim 1, further comprising a user interface configured to receive user input selecting either VLF and UWB modes based on user preference, thereby enabling mode-specific navigation.

9. The system of claim 1, wherein the power management module configured to alternate between continuous and intermittent transmission based on detection of stable reflectivity conditions, thereby reducing power consumption during extended operation.

10. The system of claim 1, further comprising an augmented reality (AR) module configured to invoke GenAI to dynamically adjust AR content in real time based on user interactions and measured environmental conditions.

11. A method for providing location-based positioning and navigation in GPS-denied environments, the method comprising:
Time Domain Reflectometry (TDR) subsystem configured to measure reflection waveforms from a circuit board trace, thereby identifying reflection points indicative of impedance changes for indoor location tracking;
receiving reflection data associated with the generated reflection points for determining environmental conditions and application requirements and operating in at least one of: Very Low Frequency (VLF) and Ultra-Wideband (UWB) modes that are selected based on environmental conditions and application requirements as determined from the reflection data;
integrating information pertaining to location tracking data from both the VLF and UWB modes to enhance the accuracy and reliability of positioning and navigation data; and
dynamically optimizing power consumption by dynamically adjusting the operational modes based at least on real-time environmental factors to extend the battery life while maintaining signal integrity and navigation precision.

12. The method of claim 11, further comprising a transceiver circuit configured for multi-band and wide-band operation in VLF and UWB frequencies, adjusting bandwidth and gain to accommodate each mode's reception and transmission parameters.

13. The method of claim 11, wherein transition between VLF and UWB modes is algorithmically managed by an adaptive protocol framework through continuously analyzing environmental factors, signal quality, and operational requirements to ensure seamless navigation and communication.

14. The method of claim 11, further comprising a communication control routine configured to apply advanced error correction and repeat request strategies, and further implement AES-256 encryption with frequency hopping to secure VLF and UWB data transmission.

15. The method of claim 11, further comprising a calibration module configured to tune the PCB trace impedance to X ohms+Y % in order to enhance TDR reflectivity metrics for accurate reflection.

16. The method of claim 1, further comprises a data fusion module configured to combine accelerometers, gyroscopes, and magnetometers readings with TDR reflection points in real time, thereby adjusting navigation outputs to address magnetic anomalies or underground environments.

17. The method of claim 1, further comprises sending emergency signals over at least one of: UWB and VLF communication channels, wherein the emergency signals include at least one of: SOS signal, location data, and environmental data.

18. The method of claim 11, further comprises a user interface configured to receive user selection of VLF and UWB modes for specialized navigation scenarios.

19. The method of claim 11, further comprises a power management routine in the transceiver firmware configured to alternate between low-power VLF and higher-power UWB transmission based on environment triggers, thereby reducing energy consumption during continuous operation.

20. The method of claim 11, further comprising a AR module configured to use GenAI for dynamic adjustments of AR content based on real-time environmental conditions and user interactions, thereby ensuring consistent user interaction.

* * * * *